US012643962B2

(12) United States Patent
Grigg et al.

(10) Patent No.: US 12,643,962 B2
(45) Date of Patent: Jun. 2, 2026

(54) BIS-PHENOXY-ETHER LIGANDS FOR GROUP IV POLYOLEFIN CATALYSIS

(71) Applicant: Dow Global Technologies LLC, Midland, MI (US)

(72) Inventors: Robert David Grigg, Midland, MI (US); Brad C. Bailey, Midland, MI (US); James A. Walker, Midland, MI (US); Sukrit Mukhopadhyay, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 458 days.

(21) Appl. No.: 18/548,015

(22) PCT Filed: Feb. 25, 2022

(86) PCT No.: PCT/US2022/017929

§ 371 (c)(1),
(2) Date: Aug. 25, 2023

(87) PCT Pub. No.: WO2022/183005

PCT Pub. Date: Sep. 1, 2022

(65) Prior Publication Data

US 2024/0158542 A1 May 16, 2024

Related U.S. Application Data

(60) Provisional application No. 63/153,978, filed on Feb. 26, 2021.

(51) Int. Cl.
*C08F 4/76* (2006.01)

(52) U.S. Cl.
CPC .................................... *C08F 4/76* (2013.01)

(58) Field of Classification Search
CPC ...... C08F 4/64; C08F 210/16; C08F 4/65912; C08F 4/64168; C08F 4/76; C08F 4/65908; C08F 4/64193; C08F 2410/01; Y02P 20/582; C07F 7/0812; C07F 7/00; C07F 7/003
USPC .......................................................... 502/103
See application file for complete search history.

(56) References Cited

FOREIGN PATENT DOCUMENTS

| | | | |
|---|---|---|---|
| EP | 2492287 | A2 | 8/2012 |
| JP | 2015193612 | A | 11/2015 |
| WO | 2018/022238 | A1 | 2/2018 |

OTHER PUBLICATIONS

Machine translation of JP2015193612 A (Year: 2015).*
International Search Report and Written Opinion issued by the European Patent Office acting as International Searching Authority for International Patent Application No. PCT/US2022/017929 dated Jun. 20, 2022 (15 total pages).
Chinese Office Action dated Nov. 17, 2025, pertaining to CN Patent Application No. 202280015393.6, 10 pgs.
Japanese Notice of Reasons for Refusal dated Feb. 24, 2026, pertaining to JP Patent Application No. 2023-550202, 8 pgs.

* cited by examiner

*Primary Examiner* — Coris Fung
*Assistant Examiner* — Remy Frederic Lalisse
(74) *Attorney, Agent, or Firm* — Dinsmore & Shohl LLP

(57) ABSTRACT

Catalyst systems comprising one or more metal-ligand complexes according to formula (I). M is a metal chosen from titanium, zirconium, or hafnium, the metal having a formal oxidation state of +2, +3, or +4; each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, cyclopentadienyl, substituted cyclopentadienyl, $(C_4-C_{12})$diene, halogen, and $-CH_2SiR^C_3$; wherein each $R^c$ is selected from the group consisting $(C_1-C_{30})$hydrocarbyl or —H. In formula (I), subscript n of $(X)_n$ is 2. The metal-ligand complex of formula (I) has 6 or fewer metal-ligand bonds.

(I)

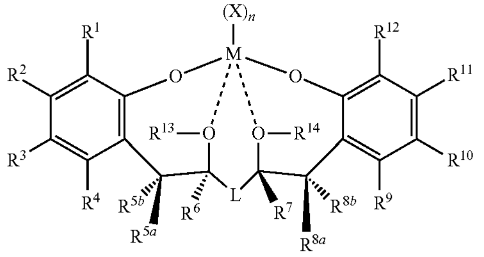

19 Claims, No Drawings

BIS-PHENOXY-ETHER LIGANDS FOR GROUP IV POLYOLEFIN CATALYSIS

CROSS-REFERENCE TO RELATED APPLICATIONS

This application is a National Stage Entry under 35 U.S.C. § 371 of International Patent Application No. PCT/US2022/017929, filed Feb. 25, 2022, which claims the benefit of and priority to U.S. Provisional Patent Application Ser. No. 63/153,978 filed on Feb. 26, 2021, the entire contents of both of which are incorporated by reference in the present disclosure.

TECHNICAL FIELD

Embodiments of the present disclosure generally relate to olefin polymerization catalyst systems and processes and, more specifically to bis-phenoxy-ether ligands and metal-ligand complexes formed from the bis-phenoxy-ether ligands.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also he added to the reactor. The catalyst systems for producing ethylene-based may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Ongoing needs exist for molecular olefin polymerization catalysts that can polymerize mixtures of ethylene and alpha-olefins that operate at high efficiencies (greater than 1,000,000 gpoly/gM) and temperatures (of greater than or equal to 150° C.).

Embodiments of this disclosure include one or more catalyst systems. The catalyst systems include one or more metal-ligand complexes according to formula (I):

(I)

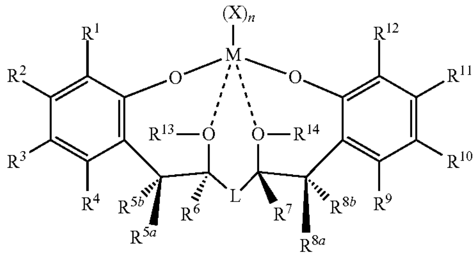

In formula (I), M is a metal chosen from titanium, zirconium, or hafnium, the metal having a formal oxidation state of +2, +3, or +4; each X is a monodentate or bidentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, cyclopentadienyl, substituted cyclopentadienyl, $(C_4\text{-}C_{12})$diene, halogen, and $—CH_2SiR^C_3$; wherein each $R^C$ is selected from the group consisting $(C_1\text{-}C_{30})$ hydrocarbyl or —H. In formula (I), subscript n of $(X)_n$ is 2. The metal-ligand complex of formula (I) has 6 or fewer metal-ligand bonds.

In one or more embodiments, the metal-ligand complex of formula (I) M is zirconium or hafnium; each X is independently chosen from unsubstituted $(C_1\text{-}C_{10})$alkyl, substituted $(C_1\text{-}C_{10})$alkyl, $(C_6\text{-}C_{20})$aryl or a halogen; and each $R^1$ is independently chosen from $(C_6\text{-}C_{50})$aryl or $(C_1\text{-}C_{50})$alkyl.

In embodiments, the dotted lines are optionally dative bonds between the metal center, M, and the oxygen, O. In some embodiments, one of the dotted lines connecting O and M is dative and the other dotted line does not form a dative bond between O and M. In various embodiments, both dotted lines form dative bonds between group O and M.

In formula (I), L is $(C_1\text{-}C_{10})$hydrocarbylene or a bond.

In formula (I), $R^1$ $R^2$, $R^3$, $R^4$, $R^9$, $R^{10}$, $R^{11}$, and $R^{12}$ is independently selected from the group consisting of —H, $(C_1\text{-}C_{40})$hydrocarbyl, $(C_1\text{-}C_{40})$heterohydrocarbyl, and halogen atom.

In formula (I), $R^{5a}$ and $R^{5b}$ and $R^{8a}$ and $R^{8b}$ is selected from —H, $(C_1\text{-}C_{40})$hydrocarbyl, $(C_6\text{-}C_{40})$heterohydrocarbyl, and halogen atom. In some embodiments, $R^{5a}$ and $R^{5b}$ can be linked to form a cyclic structure. In various embodiments, $R^{8a}$ and $R^{8b}$ can be linked to form a cyclic structure.

In formula (I), $R^6$ and $R^7$ is independently selected from —H, $(C_1\text{-}C_{50})$hydrocarbyl, and $(C_1\text{-}C_{50})$heterohydrocarbyl, wherein $R^6$ and $R^7$ can optionally combine together to form a cyclic structure. $R^{13}$ and $R^{14}$ is independently selected from $(C_1\text{-}C_{40})$hydrocarbyl and $(C_1\text{-}C_{40})$heterohydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; CV: column volume (used in column chromatography); EtOAc: ethyl acetate; TEA: triethylaluminum; MAO: methylaluminoxane; MMAO: modified methylaluminoxane; $LiCH_2TMS$: (trimethylsilyl)methyllithium; TMS: trimethylsilyl; $Pd(AmPhos)Cl_2$: Bis(di-tert-butyl(4-dimethylaminophenyl)phosphine)dichloropalladium(II); Pd(AmPhos): Chloro(crotyl)(di-tert-butyl(4-dimethylaminophenyephosphine)palladium(II); Pd(dppf)$Cl_2$: [1,1'-Bis(diphenylphosphino)ferrocene]palladium(II) dichloride; $ScCl_3$: scandium(III) chloride; PhMe: toluene; THF: tetrahydrofuran; $CH_2Cl_2$: dichloromethane; DMF: N,N-dimethylformamide; EtOAc: ethyl acetate; $Et_2O$: diethyl ether; MeOH: methanol; $NH_4Cl$: ammonium chloride; $MgSO_4$: magnesium sulfate; $Na_2SO_4$: sodium sulfate; NaOH: sodium hydroxide; brine: saturated aqueous sodium chloride; $SiO_2$: silica; $CDCl_3$: chloroform-D; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute; rt: room temperature.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{50}$)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "($C_x$-$C_y$)" parenthetical may contain more than y carbon atoms depending on the identity of any groups $R^S$. For example, a "($C_1$-$C_{50}$)alkyl substituted with exactly one group $R^S$, where $R^S$ is phenyl (—$C_6H_5$)" may contain from 7 to 56 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene (such as benzyl (—$CH_2$—$C_6H_5$)).

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{50}$)aryl" means an unsubstituted or substituted (by one or more $R^s$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl include: substituted ($C_1$-$C_{20}$)aryl; substituted ($C_6$-$C_{18}$)aryl; 2,4-bis([$C_{20}$]alkyl)-phenyl; polyfluorophenyl; pentafluorophenyl; and fluoren-9-one-1-yl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted $(C_3\text{-}C_{20})$cycloalkyl, substituted $(C_3\text{-}C_{10})$cycloalkyl, cyclopentamm-2-yl, and 1-fluorocyclohexyl.

Examples of $(C_1\text{-}C_{50})$hydrocarbyl ene include unsubstituted or substituted $(C_6\text{-}C_{50})$arylene, $(C_3\text{-}C_{50})$cycloalkylene, and $(C_1\text{-}C_{50})$alkylene (e.g., $(C_1\text{-}C_{20})$alkylene). The diradicals may be on the same carbon atom (e.g., $—CH_2—$) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2\text{-}C_{20})$alkylene α,ω-diradicals include ethan-1,2-diyl (i.e. $—CH_2CH_2—$), propan-1,3-diyl (i.e. $—CH_2CH_2CH_2—$), 2-methylpropan-1,3-diyl (i.e. $—CH_2CH(CH_3)CH_2—$). Some examples of $(C_6\text{-}C_{50})$ arylene α,ω-diradicals include phenyl-1,4-diyl, napthalen-2,6-diyl, or napthalen-3,7-diyl.

The term "$(C_1\text{-}C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1\text{-}C_{50})$alkylene are unsubstituted $(C_1\text{-}C_{20})$alkylene, including unsubstituted $—CH_2CH_2—$, $—(CH_2)_3—$, $—(CH_2)_4—$, $—(CH_2)_5—$, $—(CH_2)_6—$, $—(CH_2)_7—$, $—(CH_2)_8—$, $—CH_2C^*HCH_3$, and $—(CH_2)_4C^*(H)(CH_3)$, in which "C*" denotes a carbon atom from which a hydrogen atom is removed to form a secondary or tertiary alkyl radical. Examples of substituted $(C_1\text{-}C_{50})$alkylene are substituted $(C_1\text{-}C_{20})$alkylene, $—CF_2—$, $—C(O)—$, and $—(CH_2)_{14}C(CH_3)_2(CH_2)_5—$ (i.e., a 6,6-dimethyl substituted normal-1,20-eicosylene). Since as mentioned previously two $R^S$ may be taken together to form a $(C_1\text{-}C_{18})$ alkylene, examples of substituted $(C_1\text{-}C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3\text{-}C_{50})$cycloalkylene" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, $—N{=}C(R^C)_2$, $—Ge(R^C)_2—$, $—Si(R^C)—$, boron (B), aluminum (Al), gallium (Ga), or indium (In), where each $R^C$ and each $R^P$ is unsubstituted $(C_1\text{-}C_{18})$ hydrocarbyl or —H, and where each $R^N$ is unsubstituted $(C_1\text{-}C_{18})$hydrocarbyl. The term "heterohydrocarbon" refers to a molecule or molecular framework in which one or more carbon atoms of a hydrocarbon are replaced with a heteroatom. The term "$(C_1\text{-}C_{50})$heterohydrocarbyl" means a heterohydrocarbon radical of from 1 to 50 carbon atoms, and the term "$(C_1\text{-}C_{50})$heterohydrocarbylene" means a heterohydrocarbon diradical of from 1 to 50 carbon atoms. The heterohydrocarbon of the $(C_1\text{-}C_{50})$heterohydrocarbyl or the $(C_1\text{-}C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1\text{-}C_{50})$heterohydrocarbyl and $(C_1\text{-}C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1\text{-}C_{50})$heterohydrocarbyl may be unsubstituted or substituted. Non limiting examples of the $(C_1\text{-}C_{50})$heterohydrocarbyl include $(C_1\text{-}C_{50})$heteroalkyl, $(C_1\text{-}C_{50})$hydrocarbyl-O—, $(C_1\text{-}C_{50})$hydrocarbyl-S—, $(C_1\text{-}C_{50})$hydrocarbyl-S(O)—, $(C_1\text{-}C_{50})$hydrocarbyl-$S(O)_2$—, $(C_1\text{-}C_{50})$hydrocarbyl-$Si(R^C)_2$—, $(C_1\text{-}C_{50})$hydrocarbyl-$N(R^N)$—, $(C_1\text{-}C_{50})$ hydrocarbyl-$P(R^P)$—, $(C_2\text{-}C_{50})$heterocycloalkyl, $(C_2\text{-}C_{19})$ heterocycloalkyl-$(C_1\text{-}C_{20})$alkylene, $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$ heteroalkylene, $(C_1\text{-}C_{50})$heteroaryl, $(C_1\text{-}C_{19})$heteroaryl-$(C_1\text{-}C_{20})$alkylene, $(C_6\text{-}C_{20})$aryl-$(C_1\text{-}C_{19})$heteroalkylene, or $(C_1\text{-}C_{19})$heteroaryl-$(C_1\text{-}C_{20})$heteroalkylene.

The term "$(C_1\text{-}C_{50})$heteroaryl" means an unsubstituted or substituted (by one or more $R^S$) mono-, bis, or tricyclic heteroaromatic hydrocarbon radical of from 1 to 50 total carbon atoms and from 1 to 10 heteroatoms. A monocvclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x\text{-}C_y)$heteroaryl generally, such as $(C_1\text{-}C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, 3, or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1\text{-}C_{50})$heteroalkyl" means a saturated straight or branched chain radical containing one to fifty carbon atoms and one or more heteroatom. The term "$(C_1\text{-}C_{50})$heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2\text{-}C_{40})$heterocycloalkyl include unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include one or more catalyst systems. The catalyst systems include one or more metal-ligand complexes according to formula (I):

(I)

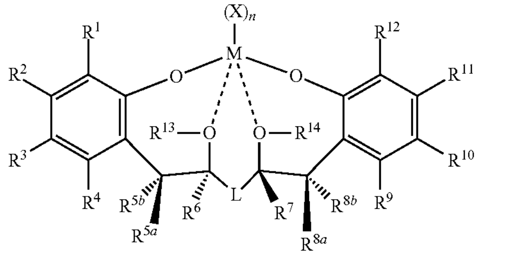

In formula (I), M is a metal chosen from titanium, zirconium, or hafnium, the metal having a formal oxidation state of +2, +3, or +4; each X is a monodentate or bidentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, cyclopentadienyl, substituted cyclopentadienyl, $(C_4\text{-}C_{12})$diene, halogen, and $—CH_2SiR^C_3$; wherein each $R^C$ is selected from the group consisting $(C_1\text{-}C_{30})$ hydrocarbyl or —H. In formula (I), subscript n of $(X)_n$ is 2. The metal-ligand complex of formula (I) has 6 or fewer metal-ligand bonds.

In one or more embodiments, the metal-ligand complex of formula (I) M is zirconium or hafnium; each X is independently chosen from unsubstituted $(C_1\text{-}C_{10})$alkyl, substituted $(C_1\text{-}C_{10})$alkyl, $(C_6\text{-}C_{20})$aryl or a halogen; and each $R^1$ is independently chosen from $(C_6\text{-}C_{50})$aryl or $(C_1\text{-}C_{50})$alkyl.

In embodiments, the dotted lines are optionally dative bonds between the metal center, M, and the oxygen, O. In some embodiments, one of the dotted lines connecting O and M is dative and the other dotted line does not form a dative bond between O and M. In various embodiments, both dotted lines form dative bonds between group O and M.

In embodiments, in formula (I), L is $(C_1\text{-}C_{10})$hydrocarbylene or a bond.

In one or more embodiments, L includes from 1 to 10 atoms.

In some embodiments of formula (I), the L may be chosen from $(C_3\text{-}C_7)$alkyl 1,3-diradicals, such as $—CH_2CH_2CH_2—$, $—CH(CH_3)CH_2C^*H(CH_3)$, $—CH(CH_3)CH(CH_3)C^*H(CH_3)$, $—CH_2C(CH_3)_2CH_2—$, cyclopentan-1,3-diyl, or cyclohexan-1,3-diyl, for example. In some embodiments, the L may be chosen from $(C_4\text{-}C_{10})$ alkyl 1,4-diradicals, such as $—CH_2CH_2CH_2CH_2—$, $—CH_2C(CH_3)_2C(CH_3)_2CH_2—$, cyclohexane-1,2-diyldimethyl, and bicyclo[2.2.2]octane-2,3-diyldimethyl, for example. In some embodiments, L may be chosen from $(C_5\text{-}C_{12})$alkyl 1,5-diradicals, such as $—CH_2CH_2CH_2CH_2CH_2—$, and 1,3-bis(methylene)cyclohexane. In some embodiments, L may be chosen from $(C_6\text{-}C_{14})$alkyl 1,6-diradicals, such as $—CH_2CH_2CH_2CH_2CH_2CH_2—$ or 1,2-bis(ethylene)cyclohexane, for example.

In formula (I), $R^1$ $R^2$, $R^3$, $R^4$, $R^9$, $R^{10}$, $R^{11}$, and $R^{12}$ is independently selected from the group consisting of —H, $(C_1\text{-}C_{40})$hydrocarbyl, $(C_1\text{-}C_{40})$heterohydrocarbyl, and halogen atom.

In formula (I), $R^{5a}$ and $R^{5b}$ and $R^{8a}$ and $R^{8b}$ is selected from —H, $(C_1\text{-}C_{40})$hydrocarbyl, $(C_6\text{-}C_{40})$heterohydrocarbyl, and halogen atom. In some embodiments, $R^{5a}$ and $R^{5b}$ can be linked to form a cyclic structure. In various embodiments, $R^{8a}$ and $R^{8b}$ can be linked to form a cyclic structure.

In formula (I), $R^6$ and $R^7$ is independently selected from —H, $(C_1\text{-}C_{50})$hydrocarbyl, and $(C_1\text{-}C_{50})$heterohydrocarbyl, wherein $R^6$ and $R^7$ can optionally combine together to form a cyclic structure. $R^{13}$ and $R^{14}$ is independently selected from $(C_1\text{-}C_{40})$hydrocarbyl and $(C_1\text{-}C_{40})$heterohydrocarbyl.

In some embodiments, $R^{13}$ and $R^{14}$ is $(C_1\text{-}C_{12})$alkyl, substituted phenyl, unsubstituted phenyl, substituted benzyl, or unsubstituted benzyl.

In one or more embodiments, $R^1$ and $R^{12}$ a substituted phenyl or unsubstituted phenyl. wherein $R^1$ and $R^{12}$ is 2,4,6-trimethylphenyl or 3,5-di-tert-butylphenyl.

In various embodiments, $R^1$ and $R^{12}$ is a substituted or unsubstituted anthracenyl. In some embodiments, $R^1$ and $R^{12}$ is di-tert-butylanthracenyl.

In various embodiments, $R^{5a}$, $R^{5b}$, $R^{8a}$, and $R^{8b}$ is —H. In other embodiments, $R^{5a}$, $R^{5b}$, $R^{8a}$, and $R^{8b}$ is $(C_1\text{-}C_{12})$alkyl. In one or more embodiments, at least one of $R^{5a}$, $R^{5b}$, $R^{8a}$, and $R^{8b}$ is $(C_1\text{-}C_{12})$alkyl. In some embodiments, one of $R^{5a}$ and $R^{5b}$ is $(C_1\text{-}C_{12})$alkyl and one of $R^{8a}$ and $R^{8b}$ is $(C_1\text{-}C_{12})$ alkyl. In some embodiments, one of $R^{5a}$ and $R^{5b}$ is $(C_1\text{-}C_{12})$ alkyl or one of $R^{8a}$ and $R^{8b}$ is $(C_1\text{-}C_{12})$alkyl. In some embodiments, one of $R^{5a}$ and $R^{5b}$ is methyl and one of $R^{8a}$ and $R^{8b}$ is methyl.

In embodiments, $R^3$ and $R^{10}$ a substituted phenyl or unsubstituted phenyl.

Examples of such $(C_1\text{-}C_{12})$alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, $(C_1\text{-}C_{40})$hydrocarbyl carbanion, $(C_1\text{-}C_{40})$heterohydrocarbyl carbanion, halide, nitrate, carbonate, phosphate, sulfate, $HC(O)O^-$, $HC(O)N(H)^-$, $(C_1\text{-}C_{40})$hydrocarbylC(O)$O^-$, $(C_1\text{-}C_{40})$hydrocarbylC(O)N($(C_1\text{-}C_{20})$hydrocarbyl$)^-$, $(C_1\text{-}C_{40})$hydrocarbylC(O)N(H$)^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1\text{-}C_{40})$hydrocarbyl, or $(C_1\text{-}C_{40})$heterohydrocarbyl, or $R^K$ and $R^L$ are taken together to form a $(C_2\text{-}C_{40})$hydrocarbylene or $(C_1\text{-}C_{20})$heterohydrocarbylene and $R^M$ is as defined above.

In some embodiments, X is a halogen, unsubstituted $(C_1\text{-}C_{20})$hydrocarbyl, unsubstituted $(C_1\text{-}C_{20})$hydrocarbylC(O)O—, or $R^KR^LN$—, wherein each of $R^K$ and $R^L$ independently is an unsubstituted$(C_1\text{-}C_{20})$hydrocarbyl. In some embodiments, each monodentate ligand X is a chlorine atom, $(C_1\text{-}C_{10})$hydrocarbyl (e.g., $(C_1\text{-}C_6)$alkyl or benzyl), unsubstituted $(C_1\text{-}C_{10})$hydrocarbylC(O)O—, or $R^KR^LN$—, wherein each of $R^K$ and $R^L$ independently is an unsubstituted $(C_1\text{-}C_{10})$hydrocarbyl.

In one or more embodiments X is $—(CH_2)Si(CH_3)_3$, $—(CH_2)Si(CH_3)_2(CH_2CH_3)$; $—(CH_2)Si(CH_3)(CH_2CH_3)_2$, $—(CH_2)Si(CH_2CH_3)_3$, $—(CH_2)Si(CH_3)_2$(n-butyl), $—(CH_2)Si(CH_3)_2$(n-hexyl), $—(CH_2)Si(CH_3)$(n-Oct)$R^X$, $—(CH_2)Si$(n-Oct)$R^X_2$, $—(CH_2)Si(CH_3)_2$(2-ethylhexyl), $—(CH_2)Si(CH_3)_2$(dodecyl), $—CH_2Si(CH_3)_2CH_2Si(CH_3)_3$ (herein referred to as $—CH_2Si(CH_3)_2CH_2$TMS). Optionally, in some embodiments, the metal-ligand complex according to formula (I), exactly two $R^X$ are covalently linked or exactly three $R^X$ are covalently linked.

In some embodiments, each X is independently $(C_1\text{-}C_{12})$alkyl, phenyl, benzyl, halogen atom, or $—CH_2Si[(C_1\text{-}C_{20})alkyl]_3$.

In some embodiments, X is $—CH_2Si(R^C)_{3-Q}(OR^C)_Q$, $—Si(R^C)_{3-Q}(OR^C)_Q$, $—OSi(R^C)_{3-Q}(OR^C)_Q$, in which subscript Q is 0, 1, 2 or 3 and each $R^C$ is independently a substituted or unsubstituted $(C_1\text{-}C_{30})$hydrocarbyl, or a substituted or unsubstituted $(C_1\text{-}C_{30})$heterohydrocarbyl.

Embodiments of this disclosure includes polymerization processes. The polymerization processes include polymerizing ethylene and one or more olefins in the presence of a catalyst system under olefin polymerization conditions to form an ethylene-based polymer, the catalyst system comprising a metal-ligand complex according to formula (I).

In illustrative embodiments, the ligands used to form the metal-ligand complexes according to formula (I) having the structure of any of the Ligand 1-25 listed below:

Ligand 1

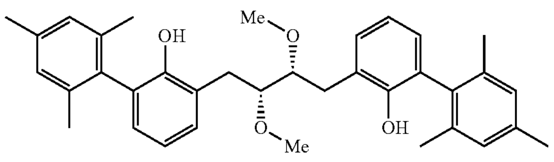

Ligand 2

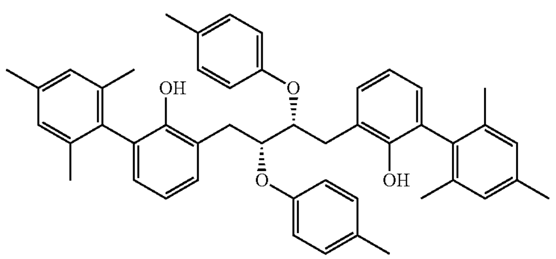

Ligand 3

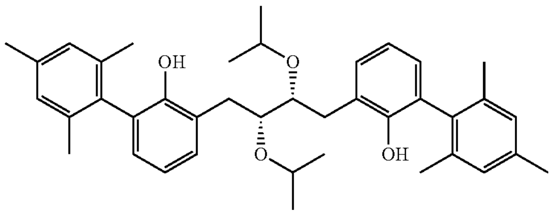

Ligand 4

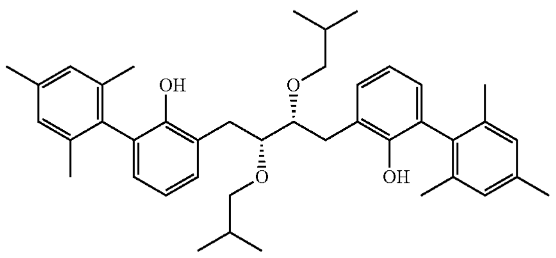

Ligand 5

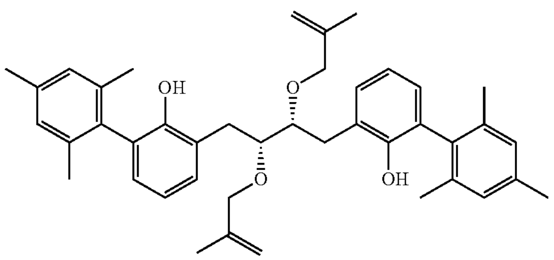

Ligand 6

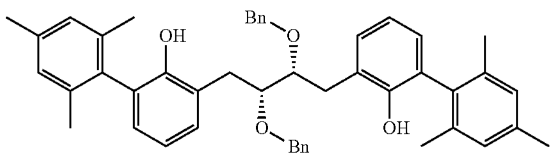

-continued
Ligand 7
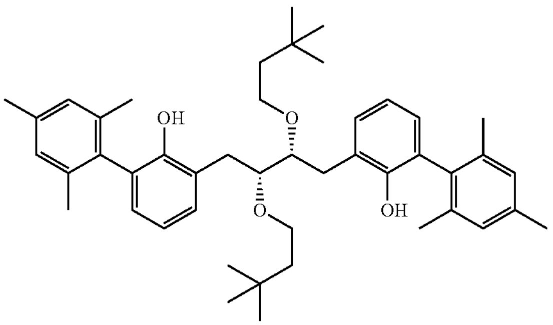
Ligand 8
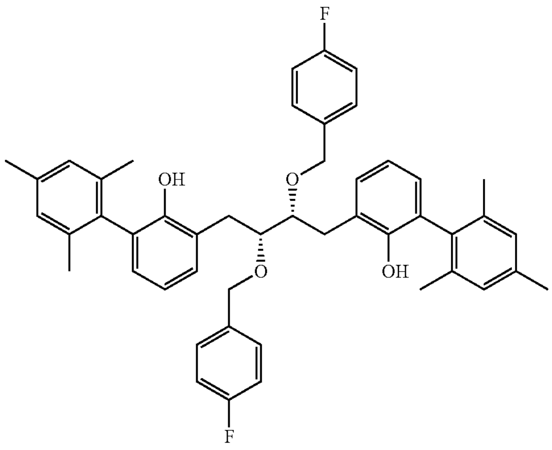
Ligand 9
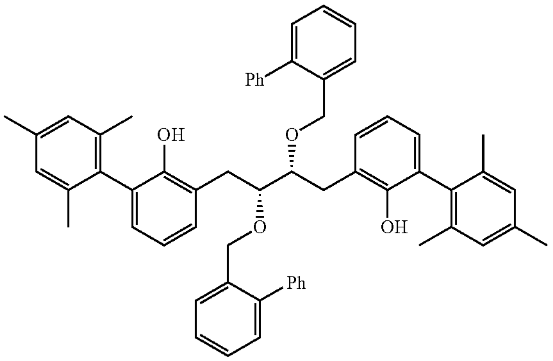
Ligand 10
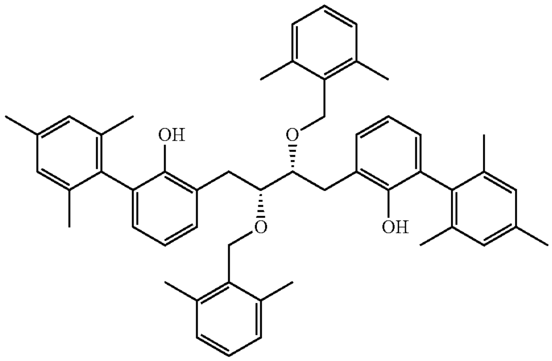
Ligand 11
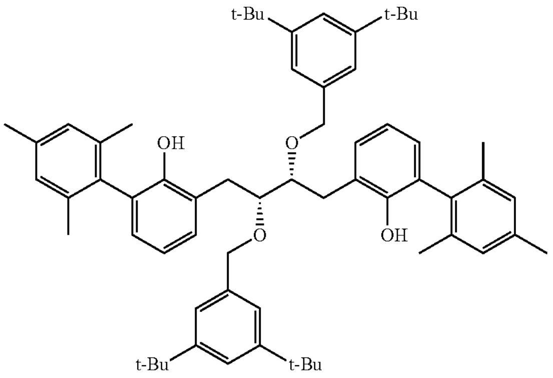
Ligand 12
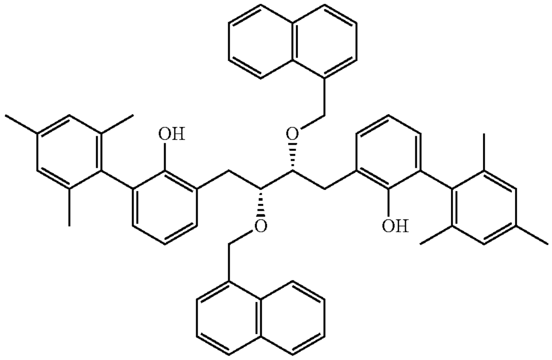

-continued
Ligand 13
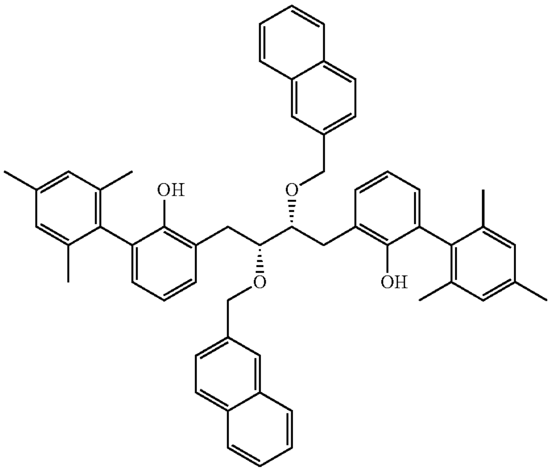
Ligand 14
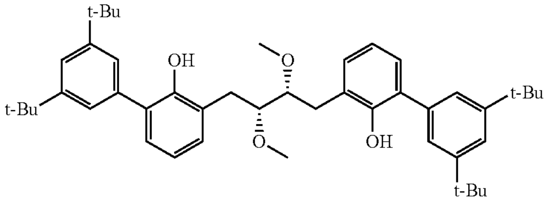
Ligand 15
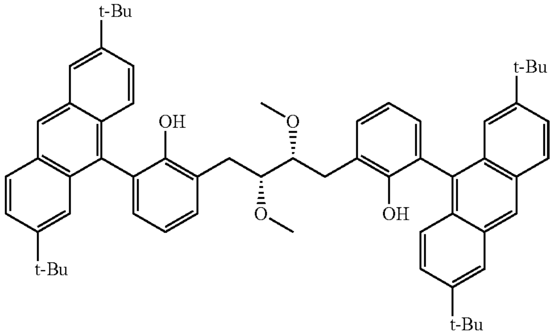
Ligand 16
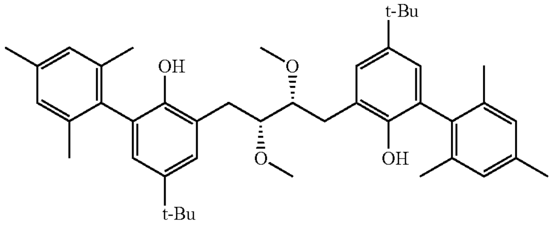
Ligand 17
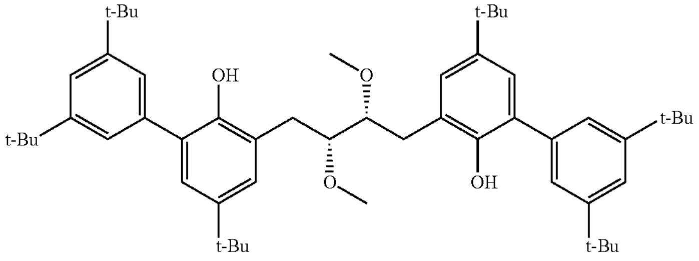
Ligand 18
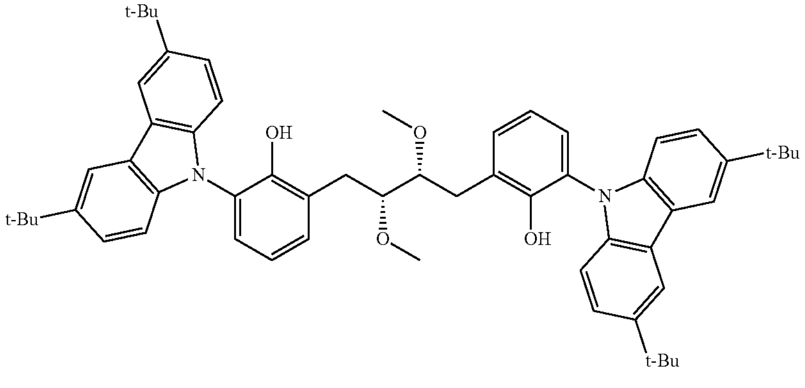

-continued

Ligand 18

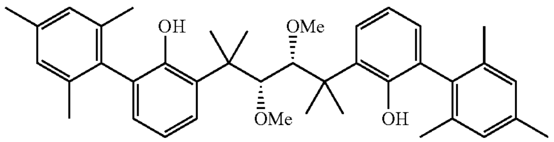

Ligand 20

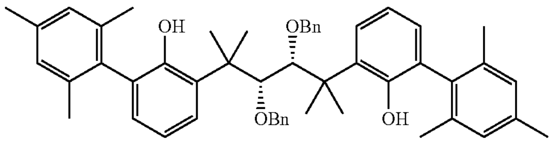

Ligand 21

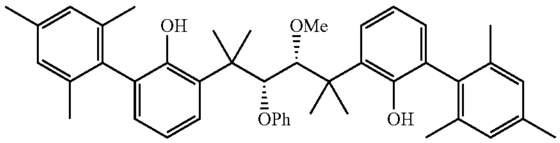

Ligand 22

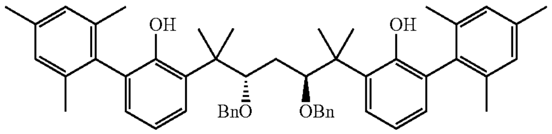

Ligand 23

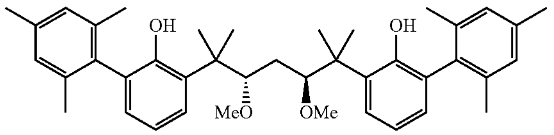

Ligand 24

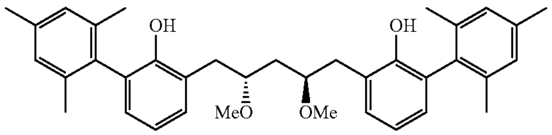

Ligand 25

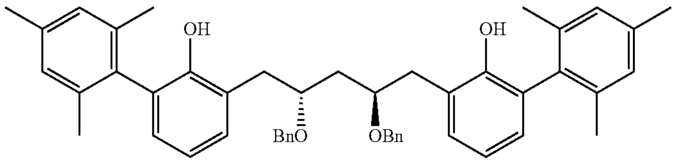

According to formula (I), if Ligands 1 to 21 are coupled with a metal center, M, then group L of formula (I) would be a single bond connecting the carbon atoms adjacent to the L group ($—C(R^6)(OR^{13})—C(R^7)(OR^{14})—$). For purposes of this disclosure, Ligands 1 to 21 are called four-carbon tether ligands and include four carbon atoms connecting the arene. If Ligands 22 to 25 are coupled with a metal center, M, then group L of formula (I) would be methylene ($—CH_2—$). For purposes of this disclosure, Ligand 22 to 25 are called five-carbon tether ligands and include five carbon atoms connecting the arene.

In illustrative embodiments, the catalyst systems may include a metal-ligand complex according to formula (I) having the structure of any of the Metal-Ligand 1-16 listed below:

Metal-Ligand Complex 1

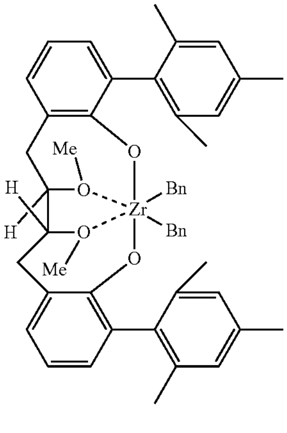

-continued

Metal-Ligand Complex 2

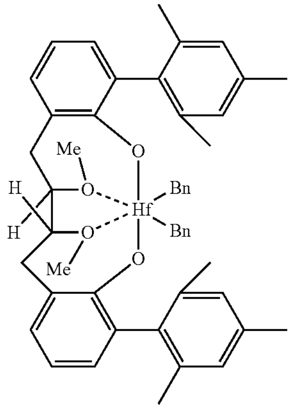

Metal-Ligand Complex 3

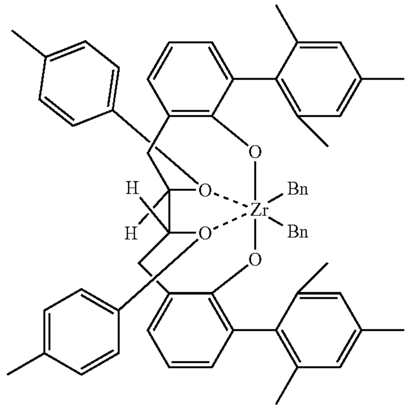

-continued
Metal-Ligand Complex 4
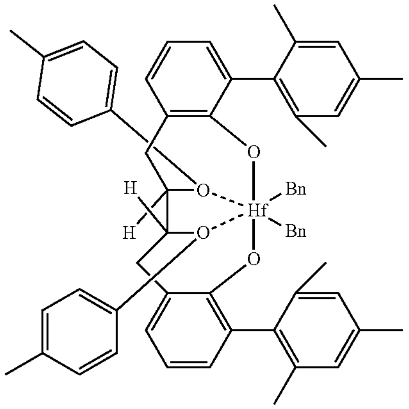
Metal-Ligand Complex 5
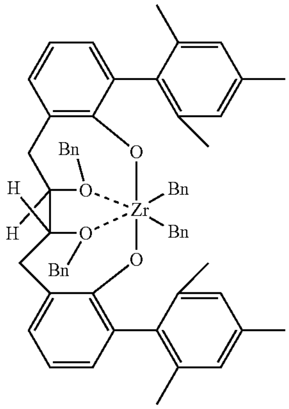
Metal-Ligand Complex 6
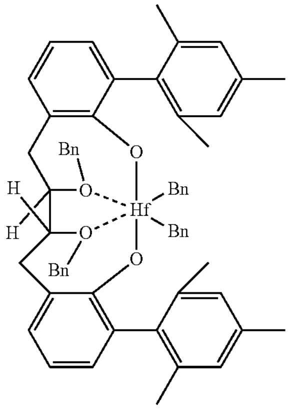
-continued
Metal-Ligand Complex 7
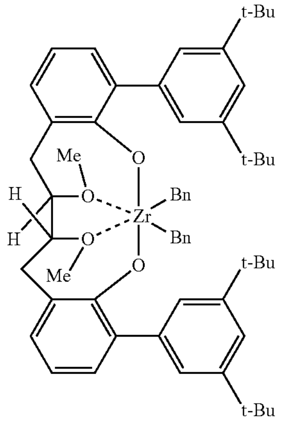
Metal-Ligand Complex 8
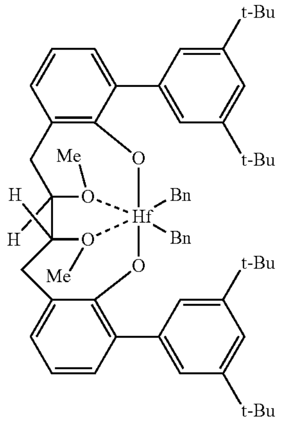
Metal-Ligand Complex 9
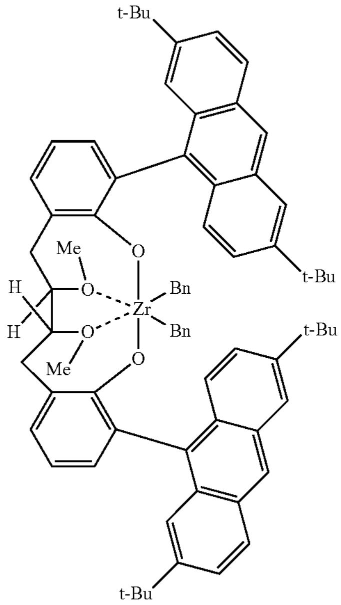

-continued
Metal-Ligand Complex 10
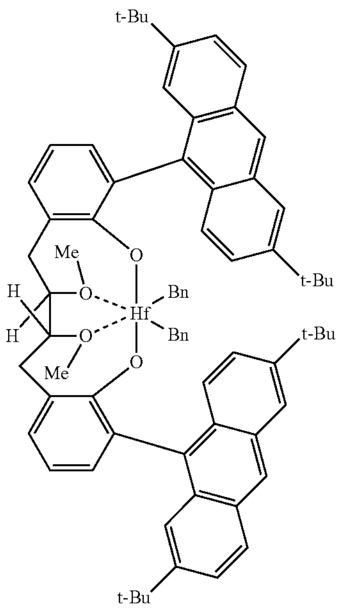
Metal-Ligand Complex 11
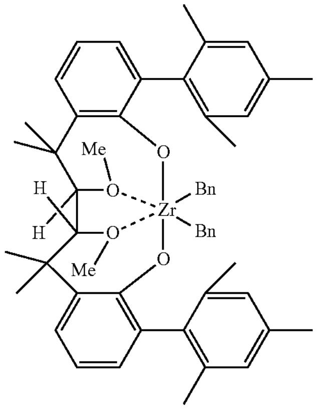
Metal-Ligand Complex 12
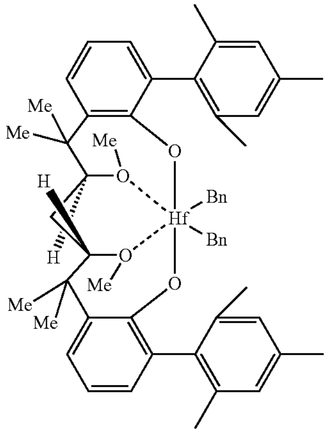
-continued
Metal-Ligand Complex 13
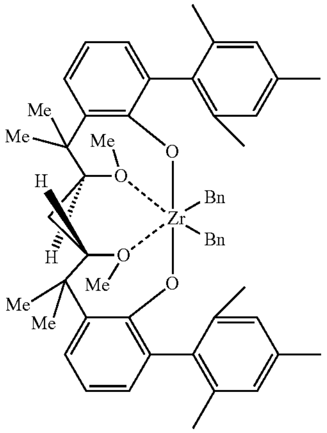
Metal-Ligand Complex 14
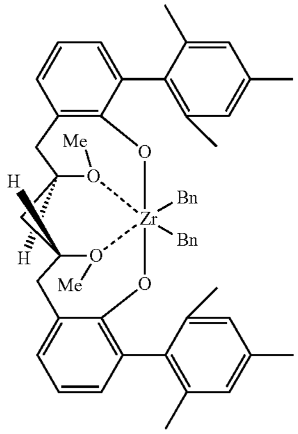
Metal-Ligand Complex 15
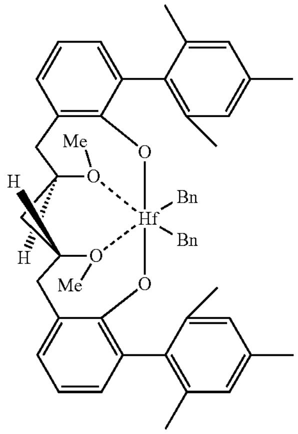

-continued

Metal-Ligand Complex 16

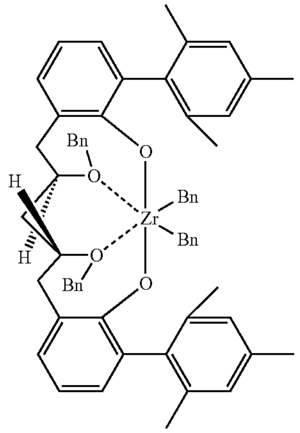

One or more embodiments of this disclosure include processes for polymerizing polymers, the process comprising: contacting ethylene and optionally one or more ($C_3$-$C_{12}$)α-olefins in the presence of a catalyst system in a reactor. The catalyst system may include procatalyst according to the metal-ligand complex of formula (I) and an activator. The polymerization processes may include, but are not limited to, solution polymerization process, gas phase polymerization process, slurry phase polymerization process, and combinations thereof using one or more reactors such as loop reactors, isothermal reactors, fluidized bed gas phase reactors, continuous stirred tank reactors, batch reactors in parallel, series, and/or any combinations thereof.

The polymerization process of this disclosure may procure ethylene based polymers, for example homopolymers and/or interpolymers (including copolymers) of ethylene and optionally one or more comonomers such as a-olefins may, for example, be produced via solution-phase polymerization process using one or more loop reactors, isothermal reactors, and combinations thereof.

In some embodiments, the solution phase polymerization process occurs in one or more well-stirred reactors such as one or more loop reactors or one or more spherical isothermal reactors at a temperature in the range of from 120 to 300° C.; for example, from 150 to 190° C., and at pressures in the range of from 300 to 1500 psi; for example, from 400 to 750 psi. The residence time in solution phase polymerization process is typically in the range of from 2 to 30 minutes; for example, from 10 to 20 minutes. Ethylene, one or more solvents, one or more catalyst systems, such as catalyst system that includes a procatalyst according to the metal-ligand complex of formula (I), optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Texas. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

In some embodiments, suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis (pentafluorophenyl)borate(1-) amine (RIBS-2), triethyl aluminum (TEA), and combinations thereof.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris (pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl) ammonium tetra(($C_1$-$C_{20}$)hydrocarbyl)borane (e.g. bis(octadecyl) methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-l-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 0.5 mole percent (mol %) to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

High-Throughput Parallel Polymerization Reactor Polyerization Procedure (PPR) Screening Polyolefin catalysis screening is performed in a high-throughput parallel polymerization reactor (PPR) system. The PPR system comprises an array of 48 single-cell (6×8 matrix) reactors in an inert atmosphere glovebox. Each cell is equipped with a glass insert with an internal working liquid volume of approximately 5 mL. Each cell has independent controls for pressure and is continuously stirred at 800 rpm. Catalyst solutions, unless otherwise noted, are prepared in toluene. All liquids (i.e., solvent, 1-octene, chain shuttling agent solutions, and catalyst solutions) were added via robotic syringes. Gaseous reagents (i.e., ethylene, CO) were added via a gas injection port. Prior to each run, the reactors were heated to 80° C., purged with ethylene, and vented.

The reactors are heated to the run temperature and then pressurized to the appropriate psig with ethylene. Isopar E waiss added, and then toluene solutions of reagents are added in the following order: (1) 1-octene with 500 nmol of scavenger MMAO-3A; (2) Activator (RIBS-II, FAB, etc.); and (3) Catalyst (100 nmol).

Each liquid addition is chased with a small amount of Isopar E so that after the final addition a total reaction volume of 5 mL is reached. Upon addition of the catalyst, the PPR software began monitoring the pressure of each cell. The desired pressure (within approximately 2-6 psig) was maintained by the supplemental addition of ethylene gas by opening the valve at the set point minus 1 psi and closing it when the pressure reaches 2 psi higher. All drops in pressure are cumulatively recorded as "Uptake" or "Conversion" of the ethylene for the duration of the run or until the uptake or conversion requested value is reached, whichever occurred first. Each reaction is then quenched by addition of 10% carbon monoxide in argon for 4 minutes at 40-50 psi higher than the reactor pressure. The shorter the "Quench Time", the more active the catalyst. In order to prevent the formation of too much polymer in any given cell, the reaction is quenched upon reaching a predetermined uptake level (50 psig for 120° C. runs, 75 psig for 150° C. runs). After the reactors were quenched, they were allowed to cool to 70° C., vented, purged for 5 minutes with nitrogen to remove carbon monoxide, and the tubes were removed. The polymer samples are then dried in a centrifugal evaporator at 70° C. for 12 hours, weighed to determine polymer yield, and submitted for IR (1-octene incorporation) and GPC (molecular weight) analysis.

Batch Reactor Polyerization Procedure

The batch reactor polymerizations are conducted in a 2-L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve, which empties the reactor contents into a stainless-steel dump pot, which is prefilled with a catalyst kill solution (typically 5 mL of an Irgafos/Irganox/toluene mixture). The dump pot is vented to a 30-gal. blow-down tank, with both the pot and the tank purged with nitrogen. All solvents used for polymerization or catalyst makeup are run through solvent purification columns to remove any impurities that may affect polymerization. The 1-octene and Isopar E are passed through two columns, the first containing activated A2 alumina, the second containing activated Q5 reactant. The ethylene was passed through two columns, the first containing A204 alumina and 4 Å mol sieves, the second containing Q5 reactant. The $N_2$, used for transfers, is passed through a single column containing A204 alumna, 4 Å mol sieves and Q5.

The reactor is loaded first from the shot tank that contains Isopar E solvent and/or 1-octene, depending on desired reactor loading. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a solution of the desired molarity. The catalyst and activators were handled in an inert glove box, drawn into a syringe and pressure transferred into the catalyst shot tank. This was followed by three rinses of toluene, 5-mL each. Immediately after catalyst addition the run timer began. If ethylene was used, it was then added by the Camile to maintain reaction the pressure set point in the reactor. These polymerizations are run for 10 min., then the agitator is stopped and the bottom dump valve is opened to empty reactor contents into the dump pot. The dump pot contents are poured into trays placed in a lab hood where the solvent was evaporated off overnight. The trays containing the remaining polymer were then transferred to a vacuum oven, where they were heated up to 140° C. under vacuum to remove any remaining solvent. After the trays cooled to ambient temperature, the polymers were weighed for yield/efficiencies, and submitted for polymer testing.

HT-GPC Analysis with IR Detection of Octene Incorporation

High-temperature GPC analysis was performed using a Dow Robot Assisted Delivery (RAD) system equipped with a PolymerChar infrared detector (IR5) and Agilent PLgel Mixed A columns. Decane (10 μL) was added to each sample for use as an internal flow marker. Samples were first diluted in 1,2,4-trichlorobenzene (TCB) stabilized with 300 ppm of butylated hydroxytoluene (BHT) to a concentration of 10 mg/mL and dissolved by stirring at 160° C. for 120 minutes. Prior to injection samples were further diluted with TCB stabilized with BHT to a concentration of 2 mg/mL. Samples (250 μL) were eluted through one PL-gel 20 μm (50×7.5 mm) guard column followed by two PL-gel 20 μm (300×7.5 mm) Mixed-A columns maintained at 160° C. with TCB stabilized with BHT at a flowrate of 1.0 mL/min. The total run time was 24 minutes. To calibrate for molecular weight Agilent EasiCal polystyrene standards (PS-1 and PS-2) were diluted with 1.5 mL of TCB stabilized with BHT and dissolved by stirring at 160° C. for 15 minutes. The PS standards were injected into the system without further dilution to create a $3^{rd}$-order MW calibration curve with apparent units adjusted to homo-polyethylene (PE) using known Mark-Houwink coefficients for PS and PE. Octene incorporation was determined by use of a linear calibration developed by analyzing copolymers of known compositions.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

High-temperature GPC analysis was performed using a Dow Robot Assisted Delivery (RAD) system equipped with a PolymerChar infrared detector (IRS) and Agilent PLgel Mixed A columns. Decane (10 μL) was added to each sample for use as an internal flow marker. Samples were first diluted in 1,2,4-trichlorobenzene (TCB) stabilized with 300 ppm of butylated hydroxytoluene (BHT) to a concentration of 10 mg/mL and dissolved by stirring at 160° C. for 120 minutes. Prior to injection samples were further diluted with TCB stabilized with BHT to a concentration of 2 mg/mL. Samples (250 μL) were eluted through one PL-gel 20 μm (50×7.5 mm) guard column followed by two PL-gel 20 μm (300×7.5 mm) Mixed-A columns maintained at 160° C. with TCB stabilized with BHT at a flowrate of 1.0 mL/min. The total run time was 24 minutes. To calibrate for molecular weight Agilent EasiCal polystyrene standards (PS-1 and PS-2) were diluted with 1.5 mL of TCB stabilized with BHT and dissolved by stirring at 160° C. for 15 minutes. The PS standards were injected into the system without further dilution to create a $3^{rd}$-order MW calibration curve with apparent units adjusted to homo-polyethylene (PE) using known Mark-Houwink coefficients for PS and PE. Octene incorporation was determined by use of a linear calibration developed by analyzing copolymers of known compositions

EXAMPLES

Example 1 is synthetic procedures for ligand intermediates, ligands, and isolated procatalysts Structures of Ligands 1-25. Metal-ligand Complex 1 to Metal-ligand Complex 16 (MLC-1 to MLC-16) were synthesized from the Ligands 1-25. In Examples 2, 3, and 4, the results of the polymerization reactions of MLC-1 to MLC-16 and metal-ligand complexes produced in situ are tabulated and discussed. One or more features of the present disclosure are illustrated in view of the examples as follows:

Example 1—Synthesis of Ligands and Complexes

Scheme 1. Synthesis of Diol 10

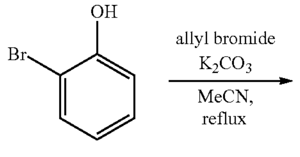

6

-continued

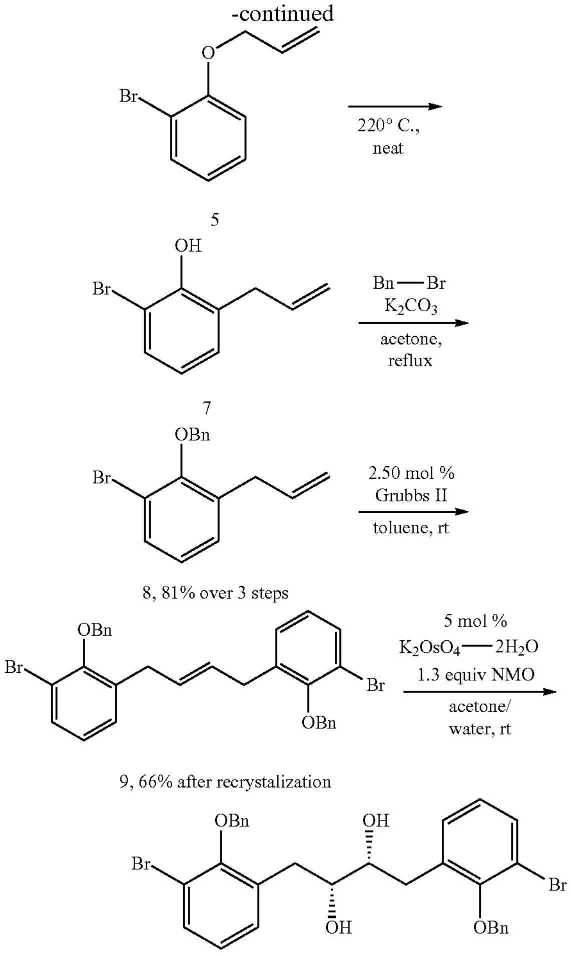

10, 56%

Synthesis of 1-allyl-2-(benzyloxy)-3-bromobenzene [Compound 8]

A 1 L round bottom flask was charged with 2-bromophenol (15.6 mL, 150 mmol, 1.00 equiv), 500 mL acetonitrile, potassium carbonate (41.46 g, 300 mmol, 2.00 equiv), and allyl bromide (14.3 mL, 165 mmol, 1.10 equiv). A reflux condenser was attached, and the mixture was stirred at 80° C. for 2 hours. TLC showed complete consumption of starting material. The slurry was filtered, and the filtrate concentrated to an amber oil. Proton/carbon NMR confirmed the allyl ether intermediate.

The allyl ether was placed in a 500 mL round bottom flask and was heated to 220° C. under nitrogen. The liquid stirred at this temperature for 3 hours. The liquid was cooled, and a sample removed for Proton NMR, which confirmed that the rearrangement had occurred.

The dark liquid was dissolved in 250 mL acetone, and was treated with potassium carbonate (41.46 g, 300 mmol, 2.00 equiv) and benzyl bromide (18.7 mL, 158 mmol, 1.05 equiv). A reflux condenser was attached, and the mixture was allowed to stir at 60° C. under a blanket of nitrogen overnight.

The dark solution was filtered, and the filtrate was concentrated. The residue was purified by chromatography on silica gel (0 to 20% EtOAc in hexane). 36.662 g of a colorless oil was isolated (81% yield over 3 steps).

$^1$H NMR (500 MHz, $CDCl_3$) δ 7.58-7.50 (m, 2H), 7.47-7.33 (m, 4H), 7.14 (dd, J=7.6, 1.6 Hz, 1H), 6.96 (t, J=7.8 Hz, 1H), 5.92 (ddt, J=16.7, 10.1, 6.5 Hz, 1H), 5.15-5.01 (m, 2H), 4.96 (s, 2H), 3.43 (dt, J=6.6, 1.5 Hz, 2H).

$^{13}$C NMR (126 MHz, $CDCl_3$) δ 153.74, 136.95, 136.62, 135.68, 131.67, 129.70, 128.52, 128.20, 128.11, 125.54, 117.80, 116.42, 74.99, 34.46.

Synthesis of (E)-1,4-bis(2-(benzyloxy)-3-bromophenyl)but-2-ene [Compound 9]

In a glovebox, a 40 mL vial was charged with 8 (1.00 g, 3.30 mmol, 1.00 equiv). Grubbs Second Generation Catalyst (70 mg, 0.083 mmol, 2.50 mol %) was dissolved in about 1 mL toluene, and this was added to the vial containing the alkene. The vial was allowed to stir at ambient temperature in the glovebox, uncapped, for 1 hour. The vial was heated to 110° C. for 3 minutes, and was returned to ambient temperature for another hour. Proton NMR indicated that consumption of starting material was nearly complete.

The vial was removed from the glovebox, and the solution was mixed with some silica. Solvent was removed, and the solid was dry-loaded for column chromatography (0 to 10% EtOAc in hexane). 0.922 g of a colorless oil was isolated. The product was recrystallized from ethanol to give 0.630 g of a white solid (66%).

$^1$H NMR (500 MHz, $CDCl_3$) δ 7.49-7.42 (m, 6H), 7.38-7.33 (m, 6H), 7.14-7.08 (m, 2H), 6.96-6.91 (m, 2H), 5.56 (td, J=3.6, 1.9 Hz, 2H), 4.92 (s, 4H), 3.41-3.33 (m, 4H).

$^{13}$C NMR (126 MHz, $CDCl_3$) δ 153.64, 136.88, 136.12, 131.56, 130.05, 129.57, 128.46, 128.12, 127.98, 125.51, 117.76, 74.90, 33.22.

Synthesis of rac-(2R,3R)-1,4-bis(2-(benzyloxy)-3-bromophenyl)butane-2,3-diol [Compound 10]

A 250 mL round bottom flask was charged with NMO (1.02 g, 8.71 mmol, 2.02 equiv) and 25 mL water. The mixture was stirred, and potassium osmate dehydrate (80 mg, 5 mol %) was added in a single portion. The mixture stirred for 1 minute before addition of alkene 9 (2.50 g, 4.32 mmol, 1.00 equiv) in 50 mL acetone. The organic product precipitated upon addition to the aqueous oxidant. The flask was sealed and stirred at ambient temperature for 14 hours. The solids slowly began to dissolve after overnight stirring, though a few small particles remained.

The solution was diluted with dichloromethane and quenched with aqueous sodium sulfite. Product was extracted with a few portions of dichloromethane. Combined organic fractions were concentrated and purified by chromatography on silica gel (0 to 50% EtOAc in hexane). 1.765 g of product was isolated as a colorless oil. Proton NMR showed product with some ethyl acetate (56% accounting for EtOAc).

$^1$H NMR (500 MHz, $CDCl_3$) δ 7.46 (dt, J=8.0, 2.0 Hz, 6H), 7.40-7.34 (m, 6H), 7.11 (dd, J=7.7, 1.6 Hz, 2H), 6.93 (t, J=7.8 Hz, 2H), 5.01-4.89 (m, 4H), 3.58 (q, J=5.7 Hz, 2H), 2.80 (qd, J=13.7, 6.6 Hz, 4H), 2.51 (d, J=5.9 Hz, 2H).

$^{13}$C NMR (126 MHz, $CDCl_3$) δ 154.04, 136.43, 134.02, 132.19, 130.65, 128.61, 128.42, 128.26, 125.79, 117.61, 75.25, 73.43, 35.22.

Scheme 2. Synthesis of Diol 13

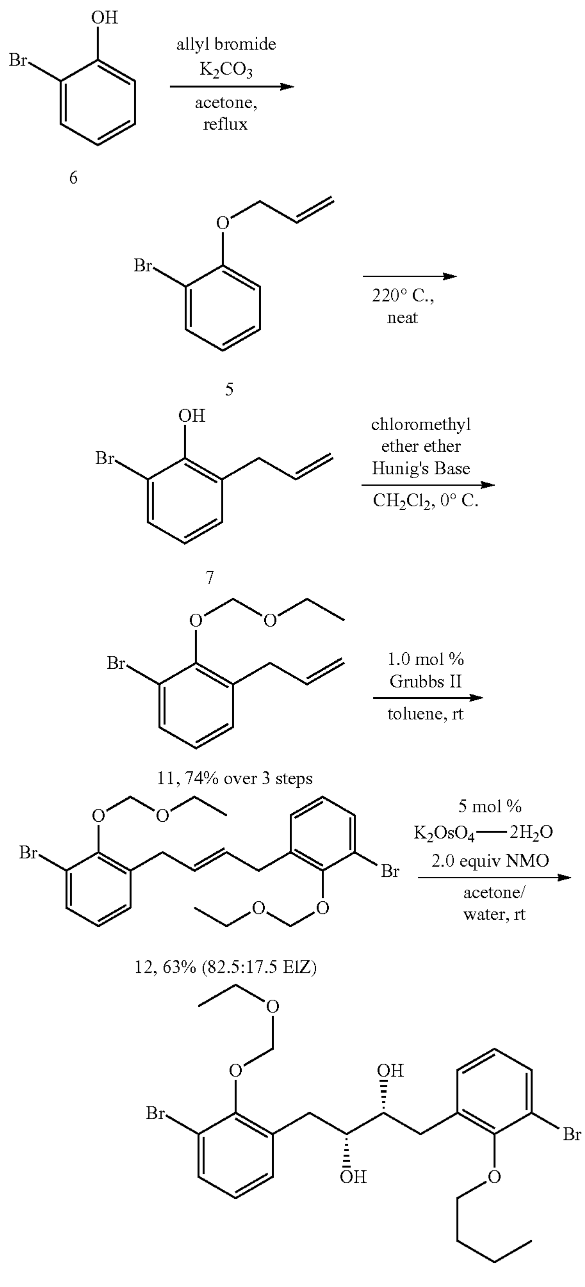

6

5

7

11, 74% over 3 steps 12, 63% (82.5:17.5 ElZ)

13, 94% (85:15 dr)

Synthesis of 1-allyl-3-bromo-2-(ethoxymethoxy)benzene [Compound 11]

A 1 L round bottom flask was charged with 2-bromophenol (50.0 g, 289 mmol, 1.00 equiv), 550 mL acetone, potassium carbonate (79.89 g, 578 mmol, 2.00 equiv), and allyl bromide (27.5 mL, 318 mmol, 1.10 equiv). A reflux condenser was attached, and the mixture was stirred at 60° C. for 2 hours. TLC showed complete consumption of starting material. The slurry was filtered, and the filtrate concentrated to an amber oil.

The allyl ether was placed in a 1 L round bottom flask and was heated to 220° C. under nitrogen. The liquid stirred at this temperature for 3 hours. The liquid was cooled, and a sample removed for Proton NMR, which confirmed that the rearrangement had occurred. A few impurities were present.

The dark liquid was dissolved in 500 mL of dichloromethane, and was treated with Hunig's Base (55.4 mL, 318 mmol, 1.10 equiv). The flask was cooled to 0° C., and chloromethyl ethyl ether (26.8 mL, 289 mmol, 1.00 equiv) was added dropwise. The mixture stirred for 2 hours, and TLC indicated consumption of the phenol intermediate. The solution was quenched with sat. aq. $NH_4Cl$, an the phases were separated. The organic phase was concentrated, and the residue purified by chromatography on silica gel (0 to 10% EtOAc in hexane). 57.991 g of product was isolated as a pale yellow oil (74%).

$^1H$ NMR (400 MHz, $CDCl_3$) δ 7.42 (dd, J=7.9, 1.6 Hz, 1H), 7.22-7.08 (m, 1H), 6.94 (t, J=7.8 Hz, 1H), 5.96 (ddt, J=16.9, 10.4, 6.6 Hz, 1H), 5.17-4.94 (m, 4H), 3.89 (q, J=7.1 Hz, 2H), 3.51 (dt, J=6.7, 1.5 Hz, 2H), 1.28 (t, J=7.1 Hz, 3H).

$^{13}C$ NMR (101 MHz, $CDCl_3$) δ 152.71, 136.52, 135.82, 131.50, 129.52, 125.56, 117.55, 116.27, 98.33, 65.87, 34.67, 15.14.

Synthesis of (E)-1,4-bis(3-bromo-2-(ethoxymethoxy)phenyl)but-2-ene [Compound 12]

In a glovebox, a 40 mL vial was charged with the alkene 11 (10.00 g, 36.9 mmol, 1.00 equiv). Grubbs Second Generation Catalyst (313 mg, 0.369 mmol, 1.00 mol %) was dissolved in about 10 mL toluene, and this was added to the vial containing the alkene. The vial was allowed to stir at ambient temperature in the glovebox, uncapped, overnight.

After 14 hours, the vial was removed from the glovebox and stirred in ambient air. A small aliquot was removed to confirm consumption of starting material by Proton NMR. The oil was adsorbed to celite and purified by chromatography (0 to 10% EtOAc in hexane) to give 6.00 g of a colorless oil (63%). The material was about 17.5% Z isomer by Proton NMR.

$^1H$ NMR (400 MHz, $CDCl_3$) δ 7.41 (dt, J=8.0, 2.2 Hz, 2H), 7.18-7.08 (m, 2H), 6.99-6.88 (m, 2H), 5.76-5.60 (m, 2H), 5.19-5.01 (m, 4H), 3.94-3.82 (m, 4H), 3.70-3.39 (m, 4H), 1.26 (t, J=7.1, 5.0, 0.6 Hz, 6H).

$^{13}C$ NMR (101 MHz, $CDCl_3$) δ 152.60, 136.37, 131.40, 129.98, 129.40, 125.56, 117.53, 98.30, 65.88, 33.42, 15.16.

Synthesis of rac-(2R,3R)-1,4-bis(3-bromo-2-(ethoxymethoxy)phenyl)butane-2,3-diol [Compound 13]

A 250 mL round bottom flask was charged with NMO (1.82 g, 15.6 mmol, 2.00 equiv) and 45 mL water. The mixture was stirred, and potassium osmate dihydrate (143 mg, 0.389 mmol, 5 mol %) was added in a single portion. The mixture stirred for 1 minute before addition of alkene 12 (4.00 g, 7.78 mmol, 1.00 equiv) in 90 mL acetone. The flask was sealed and stirred at ambient temperature for 14 hours. A few oily drops were present that became homogeneous with the solution over time.

The solution was diluted with dichloromethane and quenched with aqueous sodium sulfite. Product was extracted with a few portions of dichloromethane. Combined organic fractions were concentrated and purified by chromatography on silica gel (0 to 50% EtOAc in hexane). 3.99 g of product was isolated as a colorless oil. Proton NMR showed product with a little bit of contamination by the meso stereoisomer in roughly 85:15 ratio (94%).

$^1$H NMR (400 MHz, $CDCl_3$) δ 7.44 (d, J=8.2 Hz, 2H), 7.18 (d, J=8.1 Hz, 2H), 6.96 (d, J=7.2 Hz, 2H), 5.25-5.03 (m, 4H), 3.99-3.78 (m, 4H), 3.78-3.64 (m, 2H), 3.19-2.78 (m, 6H), 1.27 (td, J=7.1, 0.8 Hz, 6H).

$^{13}$C NMR (101 MHz, $CDCl_3$) δ 153.51, 134.40, 131.87, 130.39, 125.81, 117.50, 98.61, 73.89, 66.06, 35.15, 15.07.

Scheme 3. Synthesis of Ligand 1(L1)

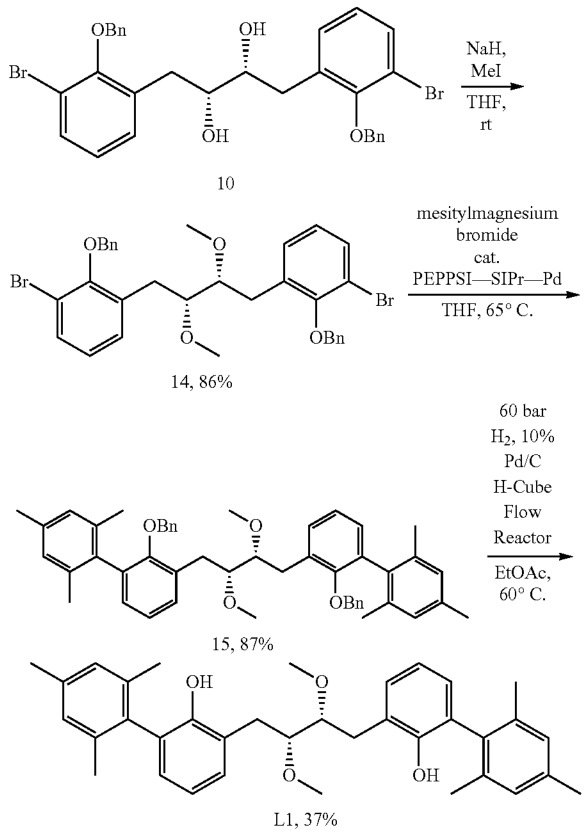

Synthesis of rac-3,3'-((2R,3R)-2,3-dimethoxybutane-1,4-diyl)bis(2-(benzyloxy)-1-bromobenzene) [Compound 14]

In a glovebox, a 50 mL round bottom flask was charged with the diol 10 (1.23 g, 2.01 mmol, 1.00 equiv) and 10 mL dry THF. Sodium hydride (193 mg, 8.04 mmol, 4.00 equiv) was added, and the mixture was allowed to stir for 1 hour at ambient temperature. Iodomethane (0.375 mL, 6.03 mmol, 3.00 equiv) was added to the slurry, and the mixture was allowed to stir overnight.

The solution was cautiously quenched with methanol, then sat. aq. $NH_4Cl$. Product was extracted with several portions of dichloromethane. Combined organic fractions were purified by chromatography on silica gel (0 to 20% EtOAc in hexane). 1.11 g of a colorless oil was isolated (86%).

$^1$H NMR (500 MHz, $CDCl_3$) δ 7.50-7.43 (m, 6H), 7.38-7.27 (m, 6H), 7.16 (dd, J=7.7, 1.6 Hz, 2H), 6.93 (t, J=7.8 Hz, 2H), 4.99 (d, J=10.6 Hz, 2H), 4.89 (d, J=10.6 Hz, 2H), 3.47-3.35 (m, 2H), 3.09 (s, 6H), 2.98-2.88 (m, 2H), 2.80 (dd, J=13.6, 7.9 Hz, 2H).

$^{13}$C NMR (126 MHz, $CDCl_3$) δ 154.18, 136.88, 135.09, 131.76, 130.86, 128.41, 128.19, 128.11, 125.33, 117.63, 81.17, 74.92, 58.40, 31.07.

Synthesis of rac-3',3'''-((2R,3R)-2,3-dimethoxybutane-1,4-diyl)bis(2'-(benzyloxy)-2,4,6-trimethyl-1,1'-biphenyl) [Compound 15]

In a nitrogen-filled glovebox, a 40 mL vial was charged with dibromide 14 (0.370 g, 0.578 mmol, 1.00 equiv) and 8 mL THF. PEPPSI-SIPr catalyst (20 mg) was added, followed by mesitylmagnesium bromide (1.0 M in THF, 1.73 mL, 1.73 mmol, 3.00 equiv). The mixture was stirred at 65° C. for 3 hours.

The solution was quenched with sat. aq. $NH_4Cl$, and the product was extracted with a few portions of dichloromethane. Combined organic fractions were concentrated, and the residue purified by chromatography on silica gel (0 to 10% EtOAc in hexane). 363 mg of product was isolated as a colorless oil (87% yield).

$^1$H NMR (500 MHz, $CDCl_3$) δ 7.18-7.15 (m, 6H), 7.12 (dd, J=7.5, 1.8 Hz, 2H), 7.04 (t, J=7.5 Hz, 2H), 6.94 (dd, J=7.5, 1.8 Hz, 2H), 6.93-6.90 (m, 4H), 6.89-6.83 (m, 4H), 4.37-4.28 (m, 4H), 3.41-3.32 (m, 2H), 3.15 (s, 6H), 3.03-2.94 (m, 2H), 2.90 (dd, J=13.1, 6.1 Hz, 2H), 2.32 (s, 6H), 2.01 (s, 6H), 1.96 (s, 6H).

$^{13}$C NMR (126 MHz, $CDCl_3$) δ 155.05, 137.36, 136.67, 136.54, 136.27, 135.45, 133.83, 132.62, 130.45, 129.76, 128.28, 128.12, 128.09, 128.01, 127.61, 123.77, 81.48, 74.48, 58.07, 30.69, 21.05, 20.83, 20.61.

Synthesis of rac-3,3''-((2R,3R)-2,3-dimethoxybutane-1,4-diyl)bis(2',4',6'-trimethyl-[1,1'-biphenyl]-2-ol) [Ligand 1 (L1)]

The benzyl-protected diphenol 15 (360 mg, 0.501 mmol, 1.00 equiv) was dissolved in 40 mL ethyl acetate, and was subjected to hydrogenation conditions in an H-cube reactor. Reaction conditions: 0.5 mL/min flow rate; 60° C. reaction temperature; 60 bar hydrogen; 10% Pd/C catalyst. The hydrogenation reaction was preformed twice to remove all the benzyl groups.

The solution that passed through the reactor was concentrated and the residue purified by chromatography on silica gel (0 to 10% EtOAc in hexane). 98.7 mg of a colorless oil was isolated (37%).

$^1$H NMR (400 MHz, $CDCl_3$) δ 7.10 (dd, J=6.8, 2.5 Hz, 2H), 7.05-6.81 (m, 10H), 3.65-3.51 (m, 2H), 3.39 (s, 6H), 3.14-2.75 (m, 4H), 2.34 (s, 6H), 2.00 (s, 12H).

$^{13}$C NMR (101 MHz, $CDCl_3$) δ 152.04, 137.03, 136.88, 136.69, 134.23, 130.40, 129.20, 128.23, 128.11, 124.94, 120.18, 83.45, 58.93, 32.43, 21.10, 20.31, 20.25.

Scheme 4. Synthesis of Ligand 2 (L2)

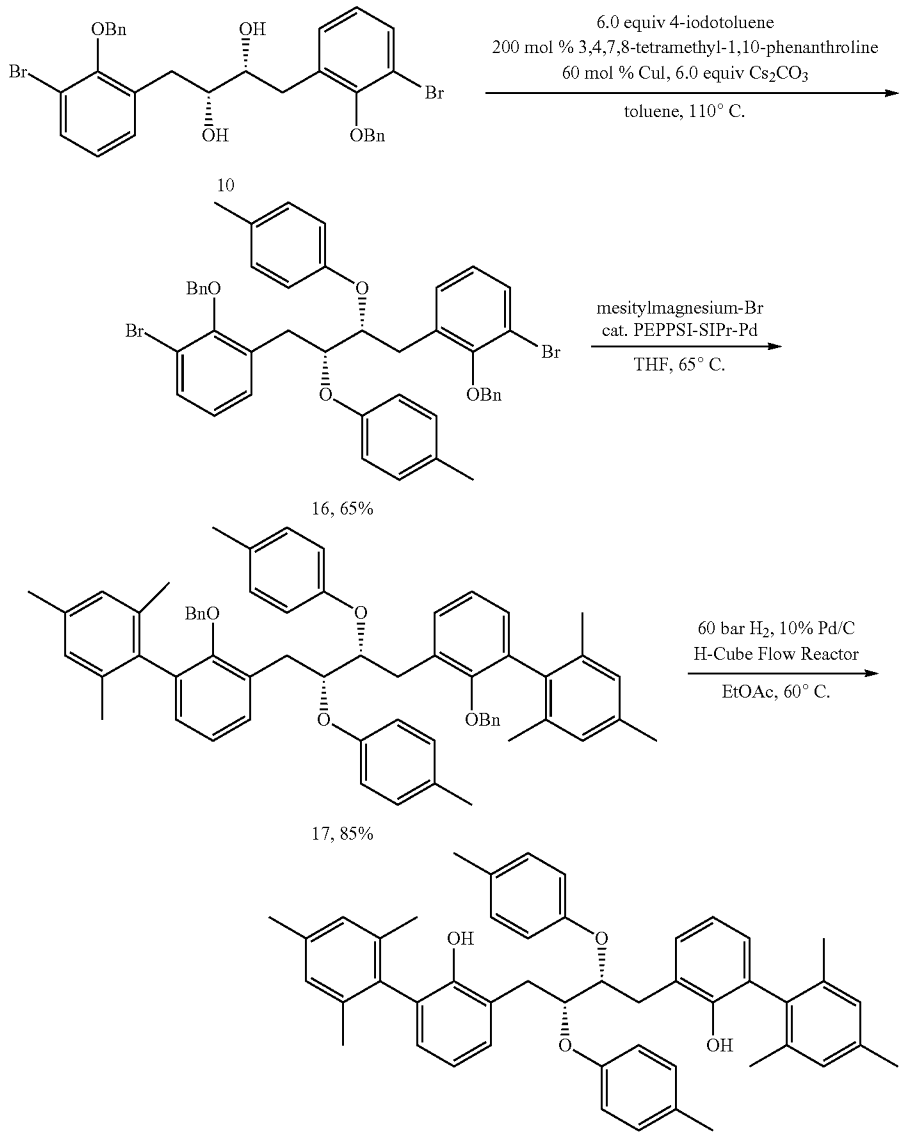

10

16, 65%

17, 85%

L2, 47%

Synthesis of rac-3,3'-((2R,3R)-2,3-bis(p-tolyloxy)butane-1,4-diyl)bis(2-(benzyloxy)-1-bromobenzene) [Compound 16]

In a nitrogen-filled glovebox, a 40 mL vial was charged with the diol 10 (430 mg, 0.702 mmol, 1.00), copper (I) iodide (162 mg, 0.421 mmol, 0.60 equiv), cesium carbonate (1.38 g, 4.21 mmol, 6.0 equiv), 3,4,7,8-tetramethyl-1,10-phenanthroline (331 mg, 1.44 mmol, 2.0 equiv), 4-iodotoluene (0.920 g, 4.21 mmol, 6.0 equiv), and 9 mL toluene. The mixture was heated at 110° C. for 14 hours.

The slurry was poured into a mixture of dichloromethane and sat. aq. $NH_4Cl$. Product was extracted with several portions of dichloromethane. Combined organic fractions were dried with $MgSO_4$, were filtered through a plug of alumina, and the filtrate concentrated. The residue was purified by chromatography on silica gel (0 to 30% EtOAc in hexane). 0.359 g of a white solid was isolated that contained product with a little bit of leftover iodotoluene (65%).

$^1H$ NMR (400 MHz, $CDCl_3$) δ 7.43-7.32 (m, 12H), 6.95-6.90 (m, 2H), 6.75 (t, J=7.8 Hz, 6H), 6.61-6.54 (m, 4H), 4.99-4.83 (m, 4H), 4.50 (t, J=6.4 Hz, 2H), 3.19-2.96 (m, 4H), 2.20 (s, 6H).

$^{13}C$ NMR (101 MHz, $CDCl_3$) δ 155.61, 154.16, 136.88, 133.47, 132.20, 131.22, 130.21, 130.10, 129.82, 128.37, 127.93, 127.74, 125.42, 118.56, 117.49, 115.79, 74.71, 31.34, 20.45.

Synthesis of 3',3'''-((2R,3R)-2,3-bis(p-tolyloxy)butane-1,4-diyl)bis(2'-(benzyloxy)-2,4,6-trimethyl-1,1'-biphenyl) [Compound 17]

In a nitrogen-filled glovebox, a 100 mL round bottom flask was charged with dibromide 16 (0.340 g, 0.429 mmol, 1.00 equiv) and 4 mL THF. PEPPSI-SIPr catalyst (14.6 mg, 0.0214 mmol, 5.00 mol %) was added, followed by mesitylmagnesium bromide (1.0 M in THF, 1.29 mL, 1.29 mmol, 3.00 equiv). The mixture was stirred at 50° C. for 3 hours.

The solution was quenched with sat. aq. $NH_4Cl$, and the product was extracted with a few portions of dichloromethane. Combined organic fractions were concentrated, and the residue purified by chromatography on silica gel (0 to 10% EtOAc in hexane). 319 mg of product was isolated as a colorless oil (85% yield).

$^1$H NMR (500 MHz, $CDCl_3$) δ 7.21-7.17 (m, 2H), 7.17-7.12 (m, 4H), 6.96-6.91 (m, 6H), 6.89 (s, 4H), 6.78-6.71 (m, 8H), 6.71-6.65 (m, 4H), 4.58-4.48 (m, 2H), 4.28 (d, J=1.9 Hz, 4H), 3.16 (t, J=6.0 Hz, 4H), 2.31 (s, 6H), 2.19 (s, 6H), 1.96 (s, 6H), 1.91 (s, 6H).

$^{13}$C NMR (126 MHz, $CDCl_3$) δ 156.19, 155.04, 137.25, 136.71, 136.46, 136.36, 135.28, 133.75, 131.36, 130.82, 130.23, 129.71, 129.68, 128.17, 128.09, 128.01, 127.51, 123.83, 115.98, 78.12, 74.55, 31.21, 21.02, 20.76, 20.60, 20.45.

Synthesis of rac-3,3"-((2R,3R)-2,3-bis(p-tolyloxy) butane-1,4-diyl)bis(2',4',6'-trimethyl-[1,1'-biphenyl]-2-ol) [Ligand 2 (L2)]

The benzyl-protected diphenol 17 (310 mg, 0.356 mmol, 1.00 equiv) was dissolved in 35 mL ethyl acetate, and was subjected to hydrogenation conditions in an H-cube reactor. Reaction conditions: 0.5 mL/min flow rate; 60° C. reaction temperature; 60 bar hydrogen; 10% Pd/C catalyst (large cartridge). The solution that passed through the reactor was concentrated and the residue purified by chromatography on silica gel (0 to 10% EtOAc in hexane). The product was isolated as 116 mg of a white solid (47% yield).

$^1$H NMR (500 MHz, $CDCl_3$) δ 6.99 (d, J=7.4 Hz, 2H), 6.97-6.91 (m, 8H), 6.82 (d, J=7.3 Hz, 2H), 6.77 (dt, J=7.5, 2.2 Hz, 6H), 5.10 (s, 2H), 4.73-4.61 (m, 2H), 3.23 (d, J=6.2 Hz, 4H), 2.36 (s, 6H), 2.24 (s, 6H), 1.92 (s, 6H), 1.82 (s, 6H).

$^{13}$C NMR (126 MHz, $CDCl_3$) δ 156.23, 150.91, 137.74, 137.57, 137.55, 132.25, 131.12, 130.34, 129.71, 128.57, 128.50, 126.51, 124.02, 120.44, 116.35, 78.43, 31.76, 21.12, 20.51, 20.18, 20.12.

Scheme 5. Synthesis of Ligand 7 (L7) and Ligand 6 (L6)

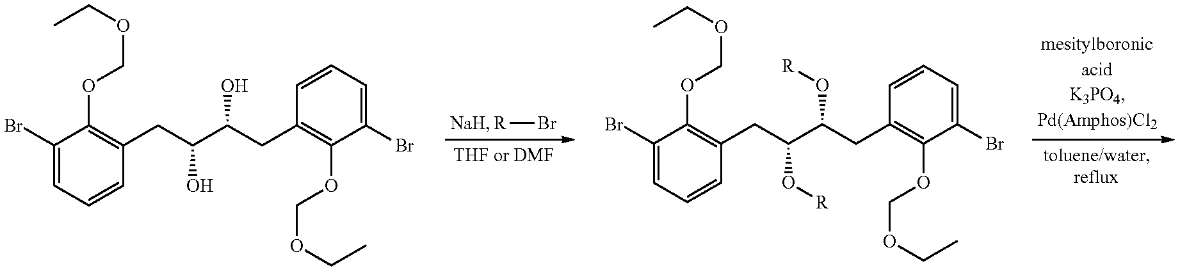

13

| Product | R—Br | Yield |
|---|---|---|
| 18a | $^t$BuCH$_2$CH$_2$—Br | 33% |
| 18b | Bn—Br | 90% |

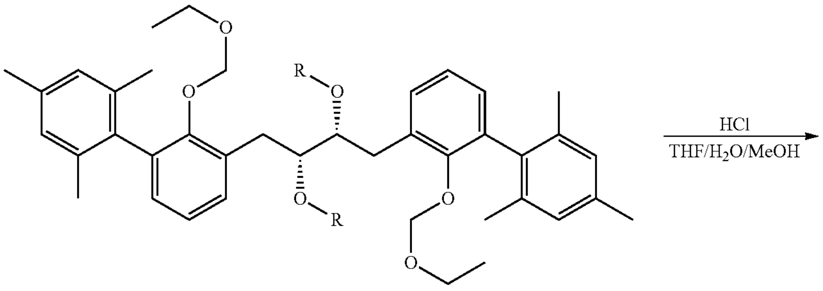

19a-b

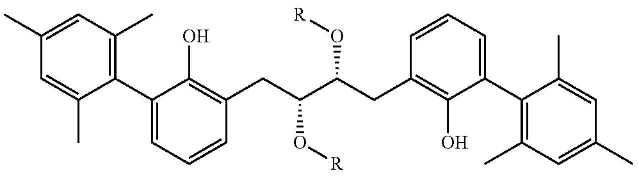

| Product | R—Br | Yield (2 Steps) |
|---|---|---|
| L7 | $^t$BuCH$_2$CH$_2$—Br | 76% |
| L6 | Bn—Br | 63% |

Synthesis of 3,3'-((2R,3R)-2,3-bis(3,3-dimethylbutoxy)butane-1,4-diyl)bis(1-bromo-2-(ethoxymethoxy)benzene) [Compound 18a]

In a glovebox, a 20 mL vial was charged with diol 13 (1.00 g, 1.82 mmol, 1.00 equiv) and 7 mL DMF. Sodium hydride (175 mg, 7.30 mmol, 4.00 equiv) was added. After 10 minutes, 1-bromo-3,3-dimethylpropane (1.04 mL, 7.30 mmol, 4.00 equiv) was added. The mixture stirred for 2 hours. UPLC showed partial conversion. Another portion of sodium hydride (90 mg) was added, followed by another portion of the alkyl bromide (1.04 mL). This mixture stirred another 2 hours, and the addition of sodium hydride/alkyl bromide was repeated. The mixture stirred overnight.

The solution was cautiously quenched with water, and product was extracted with diethyl ether. The organic phase was concentrated, and the residue purified by chromatography on silica gel (0 to 30% EtOAc in hexane). Two column portions were isolated: 90.1 mg of desired product (7%); and 472 mg of mono-alkylated intermediate.

The mono-alkylated intermediate (0.746 mmol, 1.00 equiv) was placed in a 100 mL round bottom flask, and transferred back to the glovebox. The mixture was dissolved in 5 mL DMF, and sodium hydride (19.7 mg, 0.82 mmol, 1.10 equiv) was added. After 10 minutes, the alkyl bromide (0.117 mL, 0.82 mmol, 1.10 equiv) was added. The mixture stirred 2 hours. The addition of sodium hydride/alkyl bromide was repeated five additional times, in 2 hour intervals. The final mixture stirred at ambient temperature overnight. Workup and chromatography as before gave 0.337 g of product as a colorless oil (26%). Another column portion contained 0.160 g of the mono-alkylated intermediate. Combined yield was 33%.

$^1H$ NMR (400 MHz, $CDCl_3$) δ 7.42 (dd, J=8.0, 1.6 Hz, 2H), 7.22 (dd, J=7.6, 1.6 Hz, 2H), 6.92 (t, J=7.8 Hz, 2H), 5.24-5.03 (m, 4H), 3.99-3.76 (m, 4H), 3.64-3.53 (m, 2H), 3.48-3.37 (m, 2H), 3.22-3.02 (m, 4H), 2.83 (dd, J=13.6, 8.8 Hz, 2H), 1.40-1.19 (m, 10H), 0.78 (s, 18H).

$^{13}C$ NMR (101 MHz, $CDCl_3$) δ 153.02, 135.72, 131.48, 130.94, 125.20, 117.31, 98.26, 80.87, 68.49, 65.91, 43.20, 31.94, 29.60, 29.27, 15.18.

Synthesis of 3,3'-((2R,3R)-2,3-bis(benzyloxy)butane-1,4-diyl)bis(1-bromo-2-(ethoxymethoxy)benzene) [Compound 18b]

In a glovebox, a 50 mL round bottom flask was charged with the diol 13 (1.00 g, 1.82 mmol, 1.00 equiv) and 10 mL dry THF. Sodium hydride (176 mg, 7.30 mmol, 4.00 equiv) was added, and the mixture was allowed to stir for 1 hour at ambient temperature. Benzyl bromide (0.867 mL, 7.30 mmol, 4.00 equiv) was added to the slurry, and the mixture was allowed to stir for 2 hours. TLC showed only partial conversion, so a reflux condenser was attached, and the mixture was allowed to stir at 70° C. for 4 hours. TLC showed consumption of starting material.

The solution was cautiously quenched with methanol, then sat. aq. $NH_4Cl$. Product was extracted with several portions of dichloromethane. Combined organic fractions were purified by chromatography on silica gel (0 to 20% EtOAc in hexane). 1.19 g of a colorless oil was isolated (90%). Proton/Carbon NMR were consistent with product, though a little bit of a minor stereoisomer was present (About 84:16 dr).

$^1H$ NMR (400 MHz, $CDCl_3$) δ 7.43 (dd, J=7.9, 1.6 Hz, 2H), 7.25-6.98 (m, 12H), 6.89 (td, J=7.8, 1.3 Hz, 2H), 5.10 (dq, J=8.2, 5.8 Hz, 4H), 4.49 (dd, J=54.1, 11.6 Hz, 2H), 4.26 (t, J=11.8 Hz, 2H), 3.90-3.65 (m, 6H), 3.28-2.73 (m, 4H), 1.23-1.10 (m, 6H).

$^{13}C$ NMR (101 MHz, $CDCl_3$) δ 153.03, 138.27, 135.54, 131.64, 131.05, 128.12, 127.91, 127.44, 125.26, 117.38, 98.24, 79.67, 72.72, 65.90, 31.59, 15.09.

Synthesis of 3,3''-((2R,3R)-2,3-bis(3,3-dimethylbutoxy)butane-1,4-diyl)bis(2',4',6'-trimethyl-[1,1'-biphenyl]-2-ol) [Ligand 7 (L7)]

A 50 mL round bottom flask was charged with the dibromide 18a (0.4934 g, 0.689 mmol, 1.00 equiv), mesityl boronic acid (339 mg, 2.07 mmol, 3.00 equiv), Pd-Amphos (24 mg, 5.0 mol %), and 6 mL degassed toluene. A reflux condenser was attached, and the unit was sealed under nitrogen. $K_3PO_4$ (2M in water, 2.1 mL, 4.2 mmol, 6.0 equiv) was added, and the mixture was stirred at 100° C. under nitrogen overnight.

The solution was cooled, and product was extracted with portions of dichloromethane. Combined organic fractions were concentrated.

The residue was dissolved in 10 mL of 1:1 THF:MeOH, and was treated with 1 mL of 6M HCl. The mixture was allowed to reflux for 2 hours. The solution was cooled, diluted with water, and extracted with portions of dichloromethane. Combined organic fractions were concentrated, and the residue purified by chromatography on silica gel (0 to 10% EtOAc in hexane). 0.358 g was isolated (76% over two steps).

$^1H$ NMR (400 MHz, $CDCl_3$) δ 7.38 (s, 2H), 7.10 (dd, J=6.3, 2.9 Hz, 2H), 6.96 (s, 4H), 6.94-6.85 (m, 4H), 3.75-3.56 (m, 4H), 3.44 (td, J=9.0, 6.8 Hz, 2H), 3.02 (d, J=14.4 Hz, 2H), 2.91 (dd, J=14.3, 7.9 Hz, 2H), 2.33 (s, 6H), 2.04 (s, 6H), 2.00 (s, 6H), 1.47 (ddd, J=8.9, 6.6, 1.6 Hz, 4H), 0.84 (s, 18H).

$^{13}C$ NMR (101 MHz, $CDCl_3$) δ 152.40, 136.79, 136.74, 136.48, 134.75, 130.37, 129.44, 128.40, 128.17, 128.10, 125.30, 120.09, 82.20, 69.19, 43.00, 32.89, 29.60, 29.39, 21.11, 20.47, 20.28.

Synthesis of 3,3''-((2R,3R)-2,3-bis(benzyloxy)butane-1,4-diyl)bis(2',4',6'-trimethyl-[1,1'-biphenyl]-2-ol) [Ligand 6 (L6)]

In a glovebox, a 100 mL round bottom flask was charged with dibromide 18b (1.19 g, 1.63 mmol, 1.09 mmol), mesityl boronic acid (0.804 g, 4.90 mmol, 3.00 equiv), Pd-Amphos (58 mg, 0.082 mmol, 5.0 mol %), and 16 mL toluene. The flask was connected to a reflux condenser, was sealed, and transferred to a fume hood. Under a blanket of nitrogen, a solution of nitrogen-sparged $K_3PO_4$ (2.0 M in water, 4.89 mL, 9.78 mmol, 6.00 equiv) was added. The mixture stirred at 70° C. for 14 hours. The solution was diluted with water, and organics were extracted with portions of dichloromethane. Combined organic fractions were concentrated and the residue was used directly for the next step.

The residue was dissolved in 20 mL of 1:1 MeOH:THF and was treated with 2 mL of 6M HCl. The solution was stirred at 70° C. for two hours until TLC showed consumption of the starting material. The solution was diluted with dichloromethane and washed with sat. aq. $NaHCO_3$. The organic phase was concentrated, and the residue purified by chromatography on silica gel (0 to 20% EtOAc in hexane). 0.709 g of a colorless residue was isolated (63%). Proton NMR showed this to be product with the minor diastereomer present. The residue was recrystallized from ethanol to give 0.517 g of colorless crystals. Proton/carbon NMR showed this to be the pure major stereoisomer.

$^1H$ NMR (500 MHz, $CDCl_3$) δ 7.27-7.22 (m, 6H), 7.19-7.10 (m, 4H), 7.03 (dt, J=7.2, 1.8 Hz, 2H), 6.96 (s, 4H), 6.93-6.84 (m, 4H), 6.34 (s, 2H), 4.46 (qd, J=11.6, 1.4 Hz, 4H), 3.87 (d, J=7.4 Hz, 2H), 3.11 (d, J=14.2 Hz, 2H), 2.96 (dd, J=14.2, 8.0 Hz, 2H), 2.33 (s, 6H), 1.98 (s, 12H).

$^{13}C$ NMR (126 MHz, $CDCl_3$) δ 151.68, 137.58, 137.24, 137.13, 136.98, 133.63, 130.68, 128.91, 128.36, 128.34, 128.33, 128.11, 127.79, 127.53, 125.35, 120.21, 80.40, 73.00, 32.01, 21.09, 20.34, 20.29.

Scheme 6. Synthesis of Ligand 3(L3)
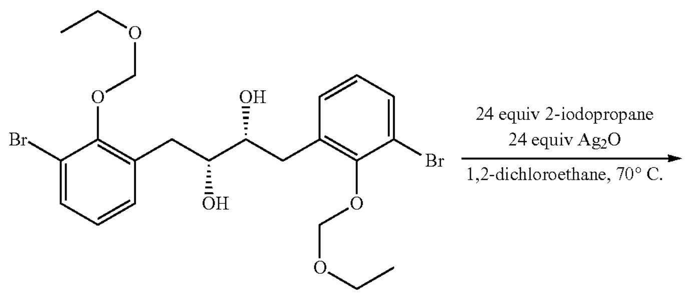
13
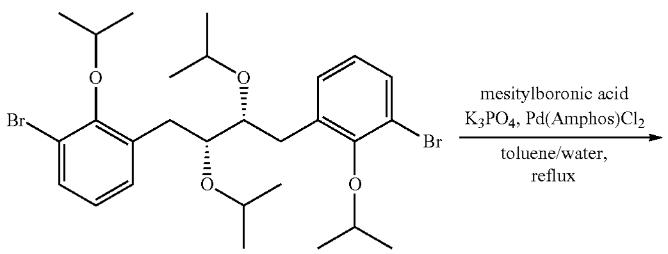
20, 52%
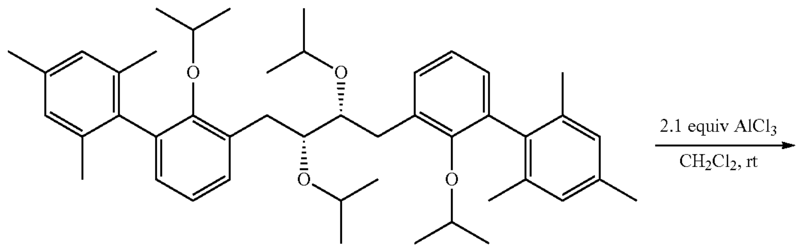
21, 71%
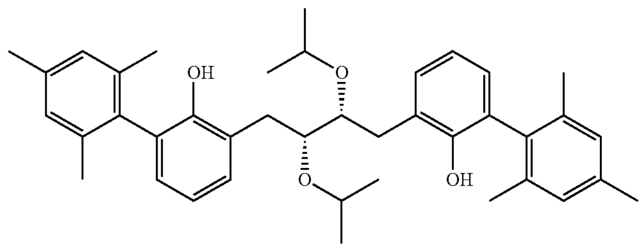
L3, 50%

Synthesis of 3,3'-((2R,3R)-2,3-diisopropoxybutane-1,4-diyl)bis(1-bromo-2-isopropoxybenzene) [Compound 20]

A 100 mL round bottom flask was charged with diol 13 (1.00 g, 1.82 mmol, 1.00 equiv; approximately 15% minor diastereomer). The diol was dissolved in 40 mL 1,2-dichloroethane. Silver oxide (10.1 g, 43.7 mmol, 24.0 equiv) was added, followed by 2-iodopropane (4.36 mL, 43.7 mmol, 24.0 equiv). The mixture was allowed to stir overnight at 70° C.

The mixture was cooled, filtered through a plug of alumina, and the filtrate concentrated. The crude residue was purified by chromatography on silica gel (0 to 30% EtOAc in hexane). 0.566 g of product was isolated as a white solid. The material appeared to be a single diastereomer, and the ethoxylmethyl protecting groups had been exchanged for isopropyl groups on the phenol (52%).

$^1$H NMR (400 MHz, $CDCl_3$) δ 7.47-7.34 (m, 2H), 7.27-7.23 (m, 2H), 6.87 (t, J=7.8 Hz, 2H), 4.60 (hept, J=6.6 Hz, 2H), 3.75-3.53 (m, 2H), 3.31-3.14 (m, 3H), 2.57 (dd, J=13.3, 9.6 Hz, 1H), 1.46-1.35 (m, 6H), 1.32 (d, J=6.1 Hz, 6H), 1.14-0.96 (m, 6H), 0.71 (dd, J=8.8, 6.0 Hz, 6H).

$^{13}$C NMR (101 MHz, $CDCl_3$) δ 153.43, 136.32, 131.55, 131.48, 123.95, 117.72, 78.24, 76.09, 71.24, 31.55, 23.15, 22.65, 22.22, 22.06.

Synthesis of 3',3'''-((2R,3R)-2,3-diisopropoxybutane-1,4-diyl)bis(2'-isopropoxy-2,4,6-trimethyl-1,1'-biphenyl) [Compound 21]

A 50 mL round bottom flask was charged with dibromide 20 (0.560 g, 0.933 mmol, 1.00 equiv), mesitylboronic acid (0.459 g, 2.80 mmol, 3.00 equiv), Pd-Amphos (33 mg, 0.047 mmol, 5.0 mol %), and 6 mL degassed toluene. A reflux condenser was attached, and the unit was placed under nitrogen. $K_3PO_4$ (2 M in water, 2.80 mL, 5.60 mmol, 6.00 equiv) was injected, and the mixture was allowed to reflux for 5 hours.

The solution was cooled, and product was extracted with portions of dichloromethane. Combined organic fractions were concentrated, and the residue purified by chromatography on silica gel (0 to 10% EtOAc in hexane). 0.452 g of product was isolated as a colorless oil that solidified upon standing. Proton/Carbon NMR were consistent with product with some contamination by a minor diastereomer.

$^1$H NMR (400 MHz, $CDCl_3$) δ 7.07-6.78 (m, 10H), 3.72-3.27 (m, 8H), 2.63 (dd, J=13.1, 8.9 Hz, 2H), 2.32 (s, 6H), 2.08 (s, 6H), 2.03 (s, 6H), 1.08 (d, J=6.1 Hz, 6H), 1.03 (d, J=6.1 Hz, 6H), 0.85 (d, J=6.1 Hz, 6H), 0.83-0.79 (m, 6H).

$^{13}$C NMR (101 MHz, $CDCl_3$) δ 154.28, 136.42, 135.95, 134.25, 133.08, 130.87, 129.81, 128.12, 128.03, 122.29, 78.87, 74.59, 71.02, 32.48, 22.82, 22.61, 22.51, 22.42, 21.05, 20.86, 20.30.

Synthesis of 3,3''-((2R,3R)-2,3-diisopropoxybutane-1,4-diyl)bis(2',4',6'-trimethyl-[1,1'-biphenyl]-2-ol) [Ligand 3 (L3)]

A 50 mL round bottom flask was charged with the tetraisopropylether 21 (300.0 mg, 0.442 mmol, 1.00 equiv) and 15 mL dichloromethane. Aluminum trichloride (124 mg, 2.1 equiv) was added, and the mixture stirred for 2 hours. TLC showed conversion to a new product. The solution was quenched with 1 M HCl, and product was extracted with several equivalents of dichloromethane. Combined organic fractions were purified by chromatography on silica gel (0 to 10% EtOAc in hexane). The major column band was found to be product (131 mg, 50%). A little bit of the minor diastereomer contaiminated the sample.

$^1$H NMR (500 MHz, $CDCl_3$) δ 7.44 (s, 2H), 7.10 (dd, J=6.5, 2.7 Hz, 2H), 6.95 (d, J=2.8 Hz, 4H), 6.94-6.83 (m, 4H), 3.81-3.60 (m, 4H), 3.04 (d, J=14.5 Hz, 2H), 2.88 (dd, J=14.5, 8.5 Hz, 2H), 2.33 (s, 6H), 2.04 (s, 6H), 2.00 (s, 6H), 1.17 (d, J=6.1 Hz, 6H), 0.97 (d, J=6.1 Hz, 6H).

$^{13}$C NMR (126 MHz, $CDCl_3$) δ 152.50, 136.89, 136.73, 136.37, 134.90, 130.40, 129.44, 128.42, 128.11, 128.08, 125.65, 120.03, 78.81, 71.94, 32.64, 23.16, 21.44, 21.12, 20.44, 20.20.

Scheme 7. Synthesis of Ligand 4 (L-4) and Ligand 5 (L-5)

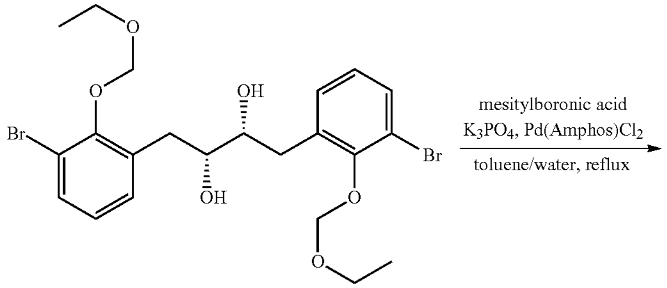

13 (85:15 dr)

-continued

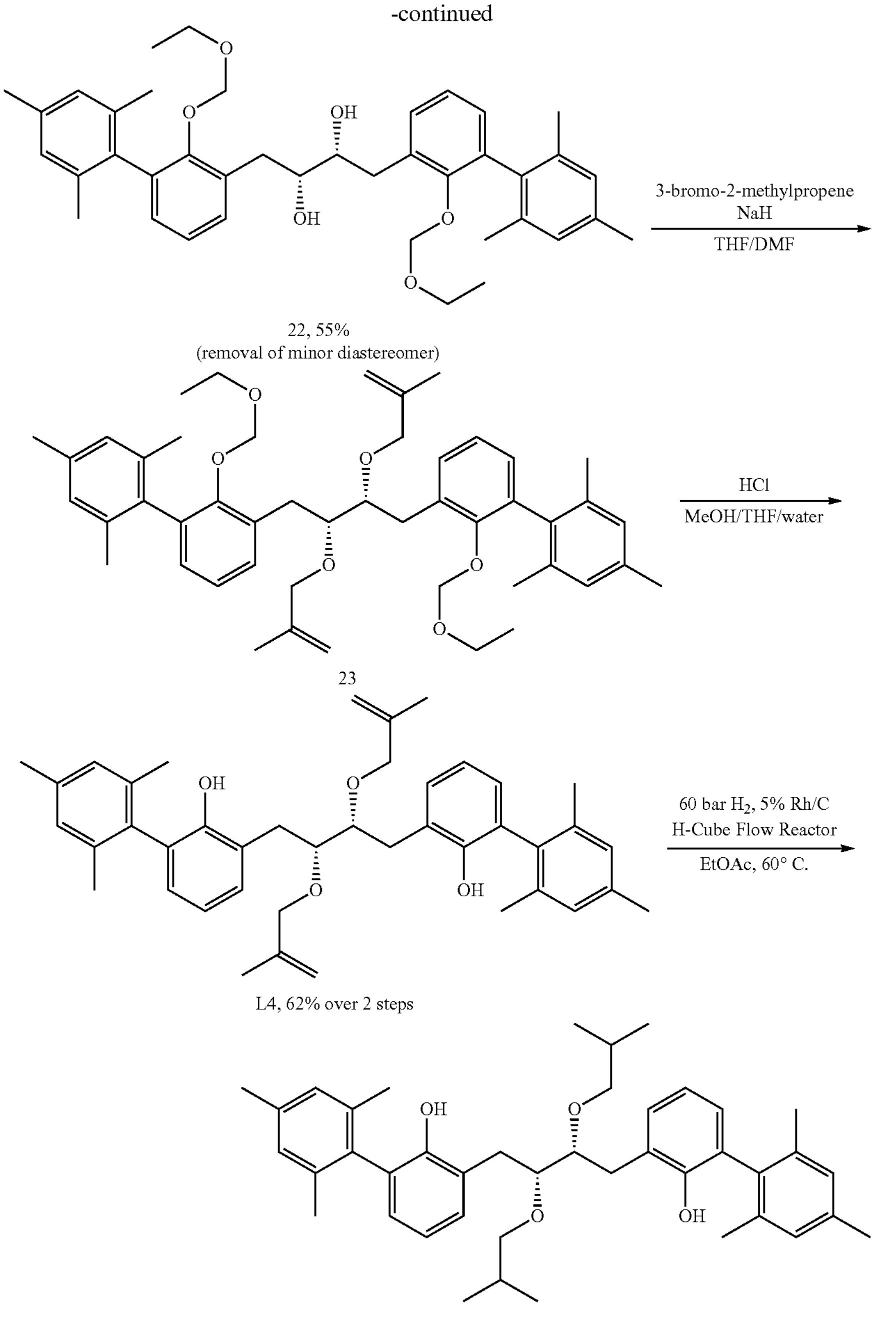

22, 55%
(removal of minor diastereomer)

23

L4, 62% over 2 steps

L5, 87%

Synthesis of rac-(2R,3R)-1,4-bis(2-(ethoxymethoxy)-2',4',6'-trimethyl-[1,1'-biphenyl]-3-yl)butane-2,3-diol [Compound 22]

In a glovebox, a 50 mL round bottom flask was charged with the dibromide 13 (1.00 g, 1.82 mmol, 1.00 equiv; contains 15-20% minor diastereomer), mesitylboronic acid (0.897 g, 5.47 mmol, 3.00 equiv), Pd-Amphos (65 mg, 5.0 mol %), and 10 mL toluene. A reflux condenser was attached, the unit was sealed, and transferred to a fume hood. Nitrogen-sparged aqueous $K_3PO_4$ solution (2.0 M in water, 5.5 mL, 11.0 mmol, 6.0 equiv) was added, and the mixture was allowed to reflux under nitrogen overnight.

The solution was cooled, diluted with water, and phases were separated. The aqueous phase was extracted with a few portions of dichloromethane. The combined organic fractions were concentrated, and the residue purified by column chromatography on silica gel (0 to 30% EtOAc in hexane). 0.630 g of product was isolated as a colorless oil and a single diastereomer (55%).

$^1H$ NMR (500 MHz, $CDCl_3$) δ 7.18 (d, J=7.3 Hz, 2H), 7.08 (t, J=7.5 Hz, 2H), 6.94 (dt, J=7.6, 1.2 Hz, 2H), 6.90 (d, J=4.6 Hz, 4H), 4.54-4.43 (m, 4H), 3.71 (q, J=6.8 Hz, 2H), 3.35 (qd, J=7.1, 3.1 Hz, 4H), 3.10 (d, J=6.2 Hz, 2H), 3.06 (dd, J=13.5, 7.2 Hz, 2H), 2.98 (dd, J=13.5, 6.7 Hz, 2H), 2.31 (s, 6H), 2.02 (s, 6H), 1.97 (s, 6H), 1.05 (td, J=7.1, 1.0 Hz, 6H).

$^{13}C$ NMR (126 MHz, $CDCl_3$) δ 153.12, 136.79, 136.39, 136.32, 135.18, 133.65, 132.05, 130.17, 130.00, 128.12, 128.09, 124.48, 97.20, 73.34, 65.27, 34.83, 21.00, 20.61, 20.52, 14.97.

Synthesis of rac-3,3"-((2R,3R)-2,3-bis((2-methylallypoxy)butane-1,4-diyl)bis(2',4',6'-trimethyl-[1,1'-biphenyl]-2-ol) [Ligand 4 (L4)]

In a glovebox, a 50 mL round bottom flask was charged with the diol 22 (0.630 g, 1.01 mmol, 1.00 equiv) and 10 mL dry THF. Sodium hydride (97 mg, 4.0 mmol, 4.0 equiv) was added in a single portion. After 30 minutes, 3-bromo-2-methylpropene (0.41 mL, 4.0 mmol, 4.0 equiv) was injected with 5 mL DMF. The mixture was allowed to stir in the glovebox at ambient temperature for 3 hours.

TLC showed complete consumption of starting material. The solution was cautiously quenched with methanol, then water. Product was extracted with several portions of dichloromethane. Combined organic fractions were concentrated and the residue purified by chromatography on silica gel (0 to 10% EtOAc in hexane). 613 mg of the intermediate was isolated as a colorless oil.

The oil was dissolved in 10 mL of 1:1 MeOH:THF. This was treated with 1 mL of 6 M HCl, and the mixture refluxed for 30 minutes. TLC showed complete consumption of the intermediate, and UPLC/MS showed product.

The solution was cooled, quenched with sat. aq. Sodium bicarbonate, and product was extracted with several portions of dichloromethane. Combined organic fractions were concentrated, and the residue purified by chromatography on silica gel (0 to 10% EtOAc in hexane). 388 mg of a colorless oil that solidified upon standing was isolated (62% over two steps).

$^{1}H$ NMR (500 MHz, $CDCl_3$) δ 7.13 (dd, J=6.2, 2.9 Hz, 2H), 6.96 (s, 4H), 6.90 (dd, J=4.7, 2.0 Hz, 4H), 6.70 (d, J=1.5 Hz, 2H), 4.86 (s, 2H), 4.82 (s, 2H), 3.90 (q, J=12.3 Hz, 4H), 3.84 (d, J=8.1 Hz, 2H), 3.09 (d, J=14.3 Hz, 2H), 2.94 (dd, J=14.3, 8.4 Hz, 2H), 2.32 (s, 6H), 2.01 (2×s, 12H), 1.61 (s, 6H).

$^{13}C$ NMR (126 MHz, $CDCl_3$) δ 151.99, 141.44, 137.04, 137.00, 136.80, 134.09, 130.56, 129.14, 128.26, 128.25, 127.90, 125.52, 120.19, 113.50, 79.84, 74.81, 31.92, 21.09, 20.33, 20.27, 19.56.

Synthesis of rac-3,3"-((2R,3R)-2,3-diisobutoxybutane-1,4-diyl)bis(2',4',6'-trimethyl-[1,1'-biphenyl]-2-ol) [Ligand 5 (L5)]

The diene Ligand 4 (263 mg, 0.425 mmol, 1.00 equiv) was dissolved in 45 mL ethyl acetate, and passed through an H-Cube hydrogenation flow reactor (60 bar hydrogen, 60° C., 0.5 mL/min) that contained at 5% Rh/C catalyst cartridge.

The resulting solution was concentrated and purified by chromatography on silica gel. A white solid resulted that was recrystallized from ethanol. 229 mg of white solid was isolated (87%). Proton/Carbon NMR showed product with a little bit of the alkene present as a contaminant.

$^{1}H$ NMR (500 MHz, $CDCl_3$) δ 7.17 (s, 2H), 7.15-7.04 (m, 2H), 6.96 (s, 4H), 6.94-6.84 (m, 4H), 3.74 (d, J=8.5 Hz, 2H), 3.33-3.14 (m, 4H), 3.12-2.82 (m, 4H), 2.33 (s, 6H), 2.01 (2×s, 12H), 1.82 (dp, J=13.0, 6.7 Hz, 2H), 1.05-0.60 (m, 12H).

$^{13}C$ NMR (126 MHz, $CDCl_3$) δ 152.29, 136.82, 136.79, 136.56, 134.65, 130.31, 129.33, 128.26, 128.19, 128.09, 125.79, 120.16, 81.45, 78.28, 31.95, 28.70, 21.11, 20.29, 20.28, 19.62, 19.15.

Scheme 8. Synthesis of Ligand 8 (L8), Ligand 9 (L9), Ligand 10 (L10), Ligand 11 (L11), Ligand 12 (L12), and Ligand 13 (L13)

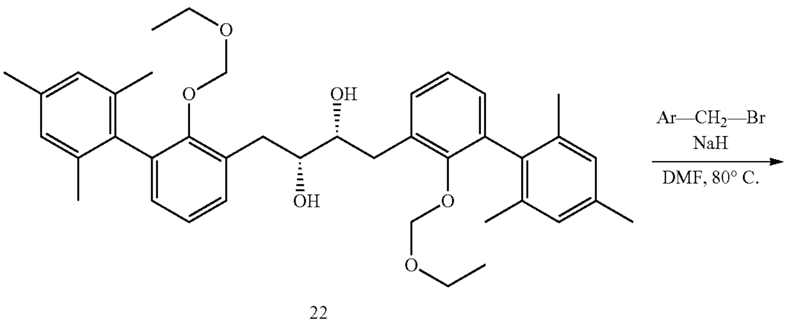

22

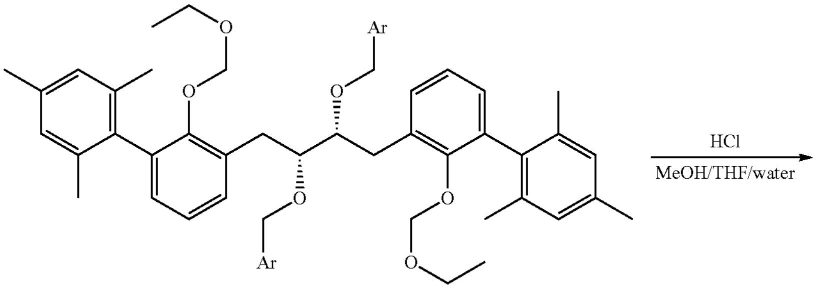

24a-f

-continued

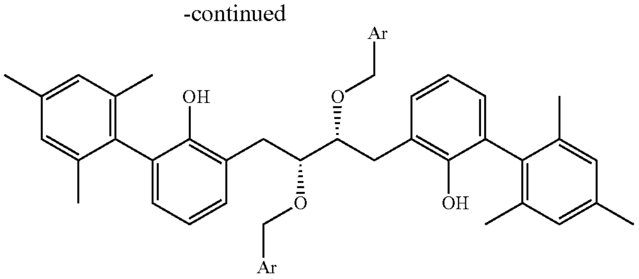

| Ligand | Ar | Yield (2 steps) |
|---|---|---|
| L8 | 4-F-phenyl | 60% |
| L9 | 2-Ph-phenyl | 55% |
| L10 | 2,6,-dimethylphenyl | 25% |
| L11 | 3,5-di-tert-butylphenyl | 44% |
| L12 | 1-napthyl | 19% |
| L13 | 2-napthyl | 33% |

General Procedure for Benzylation and Deprotection of Diol 22

In a glovebox, a 7 mL vial was charged with diol 22 (1.00 equiv) in DMF (~0.1M). NaH (4.00 equiv) was added, and the mixture stirred for 30 minutes. The benzyl halide (3.00 equiv) was injected, and the mixture was stirred at 80° C. for 14 hours.

The solution was quenched with brine, and product was extracted with portions of dichloromethane. Combined organic fractions were adsorbed to silica gel and purified by chromatography (0 to 10% EtOAc in hexane). A crude oil was isolated as the phenol-protected intermediate, which was used without further purification.

The oil was suspended in 10 mL of 1:1 MeOH:THF and was treated with 1 mL of 6M HCl. The mixture was refluxed for 3 hours or until TLC showed complete deprotection. The solution was quenched with brine, and product was extracted with portions of dichloromethane. Combined organic fractions were adsorbed to silica gel and purified by chromatography (0 to 20% EtOAc in hexane).

Synthesis of rac-3,3"-((2R,3R)-2,3-bis((4-fluorobenzypoxy)butane-1,4-diyl)bis(2',4',6'-trimethyl-[1,1'-biphenyl]-2-ol) [Ligand 8 (L8)]

Following the general protocol, diol 22 (230 mg, 0.367 mmol, 1.00 equiv) and 4-fluorobenzylbromide (0.137 mL, 1.10 mmol, 3.00 equiv) yielded 160 mg of product as a colorless oil (60% over two steps).

$^{1}$H NMR (500 MHz, $CDCl_3$) δ 7.14-7.07 (m, 4H), 7.05 (dd, J=6.8, 2.4 Hz, 2H), 6.97 (s, 4H), 6.94-6.87 (m, 8H), 6.05 (s, 2H), 4.46 (d, J=11.5 Hz, 2H), 4.38 (d, J=11.5 Hz, 2H), 3.88-3.79 (m, 2H), 3.12 (dd, J=14.1, 2.5 Hz, 2H), 2.94 (dd, J=14.1, 8.0 Hz, 2H), 2.33 (s, 6H), 1.97 (s, 12H).

$^{13}$C NMR (126 MHz, $CDCl_3$) δ 162.36 (d, J=246.0 Hz), 151.44, 137.46, 137.18, 137.05, 133.49 (d, J=3.2 Hz), 133.23, 130.75, 129.82 (d, J=8.2 Hz), 128.89, 128.47, 128.45, 127.37, 125.16, 120.29, 115.18 (d, J=21.4 Hz), 80.24, 72.20, 32.10, 21.09, 20.32, 20.24.

$^{19}$F NMR (470 MHz, $CDCl_3$) δ−114.50 (tt, J=9.2, 5.2 Hz).

Synthesis of rac-3,3"-((2R,3R)-2,3-bis([1,1'-biphenyl]-2-ylmethoxy)butane-1,4-diyl)bis(2',4',6'-trimethyl-[1,1'-biphenyl]-2-ol) [Ligand 9 (L9)]

Following the general protocol, diol 22 (230 mg, 0.367 mmol, 1.00 equiv) and 2-phenylbenzyl bromide (0.201 mL, 1.10 mmol, 3.00 equiv) yielded 171 mg of product as a colorless oil (55% over two steps).

$^{1}$H NMR (400 MHz, $CDCl_3$) δ 7.32-7.11 (m, 18H), 7.01-6.94 (m, 6H), 6.90-6.82 (m, 4H), 5.88 (s, 2H), 4.40 (d, J=11.5 Hz, 2H), 4.24 (d, J=11.4 Hz, 2H), 3.77-3.61 (m, 2H), 3.03 (dd, J=14.2, 2.2 Hz, 2H), 2.92-2.78 (m, 2H), 2.34 (s, 6H), 1.93 (s, 6H), 1.92 (s, 6H).

$^{13}$C NMR (101 MHz, $CDCl_3$) δ 151.60, 141.50, 140.65, 137.28, 137.10, 134.89, 133.67, 130.70, 129.81, 129.46, 129.27, 128.84, 128.39, 128.34, 127.98, 127.64, 127.55, 127.36, 126.92, 125.74, 120.22, 79.70, 69.90, 31.32, 21.15, 20.36.

Synthesis of rac-3,3"-((2R,3R)-2,3-bis((2,6-dimethylbenzyl)oxy)butane-1,4-diyl)bis(2',4',6'-trimethyl-[1,1'-biphenyl]-2-ol) [Ligand 10 (L10)]

Following the general protocol, diol 22 (230 mg, 0.367 mmol, 1.00 equiv) and 2,6-dimethylbenzyl bromide (0.219 g, 1.10 mmol, 3.00 equiv) yielded 69 mg of product as a colorless oil (25% over two steps).

$^{1}$H NMR (400 MHz, $CDCl_3$) δ 7.12-7.03 (m, 4H), 6.96-6.93 (m, 8H), 6.92-6.86 (m, 4H), 6.24 (s, 2H), 4.61 (d, J=10.6 Hz, 2H), 4.34 (d, J=10.6 Hz, 2H), 4.00-3.84 (m, 2H), 3.12 (dd, J=14.3, 1.8 Hz, 2H), 2.94 (dd, J=14.1, 9.5 Hz, 2H), 2.32 (s, 6H), 2.21 (s, 12H), 1.98 (s, 6H), 1.95 (s, 6H).

$^{13}$C NMR (101 MHz, $CDCl_3$) δ 151.86, 137.94, 137.17, 137.09, 136.98, 133.70, 133.52, 130.55, 128.96, 128.31, 128.26, 127.59, 125.79, 120.30, 80.70, 67.25, 31.10, 21.08, 20.32, 20.27, 19.77.

Synthesis of rac-3,3"-((2R,3R)-2,3-bis((3,5-di-tert-butylbenzyl)oxy)butane-1,4-diyl)bis(2',4',6'-trimethyl-[1,1'-biphenyl]-2-ol) [Ligand 11 (L11)]

Following the general protocol, diol 22 (230 mg, 0.367 mmol, 1.00 equiv) and 3,5-di-tert-butylbenzyl bromide (0.312 g, 1.10 mmol, 3.00 equiv) yielded 148 mg of product as a colorless oil (44% over two steps).

$^{1}$H NMR (400 MHz, $CDCl_3$) δ 7.32 (q, J=2.1 Hz, 2H), 7.09 (q, J=3.7, 3.0 Hz, 4H), 7.03-6.77 (m, 10H), 6.71 (d, J=4.4 Hz, 2H), 4.63-4.34 (m, 4H), 3.89 (d, J=7.3 Hz, 2H), 3.17-2.78 (m, 4H), 2.45-2.18 (m, 6H), 1.97 (dd, J=9.4, 4.5 Hz, 12H), 1.28-1.19 (m, 36H).

$^{13}$C NMR (101 MHz, $CDCl_3$) δ 151.91, 150.84, 136.99, 136.81, 136.55, 134.01, 130.58, 128.92, 128.26, 127.75, 125.45, 122.73, 121.95, 120.15, 80.95, 74.19, 34.73, 32.25, 31.38, 21.07, 20.38, 20.33.

Synthesis of rac-3,3''-((2R,3R)-2,3-bis(naphthalen-1-ylmethoxy)butane-1,4-diyl)bis(2',4',6'-trimethyl-[1,1'-biphenyl]-2-ol) [Ligand 12 (L12)]

Following the general protocol, diol 22 (230 mg, 0.367 mmol, 1.00 equiv) and 1-(bromomethyl)napthalene (0.243 g, 1.10 mmol, 3.00 equiv) yielded 56 mg of product as a colorless oil (19% over two steps).

$^1$H NMR (400 MHz, $CDCl_3$) δ 7.93 (dd, J=8.5, 1.4 Hz, 2H), 7.82 (dd, J=7.8, 1.6 Hz, 2H), 7.77 (d, J=8.2 Hz, 2H), 7.49-7.39 (m, 4H), 7.29 (dd, J=8.2, 7.0 Hz, 2H), 7.21 (dd, J=7.0, 1.3 Hz, 2H), 6.94 (d, J=8.1 Hz, 4H), 6.86 (dd, J=7.5, 1.8 Hz, 2H), 6.79 (t, J=7.4 Hz, 2H), 6.68 (dd, J=7.4, 1.8 Hz, 2H), 6.18 (s, 2H), 4.95 (d, J=12.0 Hz, 2H), 4.68 (d, J=12.0 Hz, 2H), 3.85-3.71 (m, 2H), 3.07-2.88 (m, 4H), 2.32 (s, 6H), 1.95 (s, 6H), 1.91 (s, 6H).

$^{13}$C NMR (101 MHz, $CDCl_3$) δ 151.59, 137.23, 137.14, 136.98, 133.70, 133.61, 133.33, 131.64, 130.50, 128.83, 128.73, 128.49, 128.35, 128.30, 127.40, 126.83, 126.28, 125.78, 125.46, 125.10, 124.14, 120.22, 81.32, 71.64, 31.55, 21.09, 20.31, 20.29.

Synthesis of rac-3,3''-((2R,3R)-2,3-bis(naphthalen-2-ylmethoxy)butane-1,4-diyl)bis(2',4',6'-trimethyl-[1,1'-biphenyl]-2-ol) [Ligand 13 (L13)]

Following the general protocol, diol 22 (230 mg, 0.367 mmol, 1.00 equiv) and 2-(bromomethyl)napthalene (0.243 g, 1.10 mmol, 3.00 equiv) yielded 96 mg of product as a colorless oil (33% over two steps).

$^1$H NMR (400 MHz, $CDCl_3$) δ 7.81-7.73 (m, 2H), 7.68-7.60 (m, 4H), 7.52 (s, 2H), 7.43 (qd, J=7.1, 3.4 Hz, 4H), 7.29-7.24 (m, 2H), 7.02-6.87 (m, 8H), 6.82 (dd, J=8.3, 6.5 Hz, 2H), 6.31 (s, 2H), 4.68-4.57 (m, 4H), 4.02-3.89 (m, 2H), 3.15 (dd, J=14.1, 2.4 Hz, 2H), 3.00 (dd, J=14.0, 7.9 Hz, 2H), 2.32 (s, 6H), 1.96 (s, 6H), 1.94 (s, 6H).

$^{13}$C NMR (101 MHz, $CDCl_3$) δ 151.63, 137.29, 137.18, 137.02, 135.08, 133.54, 133.11, 132.98, 130.76, 128.89, 128.40, 128.37, 128.13, 127.90, 127.62, 127.50, 126.96, 126.02, 126.00, 125.91, 125.33, 120.25, 80.34, 73.03, 32.09, 21.09, 20.38, 20.25.

Scheme 9. Synthesis of Ligand 14 (L14)

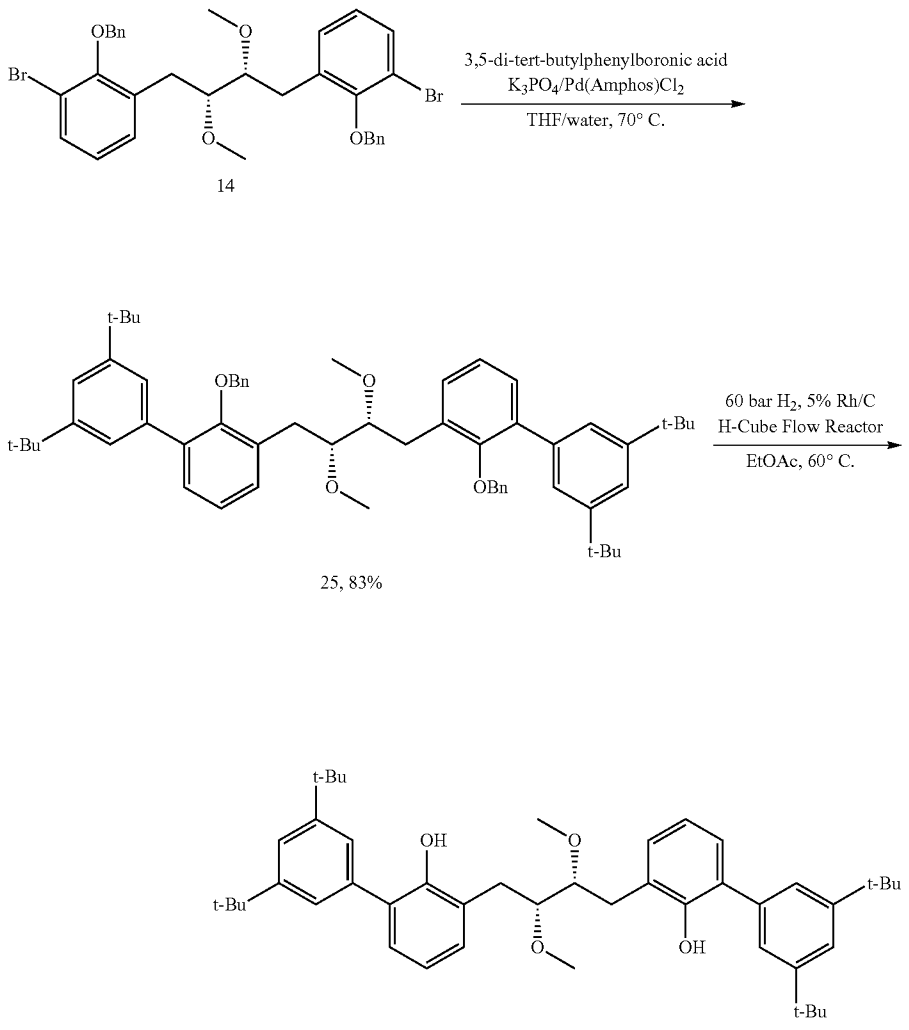

14

25, 83%

L14, 39%

Synthesis of rac-3,3''-((2R,3R)-2,3-dimethoxybutane-1,4-diyl)bis(2-(benzyloxy)-3',5'-di-tert-butyl-1,1'-biphenyl) [Compound 25]

A 50 mL round bottom flask was charged with dibromide 14 (0.370 g, 0.578 mmol, 1.00 equiv), 3,5-di-tert-butylphenylboronic acid (0.406 g, 1.73 mmol, 3.00 equiv), $K_3PO_4$ (0.736 g, 3.47 mmol, 6.00 equiv), and Pd-Amphos (40.4 mg, 0.0578 mmol, 10 mol %). The flask was connected to a reflux condenser and was placed under a blanket of nitrogen. Degassed THF (8 mL) and degassed water (1 mL) were added, and the mixture was stirred at 70° C. for 14 hours.

The solution was quenched with sat. aq. $NH_4Cl$, and the product was extracted with a few portions of dichloromethane. Combined organic fractions were concentrated, and the residue purified by chromatography on silica gel (0 to 10% EtOAc in hexane). 413 mg of product was isolated as a colorless oil (83% yield).

$^1H$ NMR (500 MHz, $CDCl_3$) δ 7.40-7.33 (m, 6H), 7.27-7.23 (m, 2H), 7.22-7.19 (m, 2H), 7.17-7.15 (m, 6H), 7.11 (t, J=7.5 Hz, 2H), 7.00-6.95 (m, 4H), 4.35 (s, 4H), 3.61-3.53 (m, 2H), 3.25 (s, 6H), 3.07-2.96 (m, 4H), 1.29 (s, 36H).

$^{13}C$ NMR (126 MHz, $CDCl_3$) δ 154.95, 150.45, 138.10, 137.44, 136.48, 132.98, 130.35, 129.55, 128.13, 128.03, 127.61, 123.90, 123.51, 121.12, 81.25, 74.59, 58.14, 34.87, 31.58, 31.57, 31.54, 30.60.

Synthesis of rac-3,3''-((2R,3R)-2,3-dimethoxybutane-1,4-diyl)bis(3',5'-di-tert-butyl-[1,1'-biphenyl]-2-ol) [Ligand 12 (L-12)]

The benzyl-protected diphenol 25 (410 mg, 0.477 mmol, 1.00 equiv) was dissolved in 40 mL ethyl acetate, and was subjected to hydrogenation conditions in an H-cube reactor. Reaction conditions: 0.5 mL/min flow rate; 60° C. reaction temperature; 60 bar hydrogen; 5% Rh/C.

After running through the reactor, the material was concentrated, and the sample was purified by chromatography on silica gel (0 to 10% EtOAc in hexane) to give product as a white foam (125 mg, 39%).

$^1H$ NMR (400 MHz, $CDCl_3$) δ 7.45-7.36 (m, 7H), 7.25-7.18 (m, 3H), 7.13 (dd, J=7.6, 1.7 Hz, 2H), 6.93 (t, J=7.5 Hz, 2H), 3.74-3.62 (m, 2H), 3.45 (s, 6H), 3.09-2.95 (m, 4H), 1.37 (s, 36H).

$^{13}C$ NMR (101 MHz, $CDCl_3$) δ 152.33, 150.48, 137.52, 130.70, 130.40, 129.61, 125.59, 123.78, 121.19, 120.06, 83.26, 58.84, 34.92, 32.37, 31.52.

Scheme 10. Synthesis of Ligand 15

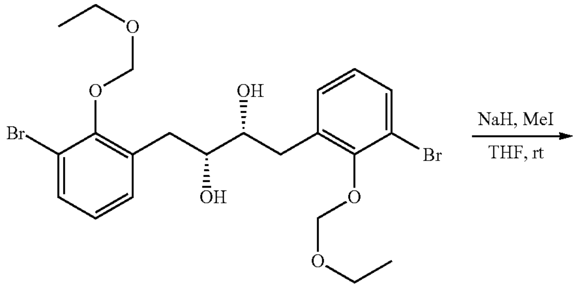

13

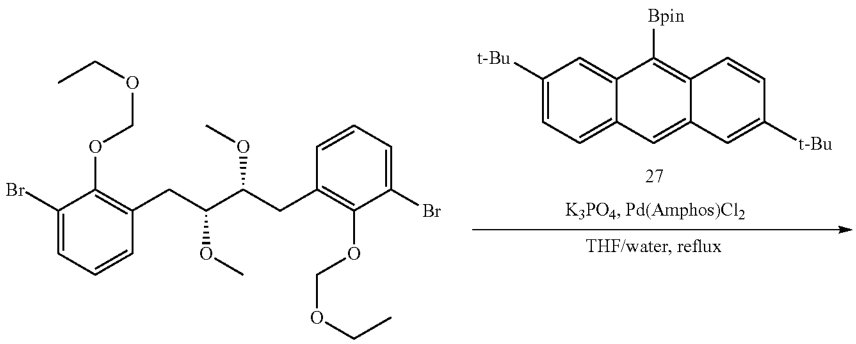

26, 96%

27

-continued

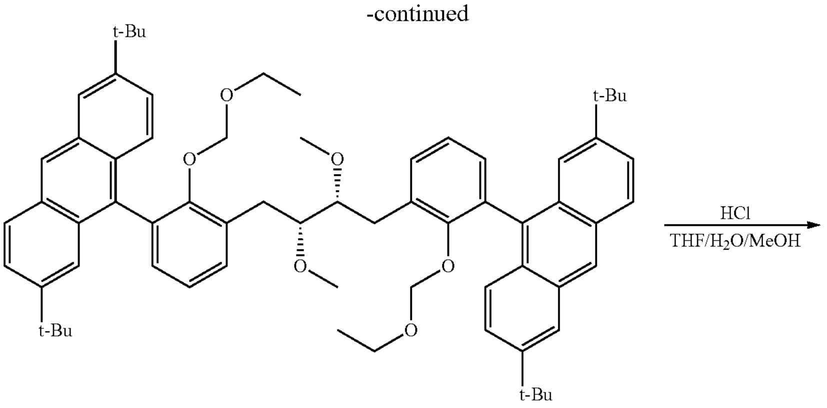

28

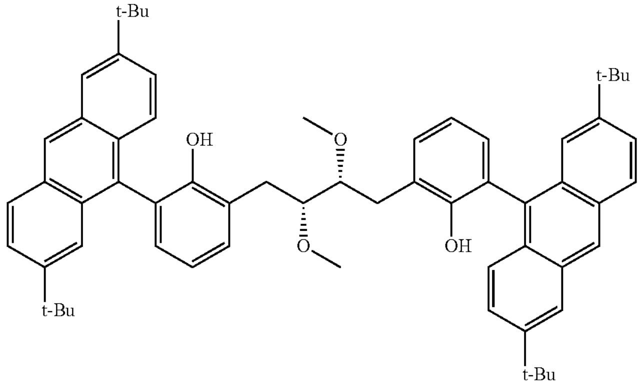

L15, 32% (2 steps)

Synthesis of rac-3,3'4(2R,3R)-2,3-dimethoxybutane-1,4-diyl)bis(1-bromo-2-(ethoxymethoxy)benzene) [Compound 26]

In a glovebox, a 50 mL round bottom flask was charged with the diol 13 (0.550 g, 1.00 mmol, 1.00 equiv) and 8 mL dry THF. Sodium hydride (72 mg, 3.00 mmol, 3.00 equiv) was added, and the mixture was allowed to stir for 1 hour at ambient temperature. Iodomethane (0.187 mL, 3.00 mmol, 3.00 equiv) was added to the slurry, and the mixture was allowed to stir for 2 hours.

The solution was cautiously quenched with methanol, then sat. aq. $NH_4Cl$. Product was extracted with several portions of dichloromethane. Combined organic fractions were purified by chromatography on silica gel (0 to 20% EtOAc in hexane). 0.551 g of a colorless oil was isolated (96%). Proton/Carbon NMR showed a little bit of a minor stereoisomer was present.

$^1H$ NMR (500 MHz, $CDCl_3$) δ 7.42 (dd, J=8.0, 1.6 Hz, 2H), 7.18 (dd, J=7.6, 1.6 Hz, 2H), 6.92 (t, J=7.8 Hz, 2H), 5.17-5.07 (m, 4H), 3.92-3.77 (m, 4H), 3.51-3.44 (m, 2H), 3.32-3.18 (m, 6H), 3.12-3.02 (m, 2H), 2.91 (dd, J=13.7, 8.0 Hz, 2H), 1.27-1.23 (m, 6H).

$^{13}C$ NMR (126 MHz, $CDCl_3$) δ 153.13, 135.24, 131.63, 130.77, 125.37, 117.39, 98.32, 81.33, 65.89, 58.59, 31.53, 15.16.

Synthesis of rac-6,6'4(2R,3R)-2,3-dimethoxybutane-1,4-diyl)bis(2-(2,6-di-tert-butylanthracen-9-yl)phenol) [Ligand 15 (L15)]

In a glovebox, a 50 mL round bottom flask was charged with the diol 26 (0.550 g, 1.00 mmol, 1.00 equiv) and 8 mL dry THF. Boronic ester 27 was added (3.00 equiv) was added with Pd(Amphos)$Cl_2$ (5.0 mol %). The flask was connected to a reflux condenser, and was transferred to a fume hood. Under a blanket of nitrogen, a solution of $K_3PO_4$ (2.0 M in water, 6.00 equiv) was added, and the mixture was allowed to stir overnight at reflux.

The solution was cautiously quenched with sat. aq. $NH_4Cl$. Product was extracted with several portions of dichloromethane. Combined organic fractions were purified by chromatography on silica gel (0 to 20% EtOAc in hexane). 0.551 g of a colorless oil was isolated.

The residue was dissolved in 10 mL of 1:1 MeOH:THF and was treated with 1 mL of 6M HCl. The solution was stirred at 70° C. overnight. The solution was diluted with dichloromethane and washed with sat. aq. $NaHCO_3$. The organic phase was concentrated, and the residue purified by chromatography on silica gel (0 to 20% EtOAc in hexane). 283 mg of an off-white foam was isolated (32% over two steps). Proton and carbon NMR were consistent with product, although rotational isomers were present.

$^1H$ NMR (400 MHz, $CDCl_3$, 55° C.) δ 8.38 (d, J=10.4 Hz, 2H), 8.02-7.80 (m, 4H), 7.62-7.47 (m, 5H), 7.47-7.24 (m, 5H), 7.18-6.93 (m, 4H), 6.51-5.84 (m, 2H), 3.73 (t, J=7.3 Hz, 2H), 3.50-3.28 (m, 6H), 3.09 (dddd, J=51.4, 25.3, 14.6, 7.6 Hz, 4H), 1.44-1.21 (m, 36H).

Scheme 11. Synthesis of Ligand 18

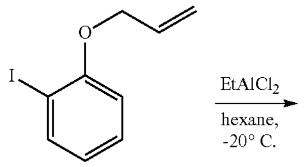

29

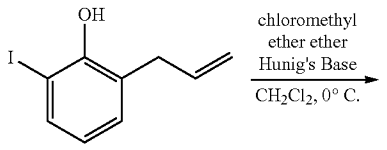

30, 52%

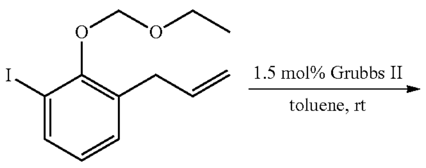

31, 91%

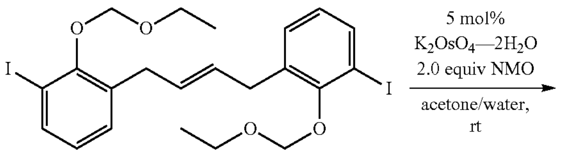

32, 66% (82:18 EIZ)

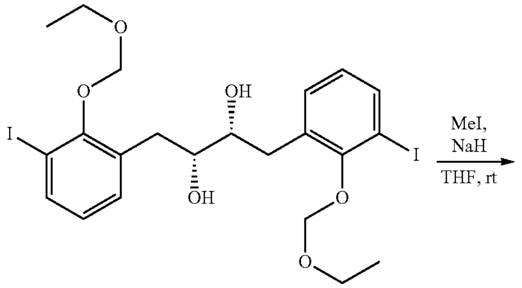

33, 79% (4:1 dr)

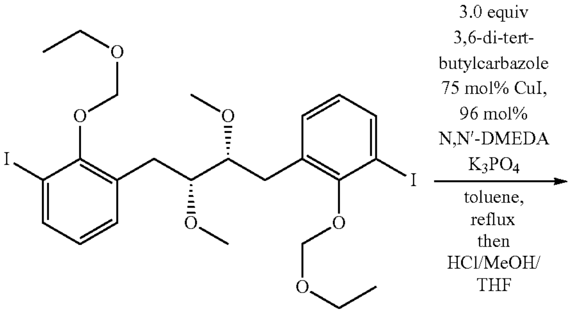

34, 60%

-continued

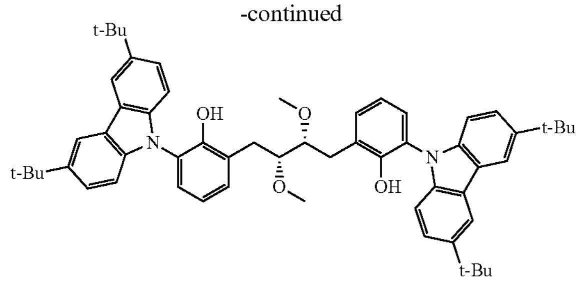

L18, 25% (2 steps)

Synthesis of 1-(allyloxy)-2-iodobenzene [Compound 30]

A 500 mL round bottom flask was charged with the allyloxyl aryl iodide 29 (10.0 g, 38.5 mmol, 1.00 equiv) and 186 mL dry hexane. The flask was chilled in a −20° C. bath. Ethylaluminumdichloride (1.0 M in hexane, 32.0 mL, 32.0 mmol, 0.832 equiv) was added, and the mixture stirred for 2 hours. 100 mL of water was added to quench, and product was extracted with several portions of ethyl acetate. The organic phase was concentrated and the residue purified by chromatography on silica gel (0 to 10% EtOAc in hexane). 5.20 g of product was isolated as a colorless oil.

$^{1}H$ NMR (500 MHz, $CDCl_3$) δ 7.52 (dd, J=8.0, 1.5 Hz, 1H), 7.09 (ddd, J=7.5, 1.5, 0.7 Hz, 1H), 6.63 (t, J=7.7 Hz, 1H), 5.99 (ddt, J=17.4, 9.5, 6.6 Hz, 1H), 5.38 (d, J=0.6 Hz, 1H), 5.17-4.97 (m, 2H), 3.44 (dd, J=6.6, 1.6 Hz, 2H).

$^{13}C$ NMR (126 MHz, $CDCl_3$) δ 152.60, 136.33, 136.00, 130.72, 126.79, 122.40, 116.25, 86.34, 35.52.

Synthesis of 1-allyl-2-(ethoxymethoxy)-3-iodobenzene [Compound 31]

A 250 mL round bottom flask was charged with phenol 30 (7.00 g, 26.9 mmol, 1.00 equiv), 90 mL dichloromethane, and Hunig's base (5.60 mL, 32.3 mmol, 1.20 equiv). The mixture was stirred, and chloromethyl-ethyl ether (2.75 mL, 29.6 mmol, 1.10 equiv) was added. The mixture stirred at ambient temperature overnight.

The solution was quenched with sat. aq. $NH_4Cl$, and product was extracted with a few portions of dichloromethane. Combined organic fractions were concentrated, and the residue purified by chromatography on silica gel (0 to 20% EtOAc in hexane). 7.831 g of a clear, colorless oil was isolated (91%).

$^{1}H$ NMR (500 MHz, $CDCl_3$) δ 7.66 (d, J=7.8 Hz, 1H), 7.17 (d, J=7.6 Hz, 1H), 6.81 (t, J=7.7 Hz, 1H), 5.96 (ddt, J=16.9, 10.2, 6.6 Hz, 1H), 5.17-5.00 (m, 4H), 3.91 (qd, J=7.1, 1.4 Hz, 2H), 3.51 (d, J=6.5 Hz, 2H), 1.36-1.17 (m, 3H).

$^{13}C$ NMR (126 MHz, $CDCl_3$) δ 155.47, 137.71, 136.55, 135.04, 130.66, 126.29, 116.30, 98.70, 92.74, 66.00, 34.90, 15.15.

Synthesis of (E)-1,4-bis(2-(ethoxymethoxy)-3-iodophenyl)but-2-ene [Compound 32]

In a glovebox, a 20 mL vial was charged with the alkene 31 (7.831 g, 24.6 mmol, 1.00 equiv). Grubbs Second Generation Catalyst (313 mg, 0.369 mmol, 1.50 mol %) was dissolved in about 6 mL toluene, and this was added to the vial containing the alkene. The vial was allowed to stir at ambient temperature in the glovebox, uncapped, overnight.

After 14 hours, the vial was removed from the glovebox and stirred in ambient air. The oil was adsorbed to celite and purified by chromatography (0 to 10% EtOAc in hexane). 4.946 g of a pale yellow oil was isolated (66%). E/Z ratio was estimated at about 82:18.

$^1$H NMR (500 MHz, $CDCl_3$) δ 7.65 (ddd, J=7.8, 2.6, 1.7 Hz, 2H), 7.16 (dd, J=7.6, 1.6 Hz, 2H), 6.80 (td, J=7.8, 2.4 Hz, 2H), 5.74-5.61 (m, 2H), 5.10 (d, J=14.2 Hz, 4H), 3.89 (qd, J=7.1, 1.8 Hz, 4H), 3.64-3.45 (m, 4H), 1.28 (t, J=7.2 Hz, 6H).

$^{13}$C NMR (126 MHz, $CDCl_3$) δ 155.37, 137.61, 135.60, 130.54, 130.03, 126.29, 98.66, 92.73, 66.02, 33.65, 15.17.

Synthesis of rac-(2R,3R)-1,4-bis(2-(ethoxymethoxy)-3-iodophenyl)butane-2,3-diol [Compound 33]

A 250 mL round bottom flask was charged with NMO (1.90 g, 16.3 mmol, 2.00 equiv) and 48 mL water. The mixture was stirred, and potassium osmate dihydrate (150 mg, 0.41 mmol, 5 mol %) was added in a single portion. The mixture stirred for 1 minute before addition of alkene 32 (4.946 g, 8.13 mmol, 1.00 equiv) in 95 mL THF. The flask was sealed and stirred at ambient temperature for 5 hours. A few oily drops were present that became homogeneous with the solution over time.

The solution was diluted with dichloromethane and quenched with aqueous sodium sulfite. Product was extracted with a few portions of dichloromethane. Combined organic fractions were concentrated and purified by chromatography on silica gel (0 to 50% EtOAc in hexane). 4.129 g of product was isolated as a colorless oil. Proton NMR showed product with a little bit of contamination by the meso stereoisomer in roughly 4:1 ratio (79%).

$^1$H NMR (400 MHz, $CDCl_3$) δ 7.68 (ddd, J=7.9, 4.6, 1.6 Hz, 2H), 7.21 (dd, J=7.6, 1.6 Hz, 2H), 6.89-6.75 (m, 2H), 5.26-5.00 (m, 4H), 4.00-3.78 (m, 4H), 3.78-3.63 (m, 2H), 3.24-2.79 (m, 6H), 1.28 (td, J=7.0, 1.1 Hz, 6H).

$^{13}$C NMR (101 MHz, $CDCl_3$) δ 156.42, 138.14, 133.78, 131.52, 126.58, 99.03, 92.73, 73.97, 66.17, 35.39, 15.12.

Synthesis of rac-3,3'4(2R,3R)-2,3-dimethoxybutane-1,4-diyl)bis(2-(ethoxymethoxy)-1-iodobenzene) [Compound 34]

In a glovebox, a 100 mL round bottom flask was charged with the diol 33 (4.129 g, 6.43 mmol, 1.00 equiv; contains ~20% meso stereoisomer) and 40 mL dry THF. Sodium hydride (463 mg, 19.3 mmol, 3.00 equiv) was added, and the mixture was allowed to stir for 1 hour at ambient temperature. Iodomethane (1.20 mL, 19.3 mmol, 3.00 equiv) was added to the slurry, and the mixture was allowed to stir for 2 hours.

The solution was cautiously quenched with methanol, then sat. aq. $NH_4Cl$. Product was extracted with several portions of dichloromethane. Combined organic fractions were purified by chromatography on silica gel (0 to 20% EtOAc in hexane). 2.59 g of a colorless oil was isolated that was free of the minor stereoisomer (60%, 75% based on minor stereoisomer).

$^1$H NMR (400 MHz, $CDCl_3$) δ 7.66 (dd, J=7.8, 1.6 Hz, 2H), 7.20 (dd, J=7.6, 1.6 Hz, 2H), 6.79 (t, J=7.7 Hz, 2H), 5.18-5.03 (m, 4H), 3.94-3.77 (m, 4H), 3.51-3.41 (m, 2H), 3.24 (s, 6H), 3.06 (dd, J=13.7, 4.7 Hz, 2H), 2.91 (dd, J=13.7, 7.9 Hz, 2H), 1.26 (t, J=7.1 Hz, 6H).

$^{13}$C NMR (101 MHz, $CDCl_3$) δ 155.92, 137.85, 134.53, 131.84, 126.11, 98.68, 92.52, 81.30, 66.02, 58.59, 31.73, 15.19.

Synthesis of rac-6,6'4(2R,3R)-2,3-dimethoxybutane-1,4-diyl)bis(2-(3,6-di-tert-butyl-9H-carbazol-9-yl) phenol) [Ligand 18 (L-18)]

In a glovebox, a 25 mL round bottom flask was charged with di-iodide 34 (0.500 g, 0.746 mmol, 1.00 equiv), di-tert-butyl-carbazole (0.626 g, 2.24 mmol, 3.00 equiv), copper iodide (0.107 g, 0.560 mmol, 0.75 equiv), potassium phosphate tribasic (1.42 g, 6.71 mmol, 9.00 equiv), N,N'-dimethylethylenediamine (78.2 μL, 0.716 mmol, 0.96 equiv), and 5 mL toluene. A reflux condenser was attached, the unit was sealed, and removed from the glovebox. The unit was placed in a heating mantle and was stirred at 120° C. for 48 hours under nitrogen. TLC showed consumption of starting material, and appearance of several new materials.

The solution was cooled, diluted with dichloromethane, and filtered through a plug of alumina. The filtrate was concentrated, and the residue dissolved in 8 mL of 1:1 MeOH:THF. 1 mL of 6 M HCl was added, and the mixture was stirred at 70° C. for 3 hours.

The solution was diluted with water, and product was extracted with several portions of dichloromethane. Combined organic fractions were concentrated and the residue purified by chromatography on silica gel (0 to 100% EtOAc in hexane). 162 mg of a white solid was isolated (25%).

$^1$H NMR (400 MHz, $CDCl_3$) δ 8.14 (td, J=2.2, 1.3 Hz, 4H), 7.43 (ddd, J=8.6, 2.8, 1.9 Hz, 4H), 7.32-7.25 (m, 4H), 7.20 (s, 2H), 7.07 (ddd, J=8.6, 2.1, 0.6 Hz, 4H), 7.02 (t, J=7.7 Hz, 2H), 3.80-3.66 (m, 2H), 3.43 (s, 6H), 3.17-2.94 (m, 4H), 1.45 (s, 36H).

$^{13}$C NMR (101 MHz, $CDCl_3$) δ 151.86, 142.62, 139.53, 139.49, 131.13, 127.95, 127.11, 125.22, 123.57, 123.49, 123.40, 123.30, 120.56, 116.31, 116.26, 109.48, 109.36, 82.88, 58.90, 34.70, 32.11, 32.02.

Scheme 12. Synthesis of Ligand 16 and Ligand 17

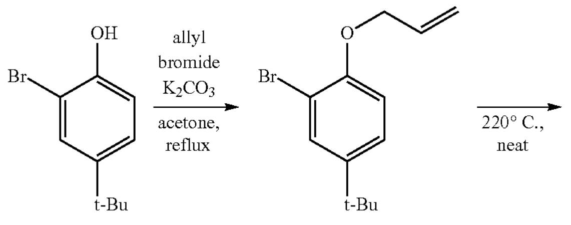

35 36

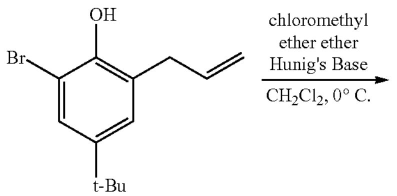

37

-continued

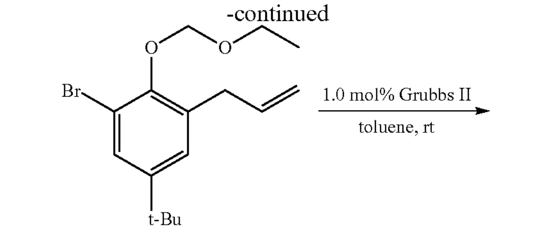

38, 68% over 3 steps

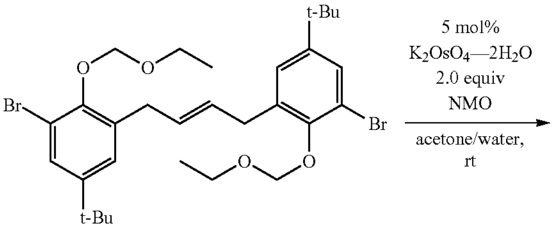

39, 99%

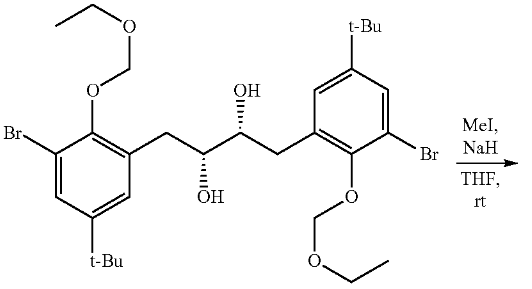

40, 52%

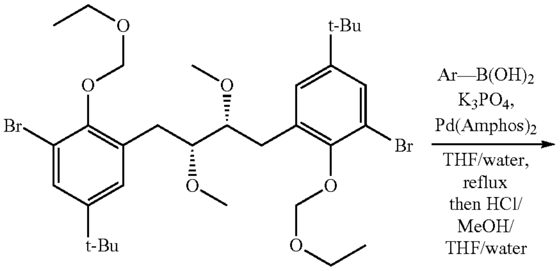

41, 76%

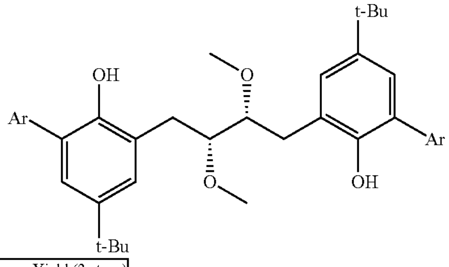

| Ligand | Ar | Yield (2 steps) |
|---|---|---|
| L16 | mesityl | 37% |
| L17 | 3,5-di-tert-butylphenyl | 50% |

Synthesis of 1-allyl-3-bromo-5-(tert-butyl)-2-(ethoxymethoxy)benzene [Compound 38]

A 1 L 3-neck RBF equipped with stirbar and reflux condenser was charged with 2-bromo-4-t-butylphenol (50.0 g, 218 mmol, 1.00 equiv), acetonitrile (415 mL), potassium carbonate (60.3 g, 436 mmol, 2.00 equiv), and allyl bromide (20.8 mL, 240 mmol, 1.10 equiv). The mixture was stirred and heated at 60° C. for 4 hours, then the flask was removed from heat and allowed to cool to ambient temperature. The mixture was filtered into a 1 L RBF, and the volatiles removed on the rotovap, leaving a colorless oil.

The flask was equipped with a stir bar, reflux condenser, and nitrogen pad, and was heated at 220° C. for 2 hours. The oil turned brown upon reaching temperature. The flask was allowed to cool to ambient temperature.

The material (54 g) was dissolved in methylene chloride (400 mL) and treated with Hunig's base (38.4 mL, 221 mmol, 1.10 equiv). The flask was then cooled to 0° C. with an ice bath, and chloromethyl ethyl ether (18.6 mL, 200 mmol, 1.00 equiv) was added dropwise under nitrogen. The mixture was stirred for 4 hours as it warmed to room temperature. The reaction mixture was quenched with saturated aqueous ammonium chloride.

The organic phase was separated and adsorbed onto approximately 100 g of silica gel. The material was purified by chromatography on silica gel (hexane/EtOAc gradient). Product was isolated as a colorless oil (48.822 g, 68% over three steps)

$^1$H NMR (400 MHz, $CDCl_3$) δ 7.43 (d, J=2.4 Hz, 1H), 7.15 (d, J=2.4 Hz, 1H), 6.07-5.92 (m, 1H), 5.15-5.04 (m, 4H), 3.92 (q, J=7.0 Hz, 2H), 3.51 (dt, J=6.6, 1.6 Hz, 2H), 1.35-1.26 (m, 3H), 1.30 (s, 10H).

$^{13}$C NMR (101 MHz, $CDCl_3$) δ 150.22, 148.76, 136.84, 134.72, 128.52, 126.69, 117.07, 116.10, 98.30, 77.34, 77.02, 76.70, 65.81, 35.01, 34.47, 31.42, 31.29, 15.16.

Synthesis of (E)-1,4-bis(3-bromo-5-(tert-butyl)-2-(ethoxymethoxy)phenyl)but-2-ene [Compound 39]

In a nitrogen-purged glovebox, a 40 mL vial was charged with 10 g of the alkene 38 starting material. Separately, the Grubbs 2nd generation catalyst (389 mg) was dissolved in 10 mL of toluene. This solution was then added to the starting material, and the mixture was stirred vigorously open to the glovebox overnight. The reaction mixture was moved to the hood and stirred open to the air for 30 minutes.

The material was then adsorbed onto approximately 40 g of celite, dried on the rotovap, and separated using hexanes/EtOAc on a silica column. Reaction produced 9.52 g of a yellow oil was isolated (99% yield).

$^1$H NMR (400 MHz, $CDCl_3$) δ 7.42 (dd, J=7.3, 2.4 Hz, 2H), 7.14 (dd, J=8.4, 2.6 Hz, 2H), 5.77-5.64 (m, 1H), 5.11 (s, 3H), 3.99-3.83 (m, 4H), 3.55-3.45 (m, 3H), 1.28 (s, 13H), 0.90 (td, J=7.6, 7.1, 3.0 Hz, 1H).

$^{13}$C NMR (101 MHz, $CDCl_3$) δ 150.18, 148.75, 135.37, 130.01, 128.41, 126.69, 126.53, 117.04, 98.26, 77.34, 77.02, 76.70, 65.79, 34.45, 33.85, 31.60, 31.30, 15.17, 14.13.

Synthesis of rac-(2R,3R)-1,4-bis(3-bromo-5-(tert-butyl)-2-(ethoxymethoxy)phenyl)butane-2,3-diol [Compound 40]

A 500 mL RBF was charged with NMO (3.560 g, 30.4 mmol, 2.00 equiv) and water (85 mL). To the solution was added the potassium osmate dehydrate (280 mg, 0.760 mmol, 5.00 mol %). The reaction mixture was stirred for 1 minute and darkened. To the flask was added a solution of the alkene 39 (9.52 g, 15.2 mmol, 1.00 equiv) in acetone (170 mL), upon which the mixture turned gray. The flask was stoppered and stirred overnight at room temperature. TLC indicated that the reaction was complete. The reaction mixture was diluted with methylene chloride and quenched with saturated aqueous sodium sulfite. The organic layer was separated from the aqueous, and the material was adsorbed onto silica gel. The material was separated on an ISCO with Hexanes/EtOAc on a silica column. Product was isolated as 5.1961 g of an amber oil that crystallized upon standing.

$^1$H NMR (400 MHz, $CDCl_3$) δ 7.44 (dd, J=8.1, 2.4 Hz, 2H), 7.19 (d, J=2.4 Hz, 2H), 5.23-5.03 (m, 4H), 3.98-3.64 (m, 6H), 3.21-2.81 (m, 6H), 1.31-1.27 (m, 24H).

$^{13}$C NMR (101 MHz, $CDCl_3$) δ 151.09, 149.05, 133.40, 128.90, 127.48, 117.04, 98.62, 77.34, 77.02, 76.70, 74.15, 66.01, 60.41, 35.34, 34.43, 31.28, 21.06, 15.09, 14.21.

Synthesis of rac-6,6'-((2R,3R)-2,3-dimethoxybutane-1,4-diyl)bis(2-bromo-4-(tert-butyl)-1-(ethoxymethoxy)benzene) [Compound 41]

In a glovebox, a 100 mL round bottom flask was charged with the diol 40 (1.92 g, 2.91 mmol, 1.00 equiv) and 15 mL dry THF. Sodium hydride (210 mg, 8.73 mmol, 3.00 equiv) was added, and the mixture was allowed to stir for 1 hour at ambient temperature. Iodomethane (0.600 mL, 8.73 mmol, 3.00 equiv) was added to the slurry, and the mixture was allowed to stir for 2 hours.

The solution was cautiously quenched with methanol, then sat. aq. $NH_4Cl$. Product was extracted with several portions of dichloromethane. Combined organic fractions were purified by chromatography on silica gel (0 to 20% EtOAc in hexane). 1.52 g of a colorless oil was isolated (76%). Proton/Carbon NMR were consistent with product, though a little bit of a minor stereoisomer was present.

$^1$H NMR (400 MHz, $CDCl_3$) δ 7.39 (d, J=2.4 Hz, 2H), 7.18 (d, J=2.4 Hz, 2H), 5.08 (q, J=5.9 Hz, 4H), 3.89-3.78 (m, 4H), 3.43-3.37 (m, 2H), 3.26 (s, 6H), 3.05-2.92 (m, 4H), 1.27 (d, J=3.6 Hz, 24H).

$^{13}$C NMR (101 MHz, $CDCl_3$) δ 150.63, 148.47, 134.01, 128.50, 128.13, 116.84, 98.24, 81.58, 65.76, 58.78, 34.35, 32.05, 31.26, 15.15.

Synthesis of rac-3,3''-((2R,3R)-2,3-dimethoxybutane-1,4-diyl)bis(5-(tert-butyl)-2',4',6'-trimethyl-[1,1'-biphenyl]-2-ol) [Ligand 16 (L-16)]

In a glovebox, a 50 mL round bottom flask was charged with dibromide 41 (0.75 g, 1.09 mmol, 1.09 mmol), mesityl boronic acid (0.536 g, 3.27 mmol, 3.00 equiv), Pd-Amphos (39 mg, 5.0 mol %), and 6 mL THF. The flask was connected to a reflux condenser, was sealed, and transferred to a fume hood. Under a blanket of nitrogen, a solution of nitrogen-sparged $K_3PO_4$ (2.0 M in water, 3.30 mL, 6.60 mmol, 6.00 equiv) was added. The mixture stirred at 70° C. for 5 hours.

The solution was diluted with water, and organics were extracted with portions of dichloromethane. Combined organic fractions were concentrated and the residue purified by chromatography on silica gel (0 to 20% EtOAc in hexane). 0.532 g of a colorless oil was isolated.

The solid residue was dissolved in 10 mL of 1:1 MeOH:THF and was treated with 1 mL of 6M HCl. The solution was stirred at 70° C. for two hours until TLC showed consumption of the starting material. The solution was diluted with dichloromethane and washed with sat. aq. $NaHCO_3$. The organic phase was concentrated, and the residue purified by chromatography on silica gel (0 to 20% EtOAc in hexane). 0.265 g of white solid was isolated (37% over two steps).

$^1$H NMR (400 MHz, $CDCl_3$) δ 7.08 (d, J=2.6 Hz, 2H), 6.96 (s, 4H), 6.93 (d, J=2.4 Hz, 2H), 6.88 (s, 2H), 3.63-3.51 (m, 2H), 3.39 (s, 6H), 3.06-2.83 (m, 4H), 2.32 (s, 6H), 2.01 (s, 12H), 1.28 (s, 18H).

$^{13}$C NMR (101 MHz, $CDCl_3$) δ 149.60, 142.73, 136.97, 136.92, 136.78, 134.95, 128.20, 127.24, 127.10, 126.24, 123.92, 83.70, 59.01, 34.04, 32.97, 31.62, 21.09, 20.39, 20.31.

Synthesis of rac-3,3''-((2R,3R)-2,3-dimethoxybutane-1,4-diyl)bis(3',5,5'-tri-tert-butyl-[1,1'-biphenyl]-2-ol) [Ligand 17 (L-17)]

In a glovebox, a 50 mL round bottom flask was charged with dibromide 41 (0.75 g, 1.09 mmol, 1.09 mmol), 3,5-di-tert-butylphenyl boronic acid (0.766 g, 3.27 mmol, 3.00 equiv), Pd-Amphos (39 mg, 5.0 mol %), and 6 mL THF. The flask was connected to a reflux condenser, was sealed, and transferred to a fume hood. Under a blanket of nitrogen, a solution of nitrogen-sparged $K_3PO_4$ (2.0 M in water, 3.30 mL, 6.60 mmol, 6.00 equiv) was added. The mixture stirred at 70° C. for 5 hours.

The solution was diluted with water, and organics were extracted with portions of dichloromethane. Combined organic fractions were concentrated and the residue purified by chromatography on silica gel (0 to 20% EtOAc in hexane). 0.764 g of a white solid was isolated.

The solid residue was dissolved in 10 mL of 1:1 MeOH:THF and was treated with 1 mL of 6M HCl. The solution was stirred at 70° C. for 2 hours until TLC showed consumption of starting material. The solution was diluted with dichloromethane and washed with sat. aq. $NaHCO_3$. The organic phase was concentrated, and the residue purified by chromatography on silica gel (0 to 20% EtOAc in hexane). 0.434 g of a white solid was isolated (50% over two steps).

Scheme 13. Synthesis of Aldehyde 57

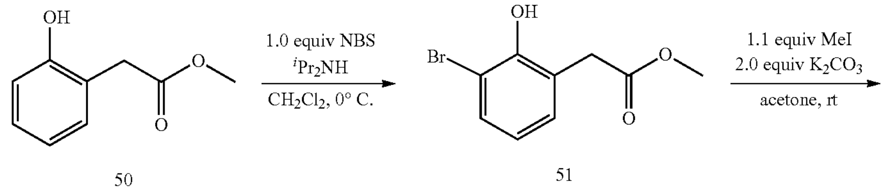

50

51

-continued

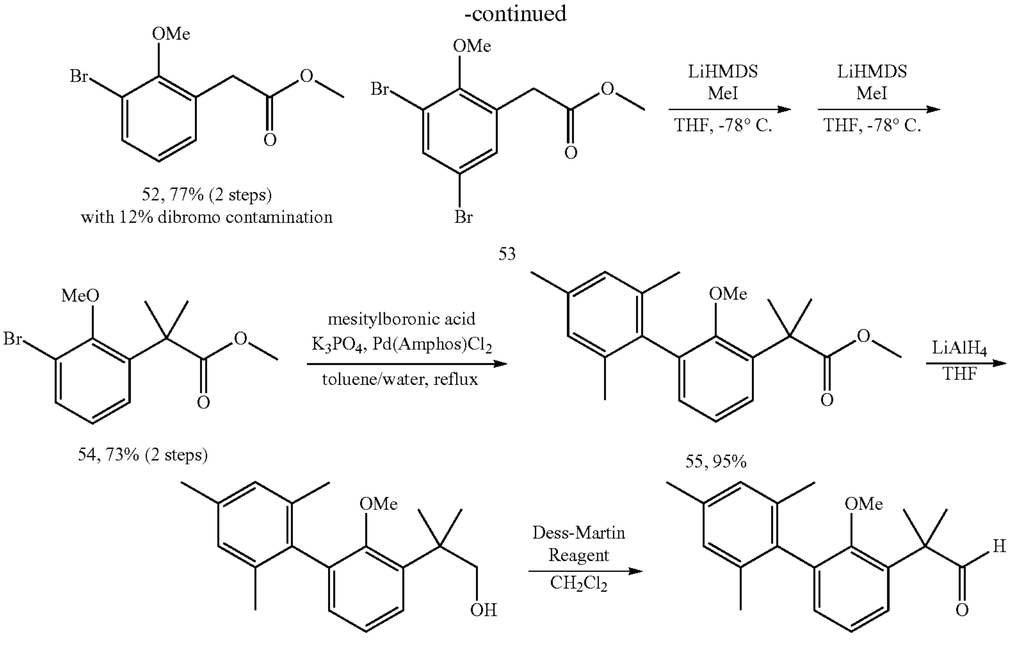

52, 77% (2 steps) with 12% dibromo contamination

53

54, 73% (2 steps)

55, 95%

56

57, 66% (2 steps)

Synthesis of methyl 2-(3-bromo-2-methoxyphenyl)acetate [Compound 52]

A 2 L round bottom flask was charged with the phenol 50 (25.0 g, 150.4 mmol, 1.00 equiv), 1000 mL dichloromethane, and diisopropylamine (4.22 mL, 30 mmol, 0.20 equiv). The mixture was chilled in a 0° C. ice bath before N-bromosuccinimide (26.77 g, 150.4 mmol, 1.00 equiv) was added in portions over 30 minutes. The mixture was stirred for 1 hour.

500 mL of 1 M HCl was added, and the phases were separated. The aqueous phase was extracted with two additional portions of dichloromethane. Combined organic fractions were concentrated to give a crude oily residue. The material was purified by chromatography (0 to 30% EtOAc in hexane) to give 33.568 g of the intermediate phenol 51, contaminated with a little bit (~10-13%) of dibromo phenol.

The oily intermediate 51 (33.568 g, 137 mmol, 1.00 equiv) was dissolved in 300 mL acetone, and was treated with potassium carbonate (37.9 g, 274 mmol, 2.00 equiv), and iodomethane (9.38 mL, 1.10 equiv). The mixture stirred for 4 hours, until TLC showed consumption of the phenol intermediate. The slurry was filtered, and the filtrate concentrated to remove volatiles. The residue was purified by chromatography on silica gel (0 to 10% EtOAc in hexane) to give 30.164 g of product as a yellow oil (77% over two steps).

Proton/Carbon NMR showed ~12% contamination of the dibromo-material. Some dichloromethane and hexane were present in the sample.

$^1$H NMR (400 MHz, $CDCl_3$) δ 7.47 (dd, J=8.0, 1.6 Hz, 1H), 7.20 (dd, J=7.6, 1.6 Hz, 1H), 6.96 (t, J=7.8 Hz, 1H), 3.84 (s, 3H), 3.72-3.67 (m, 5H).

$^{13}$C NMR (101 MHz, $CDCl_3$) δ 171.63, 155.48, 132.84, 130.35, 129.81, 125.35, 117.25, 60.96, 52.12, 35.81.

Synthesis of methyl 2-(3-bromo-2-methoxyphenyl)-2-methylpropanoate [Compound 54]

A 1 L flask was charged with the ester 52 (30.1 g, 116 mmol, 1.00 equiv) and 250 mL dry THF. The flask was placed under nitrogen and was cooled to −78° C. LiHMDS (1.0 M in THF, 122 mL, 122 mmol, 1.05 equiv) was added dropwise. The mixture stirred at −78° C. for 1 hour. Iodomethane (8.30 mL, 133 mmol, 1.15 equiv) was added. The mixture stirred overnight, and was allowed to warm to room temperature before quenching with sat. aq. $NH_4Cl$. Product was extracted with several portions of diethyl ether. Combined organic fractions were dried with $Na_2SO_4$, and were filtered through a plug alumina. The filtrate was concentrated to a crude oily residue. This material was used for the second alkylation without further purification.

An identical run with workup was performed (same quantities). Final purification by chromatography (0 to 10% EtOAc in hexane) gave 24.344 g of product as a white solid (73% over two steps). The minor di-bromo material from the previous step was removed.

$^1$H NMR (500 MHz, $CDCl_3$) δ 7.50-7.39 (m, 1H), 7.26 (d, J=5.7 Hz, 1H), 6.96 (dt, J=10.3, 6.0 Hz, 1H), 3.86 (s, 3H), 3.68 (s, 3H), 1.52 (s, 6H).

$^{13}$C NMR (126 MHz, $CDCl_3$) δ 177.42, 155.08, 141.09, 132.75, 125.13, 124.77, 116.38, 61.05, 52.03, 44.88, 26.72.

Synthesis of methyl 2-(2-methoxy-2',4',6'-trimethyl-[1,1'-biphenyl]-3-yl)-2-methylpropanoate [Compound 55]

A 1 L round bottom flask was charged with the aryl bromide 54 (24.344 g, 84.8 mmol, 1.00 equiv), mesityl boronic acid (19.5 g, 119 mmol, 1.40 equiv), Pd-Amphos (1.20 g, 1.70 mmol, 2.00 mol %), 275 mL degassed toluene, and $K_3PO_4$ (2 M in nitrogen-sparged water, 127 mL, 254 mmol, 3.00 equiv). The mixture refluxed under nitrogen for 5 hours.

The solution was cooled, and the phases separated. The aqueous phase was extracted with a few additional portions of dichloromethane. Combined organic fractions were concentrated, and the residue purified by chromatography on silica gel (0 to 20% EtOAc in hexane). 28.236 g of an off-white solid was isolated. Proton/Carbon NMR showed product contaminated with ~6.5% hexane. Adjusting the mass to account for the impurity, 26.39 g was isolated (95%).

$^{1}H$ NMR (400 MHz, $CDCl_3$) δ 7.29 (dd, J=7.8, 1.7 Hz, 1H), 7.10 (t, J=7.6 Hz, 1H), 6.96 (dd, J=7.5, 1.7 Hz, 1H), 6.94-6.87 (m, 2H), 3.63 (s, 3H), 3.13 (s, 3H), 2.32 (s, 3H), 2.05 (s, 6H), 1.54 (s, 6H).

$^{13}C$ NMR (101 MHz, $CDCl_3$) δ 178.21, 155.39, 138.48, 136.86, 136.32, 135.62, 132.18, 130.72, 128.26, 124.25, 122.95, 59.06, 51.77, 44.49, 26.37, 21.06, 20.48.

Synthesis of 2-(2-methoxy-2',4',6'-trimethyl-[1,1'-biphenyl]-3-yl)-2-methylpropanal [Compound 57]

A 1 L round bottom flask was charged with the ester 55 (25.658 g, 78.6 mmol, 1.00 equiv) and 350 mL dry THF. The flask was cooled to 0° C. under a blanket of nitrogen. Lithium aluminum hydride (2M in THF, 40 mL, 80.0 mmol, 1.02 equiv) was added dropwise. After stirring for one hour, the mixture was quenched by Fieser workup, and the slurry filtered. The filter cake was rinsed with portions of diethyl ether, and the filtrate was dried with $Na_2SO_4$. The concentrated filtrate showed intermediate 56 with an unidentified impurity. The residue was taken on to the next step without purification.

The residue was dissolved in 400 mL dichloromethane, and was treated with the Dess-Martin Reagent (1.00 equiv). A few drops of water were added to facilitate the reaction. After 1 hour, TLC showed consumption of the starting material. The solution was filtered through a plug of celite, and rinsed with portions of dichloromethane. The filtrate was concentrated, and the residue purified by chromatography on silica gel (0 to 10% EtOAc in hexane). 15.355 g of product was isolated as a white solid (66% over two steps).

$^{1}H$ NMR (500 MHz, $CDCl_3$) δ 9.56 (s, 1H), 7.30 (dt, J=7.8, 1.7 Hz, 1H), 7.15 (td, J=7.7, 1.8 Hz, 1H), 7.01 (dt, J=7.5, 1.7 Hz, 1H), 6.93 (s, 2H), 3.11 (s, 3H), 2.32 (s, 3H), 2.04 (s, 6H), 1.41 (s, 6H).

$^{13}C$ NMR (126 MHz, $CDCl_3$) δ 202.78, 154.95, 137.01, 136.88, 136.22, 135.21, 132.47, 131.30, 128.28, 125.68, 123.52, 59.20, 48.42, 23.05, 21.04, 20.52.

Scheme 14. Synthesis of Diol 63

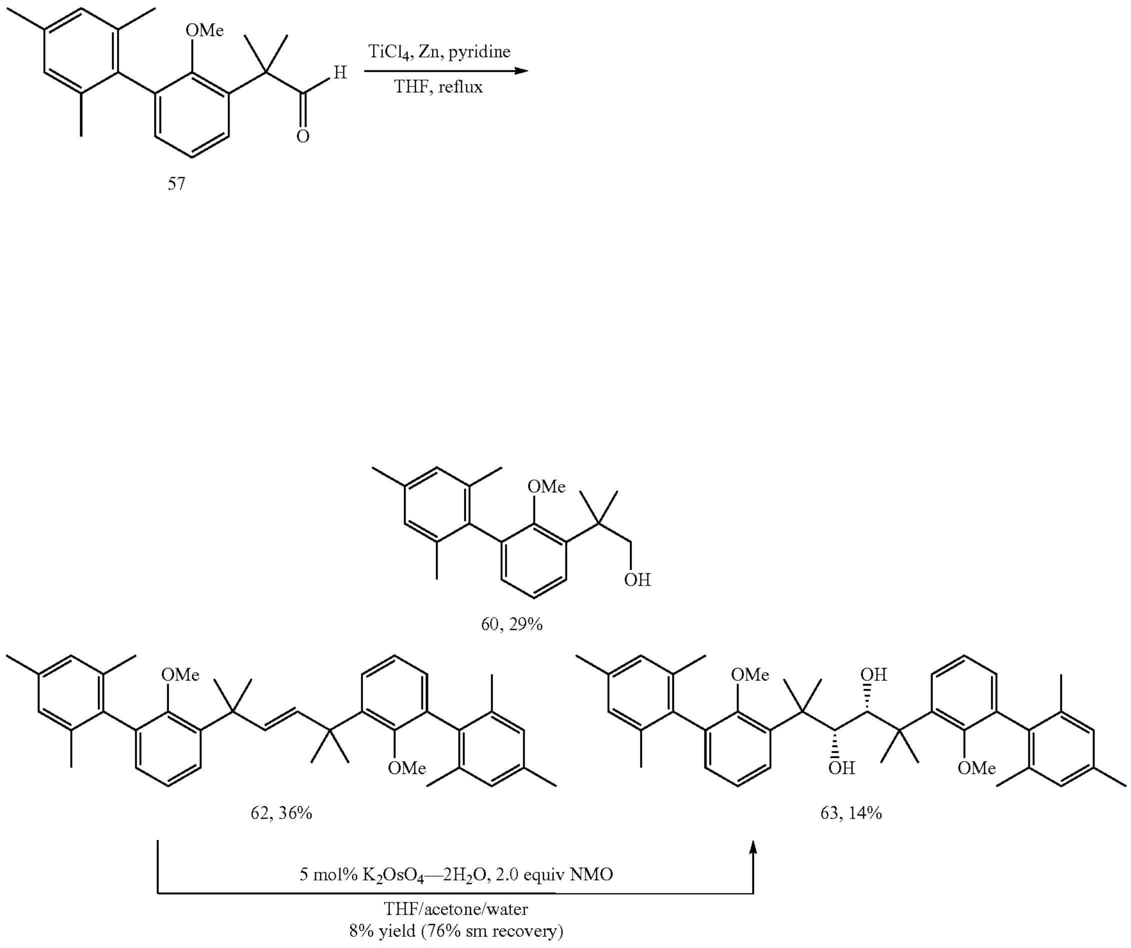

57

60, 29%

62, 36%

63, 14%

McMurray Coupling of 2-(2-methoxy-2',4',6'-trimethyl-[1,1'-biphenyl]-3-yl)-2-methylpropanal A 100 mL 3-neck round bottom flask was connected to a reflux condenser and was placed under a nitrogen atmosphere. 20 mL of dry THF was added. The flask was cooled to 0° C. and $TiCl_4$ (1.09 mL, 10.0 mmol, 1.19 equiv) was added over 5 minutes. Zinc dust (1.27 g, 19.4 mmol, 2.30 equiv) was added, and the mixture stirred for 10 minutes. Pyridine (0.77 mL, 9.52 mmol, 1.13 equiv) was added, and the mixture was refluxed for 1 hour. A solution of the aldehyde 57 (2.50 g, 8.43 mmol, 1.00 equiv) in 7.5 mL THF was added to the Ti/Zn/pyridine solution by syringe pump over 2 hours. The slurry was allowed to reflux for 20 hours.

The solution was cooled, and quenched with sat. aq. Sodium bicarbonate. The slurry was filtered through celite, and product was extracted with portions of dichloromethane. The combined organic fractions were purified by chromatography on silica gel (0 to 100% EtOAc in hexane). Four portions were isolated: 0.894 g of alkene product 62 (36%); 0.358 g of diol 63 with a few contaminants (14%); 0.732 g of a mixture of materials, the majority being the primary alcohol 60 from aldehyde reduction; 74.2 mg of a mixture of unidentified materials.

(E)-',3'''-(2,5-dimethylhex-3-ene-2,5-diyl)bis(2'-methoxy-2,4,6-trimethyl-1,1'-biphenyl) [Compound 62]

$^1$H NMR (500 MHz, $CDCl_3$) δ 7.33-7.27 (m, 2H), 7.00 (td, J=7.7, 1.2 Hz, 2H), 6.92 (s, 4H), 6.89 (dt, J=7.4, 1.5 Hz, 2H), 5.83 (s, 2H), 3.12 (s, 6H), 2.32 (s, 6H), 2.04 (s, 12H), 1.48 (s, 12H).

$^{13}$C NMR (126 MHz, $CDCl_3$) δ 157.25, 141.99, 136.50, 136.34, 136.30, 135.62, 133.59, 130.03, 128.16, 126.10, 122.60, 59.39, 39.79, 28.52, 21.04, 20.61.

Synthesis of rac-(3R,4R)-2,5-bis(2-methoxy-2',4',6'-trimethyl-[1,1'-biphenyl]-3-yl)-2,5-dimethylhexane-3,4-diol [Compound 63]

A 100 mL round bottom flask was charged with N-morpholine N-oxide (0.373 g, 3.18 mmol, 2.00 equiv) and 9 mL water. Potassium osmate (29.3 mg, 0.0795 mmol, 5.00 mol %) was added, and the mixture stirred for 1 minute. Meanwhile, the alkene 62 (0.890 g, 1.59 mmol, 1.00 equiv) was dissolved in 40 mL of 1:1 acetone:THF. The organic solution was added to the Os solution, and the mixture stirred for 72 hours. It was fairly heterogeneous.

The reaction was quenched with aqueous sodium metabisulfate, and product was extracted with portions of dichloromethane. The organic phase was purified by chromatography on silica gel. Two portions were isolated: 0.677 g starting material (76% recovery); 79.1 mg product 63 (8% yield).

$^1$H NMR (400 MHz, $CDCl_3$) δ 7.29 (dd, J=7.9, 1.8 Hz, 2H), 7.05 (t, J=7.7 Hz, 2H), 6.97-6.88 (m, 6H), 4.15 (d, J=7.0 Hz, 2H), 3.17 (s, 6H), 2.94 (d, J=7.0 Hz, 2H), 2.33 (s, 6H), 2.06 (s, 6H), 2.03 (s, 6H), 1.37 (s, 6H), 1.36 (s, 6H).

$^{13}$C NMR (101 MHz, $CDCl_3$) δ 156.76, 138.78, 136.70, 136.62, 136.15, 136.07, 133.39, 130.73, 128.25, 128.17, 127.90, 123.09, 73.38, 59.41, 43.72, 25.22, 25.09, 21.03, 20.80, 20.55.

Scheme 15. Synthesis of Ligand 19 and Ligand 20

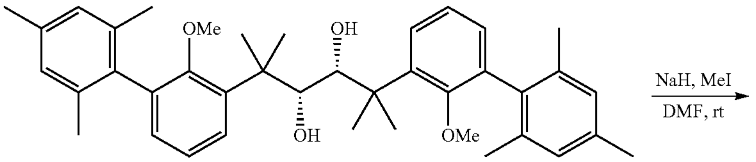

63

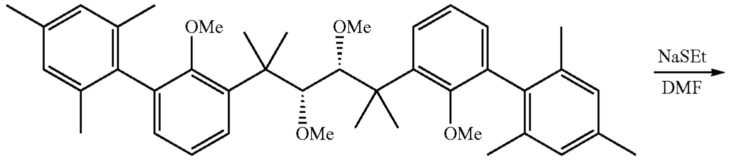

65, 60%

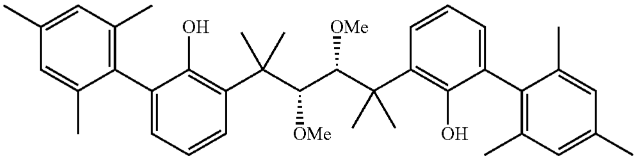

L19, 92%

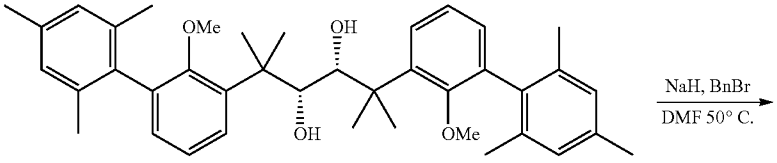

63

-continued

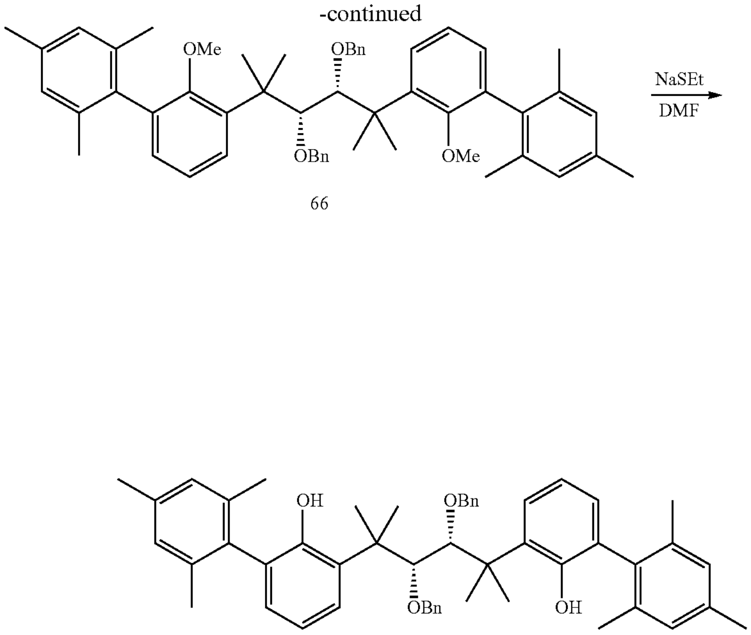

66

L20, 63% (2 steps)

Synthesis of rac-3',3'''-((3R,4R)-3,4-dimethoxy-2,5-dimethylhexane-2,5-diyl)bis(2'-methoxy-2,4,6-trimethyl-1,1'-biphenyl) [Compound 65]

In a nitrogen-filled glovebox, a 50 mL round bottom flask was charged with diol 63 (0.250 g, 0.420 mmol, 1.00 equiv) and 2 mL DMF. After the diol had dissolved, sodium hydride (40.3 mg, 1.68 mmol, 4.00 equiv) was added. After 5 minutes, iodomethane (0.105 mL, 1.68 mmol, 4.00 equiv) was injected. The mixture stirred at ambient temperature for 4 hours, and the solution gradually became cloudy and heterogeneous.

The solution was cautiously quenched with methanol, and adsorbed to celite for purification by chromatography on silica gel (0 to 10% EtOAc in hexane). 158 mg of product was isolated as a white solid (60%).

$^{1}$H NMR (500 MHz, $CDCl_3$) δ 7.37 (s, 2H), 7.04 (t, J=7.6 Hz, 2H), 6.96-6.86 (m, 6H), 4.18 (s, 2H), 3.12 (s, 6H), 2.99 (s, 6H), 2.32 (s, 6H), 2.08 (s, 6H), 2.03 (s, 6H), 1.51 (s, 6H), 1.41 (s, 6H).

$^{13}$C NMR (126 MHz, $CDCl_3$) δ 156.98, 142.01, 136.63, 136.53, 136.49, 136.08, 132.96, 130.45, 128.28, 128.21, 127.53, 122.77, 84.05, 60.36, 59.10, 43.58, 27.25, 24.25, 21.02, 20.98, 20.64.

Synthesis of 3,3''-((3R,4R)-3,4-dimethoxy-2,5-dimethylhexane-2,5-diyl)bis(2',4',6'-trimethyl-[1,1'-biphenyl]-2-ol) [Ligand 19 (L-19)]

In a glovebox, a 50 mL round bottom flask was charged with substrate 65 (81 mg, 0.130 mmol, 1.00 equiv) and 1.7 mL DMF. Sodium ethanethiolate (58 mg, 5.0 equiv) was added, and the mixture was stirred at 130° C. for three hours.

The flask was transferred to a fume hood, and the mixture was quenched with ~0.2 mL acetic acid. The solution was directly adsorbed to celite for purification by chromatography on silica gel (0 to 20% EtOAc in hexane). 71.1 mg of white solid was isolated (92%).

$^{1}$H NMR (500 MHz, $CDCl_3$) δ 9.40 (s, 2H), 7.16 (dd, J=7.8, 1.8 Hz, 2H), 6.94 (s, 2H), 6.92-6.87 (m, 4H), 6.84 (t, J=7.5 Hz, 2H), 3.32 (s, 2H), 2.77 (s, 6H), 2.30 (s, 6H), 2.05 (s, 6H), 1.91 (s, 6H), 1.44 (br s, 12H).

$^{13}$C NMR (126 MHz, $CDCl_3$) δ 154.01, 136.43, 136.38, 135.90, 131.47, 129.86, 129.54, 128.06, 128.02, 126.13, 118.75, 89.34, 61.70, 43.97, 28.59, 24.52, 21.10, 20.79, 20.26.

Synthesis of 3,3''-((3R,4R)-3,4-bis(benzyloxy)-2,5-dimethylhexane-2,5-diyl)bis(2',4',6'-trimethyl-[1,1'-biphenyl]-2-ol [Ligand 20 (L-20)]

A 50 mL round bottom flask was charged with diol 63 (87 mg, 0.146 mmol, 1.00 equiv) and 1.5 mL DMF. Sodium hydride (14 mg, 0.59 mmol, 4.0 equiv) was added, followed by benzyl bromide (0.070 mL, 0.59 mmol, 4.0 equiv). The mixture stirred at 50° C. for 4 hours. TLC showed consumption of starting material.

The solution was quenched with methanol and directly adsorbed to silica gel for purification by chromatography on silica (0 to 10% EtOAc in hexane). A colorless oil was isolated, which was taken on to the next step.

The oil was dissolved in 1.5 mL DMF, and was treated with sodium ethanethiolate (148 mg, 12.0 equiv) at 80° C. for 48 hours. The solution was then diluted with dichloromethane, and adsorbed to silica. This was dry-loaded for chromatography on silica gel (0 to 10% EtOAc in hexane). An oily residue was isolated that contained some impurities by NMR. This material was further purified by supercritical —$CO_2$ chromatography to give 69 mg of a white solid (63% over two steps).

$^{1}$H NMR (500 MHz, $CDCl_3$) δ 7.23-7.07 (m, 12H), 6.94 (s, 2H), 6.91-6.76 (m, 6H), 4.87-3.60 (m, 6H), 2.30 (s, 6H), 1.97 (s, 6H), 1.73 (s, 6H), 1.46 (s, 6H), 1.37 (s, 6H).

$^{13}$C NMR (126 MHz, $CDCl_3$) δ 152.48, 138.71, 137.35, 137.25, 137.15, 132.60, 129.05, 128.39, 127.95, 127.60, 126.91, 119.49, 74.44, 44.17, 26.59, 24.91, 21.06, 20.29, 20.16.

Scheme 16. Synthesis of Ligand 21

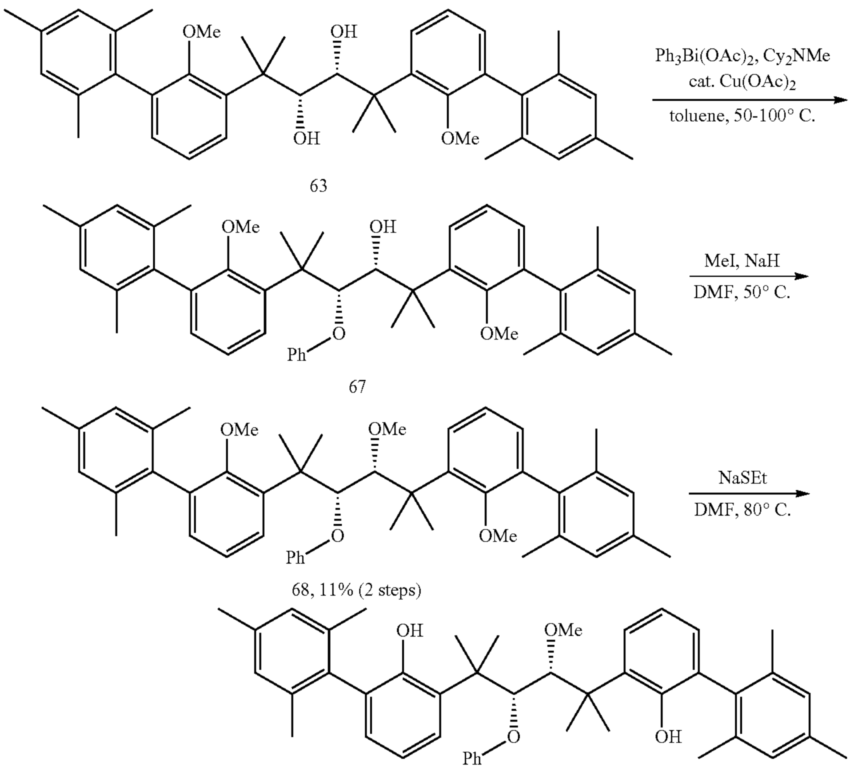

63

67

68, 11% (2 steps)

L21, 41%

Synthesis of 3',3'''-((3R,4R)-3-methoxy-2,5-dimethyl-4-phenoxyhexane-2,5-diyl)bis(2'-methoxy-2,4,6-trimethyl-1,1'-biphenyl) [Compound 68]

In a glovebox, a 50 mL round bottom flask was charged with diol 63 (400 mg, 0.657 mmol, 1.00 equiv) and 5.2 mL toluene. $Ph_3Bi(OAc)_2$ (551 mg, 0.986 mmol, 1.50 equiv) was added, followed by $Cu(OAc)_2$ (18 mg, 0.099 mmol, 0.15 equiv), and N,N-dicyclohexylmethylamine (0.281 mL, 1.31 mmol, 2.00 equiv). The vial was sealed and stirred at 50° C. overnight.

UPLC showed partial conversion to mono-arylated material. The mixture was heated to 100° C. for another 24 hours.

The solution was cooled and quenched with 1M HCl. Product was extracted with portions of dichloromethane. Combined organic fractions were purified by chromatography on silica gel (0 to 20% EtOAc in hexane). Intermediate 67 contaminated with small amounts of $BiPh_3$ or oxidation products (104 mg) was isolated.

The residue containing intermediate 67 was treated with 1.0 mL DMF, sodium hydride (11 mg, 0.447 mmol, 3.0 equiv), and sodium iodide (0.028 mL, 0.447 mmol, 3.0 equiv). The mixture was stirred at 50° C. overnight. The solution was quenched with aq. $NH_4Cl$ and extracted with several portions of dichloromethane. Combined organic fractions were concentrated and the residue was purified by chromatography on silica gel (0 to 10% EtOAc in hexane). 49.7 mg of the aryl-methyl ether 68 was isolated (11% over two steps).

$^1H$ NMR (400 MHz, $CDCl_3$) δ 7.32 (ddd, J=13.3, 7.9, 1.8 Hz, 2H), 7.22-7.15 (m, 2H), 7.08-6.82 (m, 11H), 5.65 (s, 1H), 4.05 (s, 1H), 3.27 (s, 3H), 2.92 (s, 3H), 2.77 (s, 3H), 2.33 (s, 3H), 2.31 (s, 3H), 2.11 (s, 3H), 2.05 (s, 3H), 2.00 (2×d, 6H), 1.59 (s, 3H), 1.40 (s, 3H), 1.35 (s, 3H), 1.31 (s, 3H).

$^{13}C$ NMR (101 MHz, $CDCl_3$) δ 159.69, 157.11, 156.93, 141.59, 139.60, 136.80, 136.58, 136.55, 136.43, 136.37, 136.29, 136.17, 132.59, 132.55, 131.06, 130.60, 129.11, 128.31, 128.26, 128.23, 128.20, 127.77, 127.58, 122.66, 122.62, 119.67, 115.78, 84.88, 60.70, 59.50, 58.83, 45.46, 43.41, 27.04, 24.63, 24.05, 21.05, 21.03, 20.96, 20.93, 20.82, 20.61.

Synthesis of 3,3''-((3R,4R)-3-methoxy-2,5-dimethyl-4-phenoxyhexane-2,5-diyl)bis(2',4',6'-trimethyl-[1,1'-biphenyl]-2-ol) [Ligand 21 (L-21)]

In a glovebox, a 50 mL round bottom flask was charged with the dimethyl ether 68 (60 mg, 0.0876 mmol, 1.00 equiv) and 1.5 mL dry DMF. The solution was treated with sodium ethanethiolate (74 mg, 1.05 mmol, 12.0 equiv). The solution was stirred at 80° C. for 14 hours.

UPLC/MS showed near-complete conversion, and the mixture was stirred at 120° C. for an additional 6 hours.

The solution was quenched with aq. $NH_4Cl$, and product was extracted with several portions of dichloromethane. Combined organic fractions were concentrated, and the residue purified by chromatography on silica gel (0 to 20% EtOAc in hexane). 23.8 mg of a white solid was isolated (41%).

$^1H$ NMR (400 MHz, $CDCl_3$) δ 7.29 (d, J=9.7 Hz, 1H), 7.17-5.65 (m, 16H), 5.26 (s, 1H), 3.71 (s, 1H), 3.16 (s, 3H), 2.35 (s, 3H), 2.30 (s, 3H), 2.03 (s, 3H), 1.98 (s, 3H), 1.92 (s, 3H), 1.71 (s, 3H), 1.42 (s, 3H), 1.35 (s, 3H), 1.32 (s, 6H).

$^{13}C$ NMR (101 MHz, $CDCl_3$) δ 158.76, 152.35, 151.87, 137.61, 137.48, 137.09, 137.04, 136.84, 134.30, 133.03, 132.55, 131.93, 129.26, 128.94, 128.76, 128.66, 128.24, 128.13, 127.07, 126.71, 120.25, 119.99, 119.05, 115.81, 87.20, 79.25, 62.62, 44.95, 44.30, 27.41, 27.02, 25.36, 23.63, 21.10, 21.08, 20.41, 20.38, 20.23, 20.19.

Scheme 17. Synthesis of Diol 72

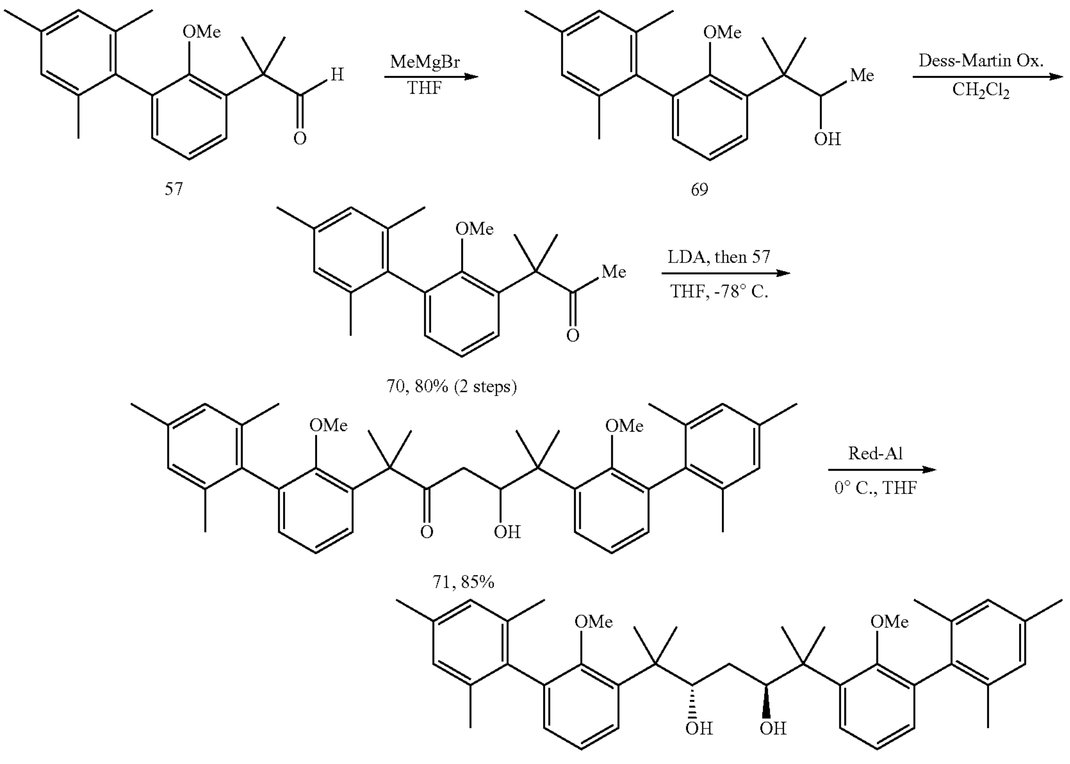

57

69

70, 80% (2 steps)

71, 85%

72, 88% anti (+ 7% syn isomer)

Synthesis of 3-(2-methoxy-2',4',6'-trimethyl-[1,1'-biphenyl]-3-yl)-3-methylbutan-2-one [Compound 70]

A 250 mL round bottom flask was charged with aldehyde 57 (2.80 g, 9.45 mmol, 1.00 equiv) and 47 mL dry diethyl ether. Under a blanket of nitrogen, methylmagnesium bromide (3.0 M in diethyl ether, 3.80 mL, 11.3 mmol, 1.20 equiv) was added dropwise. After 1 hour, the solution was quenched with sat. aq. $NH_4Cl$, and product was extracted with portions of diethyl ether. The combined organic fractions were dried with $MgSO_4$, filtered, and concentrated to give a colorless oil. Proton/Carbon NMR showed the intermediate alcohol with a little bit of diethyl ether contamination. The material was taken on to the next step without further purification.

The alcohol was dissolved in 50 mL dichloromethane and was treated with Dess-Martin reagent (4.80 g, 11.3 mmol, 1.20 equiv) at ambient temperature. Within 1 hour, TLC showed complete consumption of the intermediate alcohol. The solution was quenched with sodium thiosulfate solution, and product was extracted with several portions of dichloromethane. Combined organic fractions were concentrated and the residue purified by chromatography on silica gel (0 to 10% EtOAc in hexane). 2.34 g of a colorless solid was isolated (80%).

$^1H$ NMR (500 MHz, $CDCl_3$) δ 7.34 (dd, J=7.8, 1.7 Hz, 1H), 7.13 (t, J=7.6 Hz, 1H), 6.98 (dd, J=7.6, 1.7 Hz, 1H), 6.93 (s, 2H), 3.10 (s, 3H), 2.32 (s, 3H), 2.03 (s, 6H), 2.02 (s, 3H), 1.44 (s, 6H).

$^{13}C$ NMR (126 MHz, $CDCl_3$) δ 211.10, 154.96, 138.99, 136.94, 136.22, 135.40, 132.34, 130.98, 128.24, 124.92, 123.30, 58.99, 50.45, 25.47, 24.98, 21.03, 20.56.

Synthesis of 5-hydroxy-2,6-bis(2-methoxy-2',4',6'-trimethyl-[1,1'-biphenyl]-3-34)-2,6-dimethylheptan-3-one [Compound 71]

A 250 mL round bottom flask was charged with 20 mL dry THF and diisopropylamine (1.16 mL, 8.22 mmol, 1.10 equiv). The solution was cooled to −78° C. under nitrogen and n-butyllithium (1.6 M in hexane, 5.14 mL, 8.22 mmol, 1.10 equiv) was added dropwise. The mixture stirred at −78° C. for 20 minutes and 0° C. for 20 minutes. The LDA solution was returned to a −78° C. bath and ketone 70 (2.321 g, 7.476 mmol, 1.00 equiv) in 20 mL dry THF was added dropwise. The mixture stirred at −78° C. for 1 hour. Then, a solution of aldehyde 57 (2.22 g, 7.48 mmol, 1.00 equiv) in 20 mL dry THF was added. The mixture stirred at −78° C. for 1 hour, at which point UPLC indicated that the aldol product had formed. The solution was quenched with sat. aq. $NH_4Cl$ at −78° C., and was allowed to warm to ambient temperature. The phases were separated, and the aqueous phase extracted with a few portions of dichloromethane. Combined organic fractions were concentrated, and the residue purified by chromatography on silica gel (0 to 20% EtOAc in hexane). 3.866 g of product was isolated as a colorless oil (85%).

$^1H$ NMR (500 MHz, $CDCl_3$) δ 7.26-7.23 (m, 1H), 7.19 (dd, J=7.9, 1.7 Hz, 1H), 7.09 (t, J=7.6 Hz, 1H), 7.01 (t, J=7.6 Hz, 1H), 6.96-6.86 (m, 6H), 4.79 (ddd, J=10.3, 3.6, 1.7 Hz, 1H), 3.21-3.15 (m, 4H), 3.06 (s, 3H), 2.39-2.28 (m, 7H), 2.22 (dd, J=17.3, 1.7 Hz, 1H), 2.02 (2×s, 6H), 1.98 (s, 3H), 1.93 (s, 3H), 1.41 (s, 3H), 1.37 (s, 3H), 1.34 (s, 3H), 1.29 (s, 3H).

$^{13}C$ NMR (126 MHz, $CDCl_3$) δ 213.85, 156.97, 154.58, 139.10, 138.44, 136.93, 136.68, 136.27, 136.23, 136.14, 136.12, 136.09, 135.35, 133.66, 132.32, 131.02, 130.49, 128.28, 128.26, 128.18, 127.13, 125.12, 123.40, 123.13, 72.40, 59.43, 59.10, 50.55, 42.74, 39.79, 25.58, 25.52, 25.49, 22.77, 21.04, 21.03, 20.72, 20.71, 20.65, 20.63.

Synthesis of rac-(3R,5R)-2,6-bis(2-methoxy-2',4',6'-trimethyl-[1,1'-biphenyl]-3-yl)-2,6-dimethylheptane-3,5-diol [Compound 72]

A 250 mL round bottom flask was charged with keto-alcohol 71 (3.10 g, 5.11 mmol, 1.00 equiv) and 50 mL dry THF. The mixture was chilled to 0° C. under nitrogen. Red-Al (60 wt % in toluene, 1.99 mL, 6.13 mmol, 1.20 equiv) was added dropwise, and the mixture stirred for 1 hour. TLC showed complete consumption of starting material. The solution was quenched with methanol, then aq. Rochelle's salt, and product was extracted with portions of dichloromethane. Combined organic fractions were concentrated, and the residue was purified by chromatography on silica gel (0 to 20% EtOAc in hexane). Two portions were isolated: 0.213 g of a white solid (7%, meso isomer); and 2.732 g of a white solid (88%, desired rac isomer)

$^{1}H$ NMR (500 MHz, $CDCl_3$) δ 7.18 (dd, J=7.9, 1.7 Hz, 2H), 7.01 (t, J=7.7 Hz, 2H), 6.96-6.87 (m, 6H), 4.19 (td, J=7.1, 4.8 Hz, 2H), 3.22 (s, 6H), 2.76 (d, J=6.8 Hz, 2H), 2.33 (s, 6H), 2.07 (s, 6H), 2.01 (s, 6H), 1.35 (s, 6H), 1.34 (s, 6H), 1.00 (dd, J=7.2, 4.8 Hz, 2H).

$^{13}C$ NMR (126 MHz, $CDCl_3$) δ 156.47, 138.94, 136.77, 136.33, 136.04, 135.94, 133.71, 130.48, 128.29, 128.22, 127.61, 123.38, 75.01, 59.70, 43.44, 36.70, 26.36, 24.39, 21.05, 20.81, 20.67.

Scheme 18. Synthesis of Ligand 22 and Ligand 23

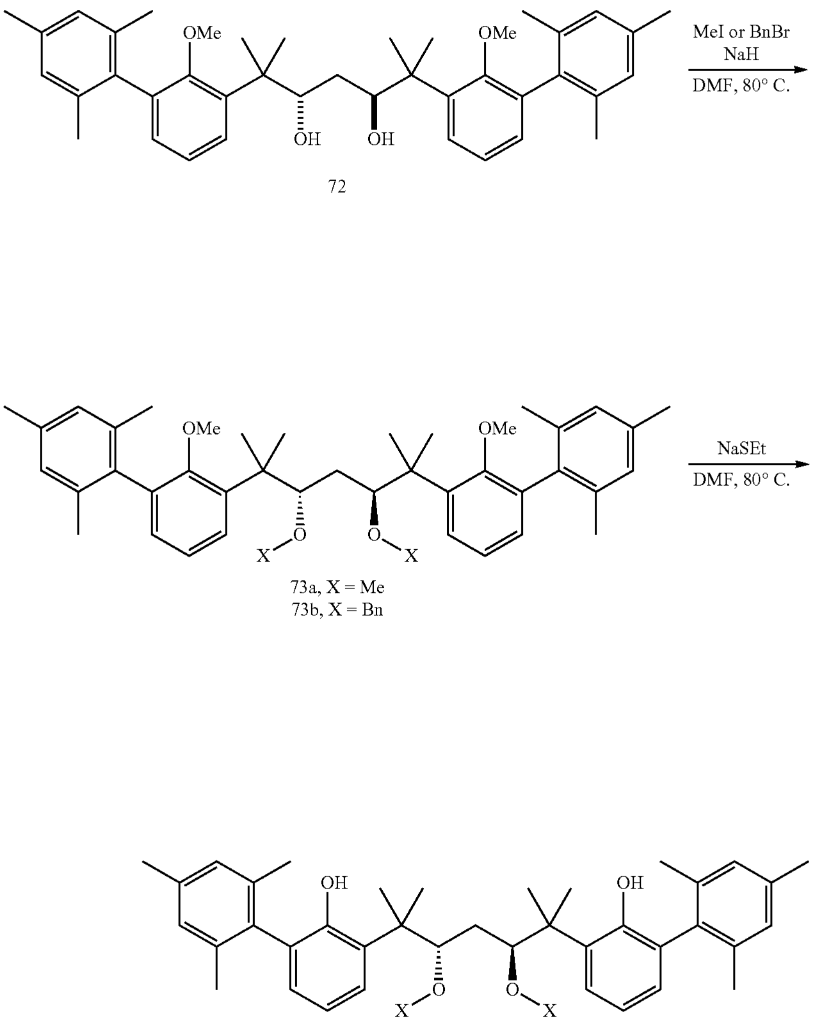

72

73a, X = Me
73b, X = Bn

X = Me, L23, 69% over two steps
X = Bn, L22, 34% over two steps

Synthesis of rac-3,3"-((3R,5R)-3,5-bis(benzyloxy)-2,6-dimethylheptane-2,6-diyl)bis(2',4',6'-trimethyl-[1,1'-biphenyl]-2-ol) [Ligand 22 (L22)]

In a glovebox, a 20 mL vial was charged with diol 72 (250 mg, 0.411 mmol, 1.00 equiv) and 1.6 mL dry DMF. Sodium hydride (39.4 mg, 1.64 mmol, 4.00 equiv) was added. After stirring 15 minutes, benzyl bromide (195 μL, 1.64 mmol, 4.00 equiv) was injected. The vial was capped and allowed to stir at 50° C. for 14 hours.

The solution was cautiously quenched with water, and product was extracted with several portions of dichloromethane. Combined organic fractions were concentrated, and the residue was purified by chromatography on silica gel (0 to 10% EtOAc in hexane). 340 mg of a colorless oil was isolated. Proton NMR showed this material to contain product and a few other impurities. It was decided to use this material for the next step without further purification.

The residue was dissolved in 2 mL dry DMF, and was treated with sodium ethanethiolate (173 mg, 5.0 equiv). The solution was stirred at 80° C. overnight. Only partial conversion was observed. The temperature was raised to 110° C. for another 24 hours. UPLC showed cleavage of the methyl groups. The solution was quenched with aq. $NH_4Cl$, and product was extracted with several portions of dichloromethane. Combined organic fractions were purified by chromatography on silica gel (0 to 20% EtOAc in hexane). The resulting material still contained some impurities and was further purified by SFC chromatography. 106 mg of a colorless oil was isolated (34% over two steps).

$^1H$ NMR (500 MHz, $CDCl_3$) δ 7.66 (br s, 2H), 7.30-7.11 (m, 10H), 7.01-6.86 (m, 6H), 6.80 (d, J=7.4 Hz, 2H), 6.72 (t, J=7.6 Hz, 2H), 4.63 (d, J=12.1 Hz, 2H), 4.16 (d, J=12.1 Hz, 2H), 3.71 (s, 2H), 2.32 (s, 6H), 2.00-1.93 (m, 12H), 1.37 (s, 6H), 1.31 (s, 6H), 1.21-1.16 (m, 2H).

$^{13}C$ NMR (126 MHz, $CDCl_3$) δ 151.91, 137.84, 136.76, 136.63, 135.19, 131.18, 128.86, 128.64, 128.37, 128.18, 128.00, 127.79, 127.74, 127.05, 126.56, 119.49, 86.14, 75.37, 43.86, 37.24, 27.07, 24.44, 21.14, 20.52, 20.32.

Synthesis of rac-3,3"-((3R,5R)-3,5-dimethoxy-2,6-dimethylheptane-2,6-diyl)bis(2',4',6'-trimethyl-[1,1'-biphenyl]-2-ol) [Ligand 23 (L23)]

In a glovebox, a 20 mL vial was charged with diol 72 (250 mg, 0.411 mmol, 1.00 equiv) and 1.6 mL dry DMF. Sodium hydride (39.4 mg, 1.64 mmol, 4.00 equiv) was added. After stirring 15 minutes, iodomethane (102 μL, 1.64 mmol, 4.00 equiv) was injected. The vial was capped and allowed to stir at 50° C. for 14 hours.

The solution was cautiously quenched with water, and product was extracted with several portions of dichloromethane. Combined organic fractions were concentrated, and the residue was purified by chromatography on silica gel (0 to 10% EtOAc in hexane). 230 mg of a colorless, oily residue was isolated and taken on to the next step.

In a glovebox, a 50 mL round bottom flask was charged with the dimethyl ether (230 mg, 0.361 mmol, 1.00 equiv) and 2.0 mL dry DMF. The solution was treated with sodium ethanethiolate (138 mg, 1.64 mmol, 4.55 equiv). The solution was stirred at 80° C. for 14 hours.

The solution was quenched with aq. $NH_4Cl$, and product was extracted with several portions of dichloromethane. Combined organic fractions were concentrated, and the residue purified by chromatography on silica gel (0 to 20% EtOAc in hexane). 171 mg of a white solid was isolated (78%).

$^1H$ NMR (500 MHz, $CDCl_3$) δ 8.72 (s, 2H), 6.95 (s, 2H), 6.94 (s, 2H), 6.87 (dd, J=7.9, 1.7 Hz, 2H), 6.82 (dd, J=7.3, 1.6 Hz, 2H), 6.71 (t, J=7.6 Hz, 2H), 3.60 (s, 6H), 3.47-3.37 (m, 2H), 2.31 (s, 6H), 1.98 (s, 6H), 1.96 (s, 6H), 1.40 (s, 6H), 1.28 (s, 6H), 1.08 (dd, J=6.8, 4.7 Hz, 2H).

$^{13}C$ NMR (126 MHz, $CDCl_3$) δ 152.12, 136.53, 136.48, 136.36, 135.85, 130.45, 129.14, 128.97, 128.01, 127.93, 126.45, 119.36, 88.74, 61.86, 43.87, 36.80, 27.65, 24.28, 21.13, 20.43, 20.29.

Scheme 19. Synthesis of Oxime 77

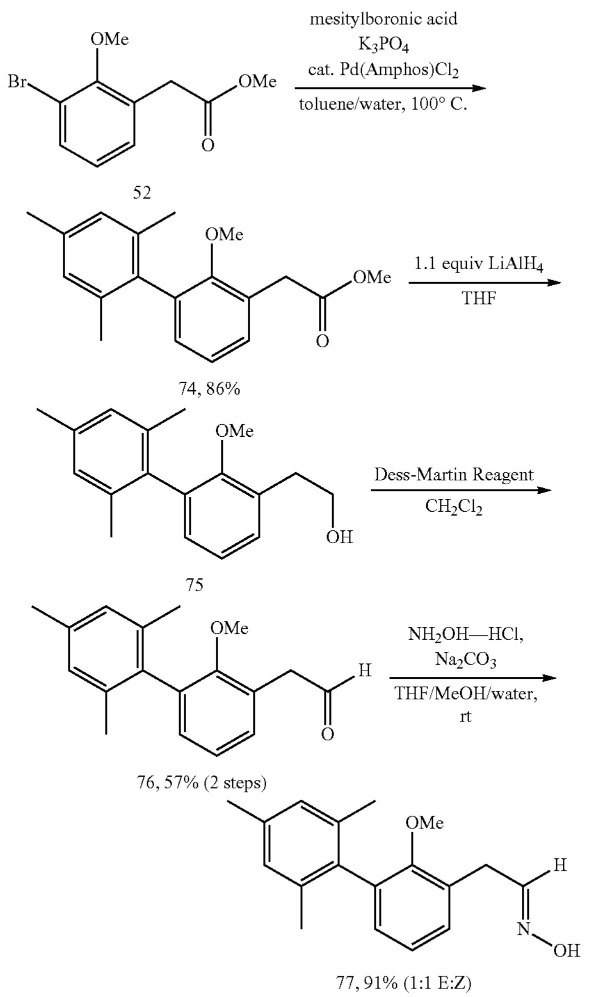

52

74, 86%

75

76, 57% (2 steps)

77, 91% (1:1 E:Z)

Synthesis of methyl 2-(2-methoxy-2',4',6'-trimethyl-[1,1'-biphenyl]-3-yl)acetate [Compound 74]

A 1 L round bottom flask was charged with bromoarene (26.735 g, 103.2 mmol, 1.00 equiv), mesitylboronic acid (22.0 g, 134 mmol, 1.30 equiv), and Pd(AmPhos)$Cl_2$ (1.46 g, 2.0 mol %). A reflux condenser was attached, and 260 mL of degassed toluene was added under a blanket of nitrogen, followed by addition of nitrogen-sparged aqueous $K_3PO_4$ (2M in water, 155 mL, 310 mmol, 3.00 equiv). The mixture was stirred at 100° C. overnight.

The solution was cooled, and the phases separated. The aqueous phase was extracted with two additional portions of ethyl acetate. Combined organic fractions were concentrated and the residue purified by chromatography on silica gel (0 to 15% EtOAc in hexane). 26.357 g of material was isolated as a colorless oil (86%).

$^1$H NMR (400 MHz, $CDCl_3$) δ 7.21 (dd, J=7.5, 1.8 Hz, 1H), 7.09 (t, J=7.5 Hz, 1H), 6.98 (dd, J=7.6, 1.8 Hz, 1H), 6.95-6.88 (m, 2H), 3.76-3.62 (m, 5H), 3.28 (s, 3H), 2.32 (s, 3H), 2.04 (s, 6H).

$^{13}$C NMR (101 MHz, $CDCl_3$) δ 172.34, 156.04, 136.76, 136.31, 135.18, 133.29, 130.99, 129.76, 128.10, 127.82, 123.61, 59.71, 51.88, 36.23, 21.05, 20.54.

Synthesis of 2-(2-methoxy-2',4',6'-trimethyl-[1,1'-biphenyl]-3-yl)acetaldehyde [Compound 76]

A 500 mL round bottom flask was charged with ester 74 (14.826 g, 49.7 mmol, 1.00 equiv) and 250 mL dry THF. The solution was cooled in a 0° C. ice bath under a blanket of nitrogen. Lithium aluminum hydride (2 M in THF, 27.3 mL, 54.6 mmol, 1.10 equiv) was added dropwise. The mixture stirred for 2 hours, and was cautiously worked up using the Fieser protocol (2.1 mL water, followed by 2.1 mL 15% aq. NaOH, followed by 6.2 mL water, followed by filtration). The filtrate was concentrated to a clear, colorless oil which was used without further purification.

The crude alcohol was dissolved in 250 mL of dichloromethane (with a few drops of water), and was treated with Dess-Martin reagent (21.1 g, 49.7 mmol, 1.00 equiv) in portions over 10 minutes. The mixture was allowed to stir overnight.

The slurry was filtered through a plug of celite, and the filter cake was rinsed with a few portions of dichloromethane. The filtrate was concentrated and purified by chromatography on silica gel (0 to 10% EtOAc in hexane). 7.65 of aldehyde was isolated as a colorless oil (57% over two steps).

$^1$H NMR (400 MHz, $CDCl_3$) δ 9.74 (t, J=2.2 Hz, 1H), 7.20-7.09 (m, 2H), 7.02 (dd, J=7.4, 2.0 Hz, 1H), 6.94 (d, J=1.3 Hz, 2H), 3.71 (d, J=2.1 Hz, 2H), 3.26 (s, 3H), 2.33 (s, 3H), 2.05 (s, 6H).

$^{13}$C NMR (101 MHz, $CDCl_3$) δ 199.81, 156.15, 136.93, 136.23, 134.96, 133.39, 131.48, 130.21, 128.16, 125.88, 123.91, 59.58, 45.84, 21.05, 20.55.

Synthesis of (E/Z)-2-(2-methoxy-2',4',6'-trimethyl-[1,1'-biphenyl]-3-yl)acetaldehyde oxime [Compound 77]

A 250 mL round bottom flask was charged with aldehyde 76 (7.65 g, 28.5 mmol) and 38 mL 1:1 MeOH:THF. The mixture was stirred until the aldehyde dissolved. Hydroxylamine hydrochloride (31.4 mmol, 1.10 equiv) was added, followed by 19 mL water. To the slurry was slowly added a solution of sodium carbonate (1.52 g, 14.3 mmol, 0.500 equiv) in 20 mL water. Some effervescence was observed.

The mixture stirred for 2 hours, and TLC showed complete consumption of aldehyde. Volatiles were removed by rotary evaporation and the aqueous residue was extracted with several portions of dichloromethane. Combined organic fractions were dried with sodium sulfate, filtered, and concentrated to an amber oil (7.36 g, 91%). Proton/Carbon NMR were consistent with product oxime as a mixture of E/Z isomers (~1:1).

$^1$H NMR (400 MHz, $CDCl_3$) δ 8.61 (d, J=57.5 Hz, 0.5H), 8.16 (d, J=55.4 Hz, 0.5H), 7.59 (t, J=6.1 Hz, 0.5H), 7.19 (ddd, J=11.5, 7.5, 1.8 Hz, 1H), 7.09 (t, J=7.5 Hz, 1H), 6.96 (ddd, J=7.5, 1.8, 0.9 Hz, 1H), 6.94-6.91 (m, 2H), 6.89 (t, J=5.2 Hz, 0.5H), 3.79 (d, J=5.2 Hz, 1H), 3.60 (d, J=6.1 Hz, 1H), 3.31 (d, J=0.6 Hz, 3H), 2.33 (s, 3H), 2.04 (d, J=2.5 Hz, 6H).

$^{13}$C NMR (101 MHz, $CDCl_3$) δ 155.99, 155.82, 151.07, 150.82, 150.79, 136.76, 136.26, 136.24, 135.20, 135.19, 133.62, 133.60, 130.70, 130.56, 129.91, 129.46, 129.43, 129.33, 128.09, 123.85, 123.84, 59.89, 59.77, 30.82, 26.92, 21.05, 20.58.

Scheme 20. Synthesis of Alkene 81

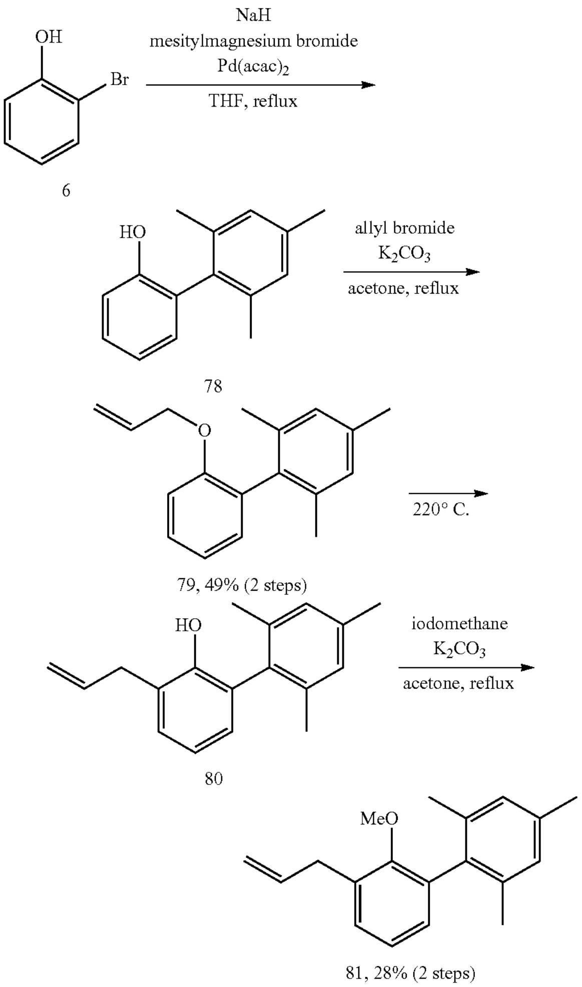

Synthesis of 2'-(allyloxy)-2,4,6-trimethyl-1,1'-biphenyl [Compound 79]

In a glovebox, a 500 mL round bottom flask was charged with 2-bromophenol and 120 mL dry THF. The mixture was stirred and sodium hydride (1.728 g, 72.0 mmol, 1.20 equiv) was added in portions over 10 minutes. The mixture stirred for 10 minutes prior to the addition of $Pd(acac)_2$ (740 mg) and mesitylmagnesium bromide (1.0 M in THF, 90.0 mL, 90.0 mmol, 1.50 equiv). The flask was connected to a coiled Stevens condenser and was allowed to reflux for 3 hours. The mixture was cooled and cautiously quenched with methanol, then aq. $NH_4Cl$. Product was extracted with several portions of dichloromethane, and combined organic fractions were concentrated. The crude residue was purified by chromatography on silica gel (0 to 30% EtOAc in hexane) to give the intermediate phenol 78 as a colorless oil.

The oil was dissolved in 350 mL acetone, and was treated with potassium carbonate (12.44 g, 1.50 equiv) and allyl bromide (6.22 mL, 1.20 equiv). The slurry was allowed to reflux under a blanket of nitrogen overnight. The solution was then filtered to remove solids, and the filtrate was concentrated to a colorless oil. The residue was purified by chromatography on silica gel (0 to 20% EtOAc in hexane) to give 8.92 g of a colorless oil (49%).

$^{1}$H NMR (400 MHz, $CDCl_3$) δ 7.28 (ddd, J=8.2, 7.1, 2.1 Hz, 1H), 7.07-6.88 (m, 5H), 5.87 (ddt, J=17.3, 10.7, 4.8 Hz, 1H), 5.24-5.04 (m, 2H), 4.49 (dt, J=4.8, 1.7 Hz, 2H), 2.32 (s, 3H), 1.99 (s, 6H).

$^{13}$C NMR (101 MHz, $CDCl_3$) δ 155.65, 136.40, 136.32, 135.32, 133.58, 131.10, 130.07, 128.07, 127.79, 120.82, 116.50, 112.61, 68.68, 21.10, 20.40.

Synthesis of 3-allyl-2-methoxy-2',4',6'-trimethyl-1, 1'-biphenyl [Compound 81]

In a glovebox, a 250 mL round bottom flask was charged with the O-allyl ether 79 (8.92 g, 35.35 mmol, 1.00 equiv). The mixture was stirred overnight at 180° C. Proton NMR showed only partial conversion. The temperature was increased to 220° C. After another 14 hours, the material was cooled, and purified by chromatography on silica gel (0 to 20% EtOAc in hexane) to give 5.161 g of a colorless oil. Proton/Carbon NMR showed 80, though a few impurities were present.

The oil was dissolved in 100 mL acetone and was treated with potassium carbonate (4.24 g, 30.7 mmol, 1.50 equiv) and iodomethane (1.91 mL, 1.50 equiv). A reflux condenser was attached, and the mixture stirred at 56° C. under nitrogen overnight.

The solution was cooled and filtered through a plug of silica. The filtrate was concentrated to a crude oil, which was purified by chromatography (0 to 10% EtOAc in hexane). 2.59 g of product was isolated (28% over two steps).

$^{1}$H NMR (400 MHz, $CDCl_3$) δ 7.17 (dd, J=7.6, 1.9 Hz, 1H), 7.08 (td, J=7.5, 2.6 Hz, 1H), 6.92 (d, J=9.0 Hz, 3H), 6.04 (ddt, J=16.8, 10.2, 6.5 Hz, 1H), 5.13-4.96 (m, 2H), 3.46 (dd, J=6.4, 1.8 Hz, 2H), 3.31 (d, J=2.3 Hz, 3H), 2.33 (d, J=2.3 Hz, 3H), 2.04 (s, 6H).

$^{13}$C NMR (101 MHz, $CDCl_3$) δ 155.70, 137.55, 136.57, 136.28, 135.52, 133.61, 133.11, 129.71, 129.18, 128.02, 123.70, 115.45, 59.95, 34.46, 21.06, 20.59.

Scheme 21. Synthesis of Ligand 24 (L24) and Ligand 25 (L25)

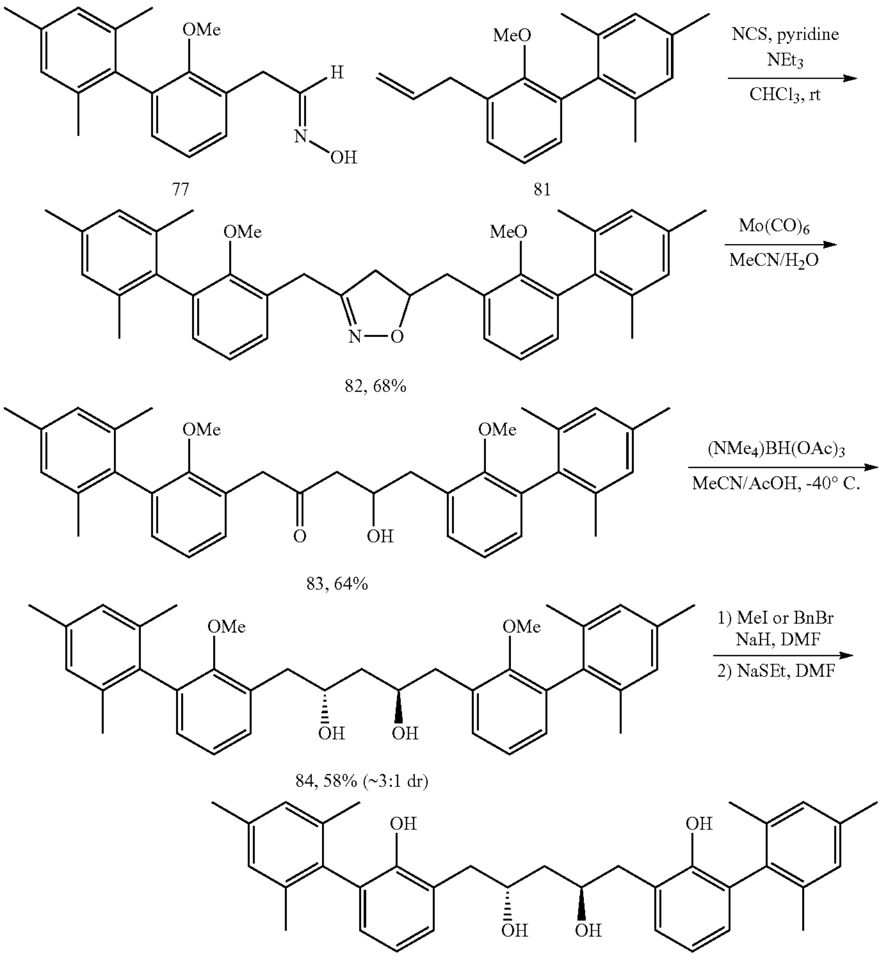

77
81
82, 68%
83, 64%
84, 58% (~3:1 dr)

R = Me, L24, 56%
R = Bn, L25, 33%

Synthesis of 3,5-bis((2-methoxy-2',4',6'-trimethyl-[1,1'-biphenyl]-3-yl)methyl)-4,5-dihydroisoxazole [Compound 82]

A 50 mL round bottom flask was charged with N-chlorosuccinimide (1.05 g, 7.88 mmol, 1.00 equiv), pyridine (13 μL, 2.0 mol %), and 5.2 mL chloroform. The slurry was stirred vigorously and a solution of oxime 77 (2.23 g, 7.88 mmol, 1.00 equiv) in 5.2 mL chloroform was added. The mixture stirred for 15 minutes before addition of a solution of alkene 81 (2.10 g, 7.88 mmol, 1.00 equiv) in 5.2 mL chloroform. This was followed by dropwise addition of a solution of trimethylamine (1.1 mL) in 21 mL chloroform. The mixture stirred overnight.

The solution was adsorbed to silica and purified by chromatography (0 to 40% EtOAc in hexane). 2.953 g of product was isolated (68%).

$^1$H NMR (400 MHz, $CDCl_3$) δ 7.20 (dd, J=7.5, 1.8 Hz, 1H), 7.13 (dd, J=7.5, 1.8 Hz, 1H), 7.09 (t, J=7.5 Hz, 1H), 7.04 (t, J=7.5 Hz, 1H), 6.96 (dd, J=7.5, 1.8 Hz, 1H), 6.92 (dt, J=4.1, 1.7 Hz, 5H), 4.85 (dtd, J=10.0, 7.4, 6.0 Hz, 1H), 3.75 (s, 2H), 3.29 (s, 3H), 3.25 (s, 3H), 3.07 (dd, J=13.4, 6.0 Hz, 1H), 2.87-2.75 (m, 2H), 2.67 (dd, J=17.1, 7.4 Hz, 1H), 2.33 (d, J=1.7 Hz, 6H), 2.01 (s, 3H), 2.00 (s, 6H), 1.99 (s, 3H).

$^{13}$C NMR (101 MHz, $CDCl_3$) δ 158.29, 156.01, 155.82, 136.81, 136.69, 136.25, 136.18, 136.11, 135.33, 135.10, 133.75, 133.48, 130.80, 130.32, 130.21, 130.10, 129.46, 129.18, 128.10, 128.08, 123.97, 123.74, 80.57, 59.90, 59.79, 41.00, 35.53, 34.65, 29.05, 28.59, 25.26, 20.56, 20.52.

Synthesis of 4-hydroxy-1,5-bis(2-methoxy-2',4',6'-trimethyl-[1,1'-biphenyl]-3-yl)pentan-2-one [Compound 83]

A 250 mL round bottom flask was charged with the isoxazole 82 (2.40 g, 4.38 mmol, 1.00 equiv), 22 mL acetonitrile, and 1 mL water. Molybdenum hexacarbonyl (0.578 g, 2.19 mmol, 0.500 equiv) was added, and the mixture was allowed to stir at 85° C. for 3 hours. TLC showed complete consumption of starting material. The brown solution was treated with silica gel and volatiles were removed by rotary evaporation. The solid was dry-loaded onto a silica column for chromatography (0 to 30% EtOAc in hexane). 1.532 g of product was isolated as a pale amber oil (64% yield).

$^1$H NMR (400 MHz, $CDCl_3$) δ 7.17 (dd, J=7.5, 1.8 Hz, 1H), 7.15-7.04 (m, 3H), 6.97 (dd, J=7.1, 2.3 Hz, 1H), 6.96-6.88 (m, 5H), 4.34 (td, J=6.2, 3.9 Hz, 1H), 3.73 (s, 2H), 3.36 (d, J=4.0 Hz, 1H), 3.28 (s, 3H), 3.21 (s, 3H), 2.95-2.78 (m, 2H), 2.66 (d, J=6.0 Hz, 2H), 2.32 (d, J=2.2 Hz, 6H), 2.03 (s, 6H), 2.02 (s, 6H).

$^{13}$C NMR (101 MHz, $CDCl_3$) δ 209.34, 155.92, 155.77, 136.83, 136.74, 136.27, 136.23, 136.19, 135.24, 135.09, 133.59, 133.26, 131.12, 131.08, 130.34, 130.14, 128.13, 128.12, 128.09, 127.86, 123.90, 123.77, 68.80, 59.80, 59.49, 47.70, 45.92, 37.44, 21.05, 20.61, 20.59.

Synthesis of rac-(2S,4S)-1,5-bis(2-methoxy-2',4',6'-trimethyl-[1,1'-biphenyl]-3-yl)pentane-2,4-diol [Compound 84]

A 100 mL round bottom flask was charged with ketone 83 (1.50 g, 2.72 mmol, 1.00 equiv), 13 mL acetonitrile, and 10 mL acetic acid. The mixture was stirred and cooled to −40° C. $(NMe_4)BH(OAc)_3$ (3.43 g, 13.0 mmol, 4.79 equiv) was added in a single portion. The mixture was allowed to stir under nitrogen overnight and gradually warm to room temperature.

The solution was diluted with dichloromethane and 2 M NaOH. Phases were separated, and the aqueous phase extracted with a few additional portions of dichloromethane. Combined organic fractions were concentrated, and the residue purified by chromatography on silica gel (0 to 30% EtOAc in hexane). 0.868 g of product was isolated (58%) as a 3:1 mixture of diastereomers.

$^1$H NMR (500 MHz, $CDCl_3$) δ 7.17 (dd, J=7.6, 1.8 Hz, 2H), 7.09 (t, J=7.5 Hz, 2H), 6.97-6.87 (m, 6H), 4.33-4.20 (m, 2H), 3.47-3.13 (m, 8H), 2.99-2.75 (m, 4H), 2.33 (s, 6H), 2.04 (s, 12H), 1.72 (t, J=5.7 Hz, 2H).

$^{13}$C NMR (126 MHz, $CDCl_3$) δ 155.83, 136.75, 136.31, 136.14, 135.22, 133.61, 131.79, 130.30, 130.25, 128.11, 128.09, 124.04, 70.44, 59.85, 42.20, 38.83, 21.05, 20.63, 20.55.

Synthesis of 3,3"-((2S,4S)-2,4-dimethoxypentane-1,5-diyl)bis(2',4',6'-trimethyl-[1,1'-biphenyl]-2-ol) [Ligand 24 (L24)]

In a glovebox, a 50 mL round bottom flask was charged with diol 84 (0.410 g, 0.742 mmol, 1.00 equiv) and 3.7 mL dry DMF. The mixture was treated with sodium hydride (71.2 mg, 2.97 mmol, 4.00 equiv) and was stirred for 10 minutes. Iodomethane (0.190 mL, 2.97 mmol, 4.00 equiv) was added, and the mixture stirred overnight.

The solution was cautiously quenched with methanol, and the residue was adsorbed to silica for purification by chromatography (0 to 10% EtOAc in hexane). 0.311 g of the intermediate methyl ether was isolated. This material was taken on to the next step.

The intermediate ether was dissolved in 3 mL dry DMF, and was treated with sodium ethanethiolate (230 mg). The mixture was stirred at 80° C. overnight.

The solution was diluted with dichloromethane and aq. Ammonium chloride. The phases were separated, and the aqueous phase was extracted with a few additional portions of dichloromethane. Combined organic fractions were concentrated, and the residue purified by chromatography on silica gel (0 to 20% EtOAc in hexane). 229 g of product was isolated as a white solid (56% over two steps).

$^1$H NMR (400 MHz, $CDCl_3$) δ 7.03 (dd, J=7.1, 2.1 Hz, 2H), 6.95 (s, 4H), 6.94-6.81 (m, 6H), 3.70 (p, J=6.0 Hz, 2H), 3.34 (s, 6H), 2.96-2.77 (m, 4H), 2.32 (s, 6H), 1.99 (d, J=8.6 Hz, 12H), 1.64 (t, J=6.3 Hz, 2H).

$^{13}$C NMR (101 MHz, $CDCl_3$) δ 151.90, 137.11, 136.94, 136.83, 134.07, 130.67, 129.10, 128.28, 127.95, 124.65, 120.07, 79.82, 57.52, 38.22, 36.80, 21.09, 20.28.

Synthesis of rac-3,3"-((2S,4S)-2,4-bis(benzyloxy)pentane-1,5-diyl)bis(2',4',6'-trimethyl-[1,1'-biphenyl]-2-ol) [Ligand 25 (L25)]

In a glovebox, a 50 mL round bottom flask was charged with diol 84 (0.410 g, 0.742 mmol, 1.00 equiv) and 3.7 mL dry DMF. The mixture was treated with sodium hydride (71.2 mg, 2.97 mmol, 4.00 equiv) and was stirred for 10 minutes. Benzyl bromide (0.353 mL, 2.97 mmol, 4.00 equiv) was added, and the mixture stirred overnight.

The solution was cautiously quenched with methanol, and the residue was adsorbed to silica for purification by chromatography (0 to 10% EtOAc in hexane). 0.403 g of the intermediate methyl ether was isolated. This material was taken on to the next step.

The intermediate ether was dissolved in 3 mL dry DMF, and was treated with sodium ethanethiolate (230 mg). The mixture was stirred at 80° C. overnight.

The solution was cooled and diluted with dichloromethane and aq. Ammonium chloride. The phases were separated, and the aqueous phase was extracted with portions of dichloromethane. Combined organic fractions were concentrated, and the residue purified by chromatography on silica gel (0 to 20% EtOAc in hexane). 0.175 g of product was isolated as a white solid (33% over two steps).

$^{1}$H NMR (500 MHz, $CDCl_3$) δ 7.24-7.15 (m, 10H), 7.05-6.99 (m, 2H), 6.95 (s, 4H), 6.90-6.84 (m, 4H), 6.26 (s, 2H), 4.45 (d, J=11.7 Hz, 2H), 4.27 (d, J=11.7 Hz, 2H), 3.99-3.89 (m, 2H), 2.96 (dd, J=14.1, 6.3 Hz, 2H), 2.87 (dd, J=14.1, 4.8 Hz, 2H), 2.32 (s, 6H), 1.96 (s, 12H), 1.75 (t, J=6.2 Hz, 2H).

$^{13}$C NMR (126 MHz, $CDCl_3$) δ 151.54, 137.94, 137.33, 137.20, 137.15, 133.42, 130.87, 128.86, 128.41, 128.39, 128.37, 128.32, 128.10, 127.93, 127.64, 127.40, 124.69, 120.14, 71.49, 39.05, 36.89, 21.09, 20.30, 20.29.

Example 2—Synthesis of Metal Complexes

Scheme 22. Metalation of 4-carbon-tether Ligands

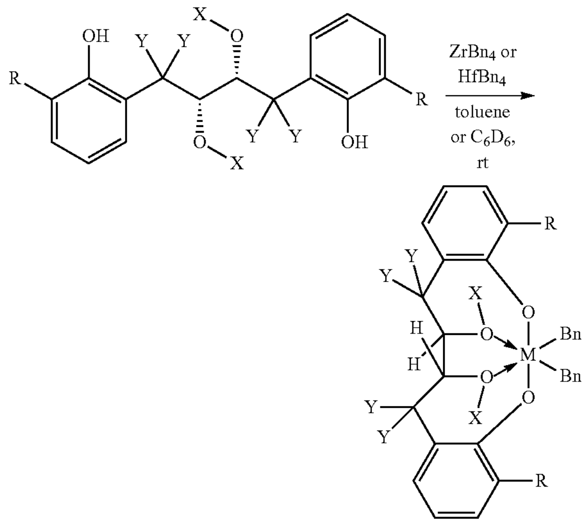

General Procedure for Metalations

In a glovebox, a 20 mL vial was charged with $ZrBn_4$ or $HfBn_4$ (1.00 equiv), and $C_6D_6$ or toluene (~0.02 M). The mixture was stirred, and the ligand (1.00 equiv) was added in a single portion. The solution was allowed to stir for 3-4 hours at ambient glovebox temperature, unless otherwise noted. The solvent was removed by vacuum pump, and used directly for batch reactor runs.

Synthesis of Metal-Ligand Complex 1 (MLC-1)

Following the general procedure, Ligand 1 (44.0 mg, 0.0817 mmol, 1.00 equiv) gave 53.9 mg of a pale yellow solid (81%).

$^{1}$H NMR (500 MHz, Toluene-$d_8$) δ 6.92-6.65 (m, 18H), 4.86 (d, J=7.5 Hz, 2H), 3.57-3.50 (m, 1H), 3.29 (t, J=6.1 Hz, 1H), 3.17 (s, 3H), 2.88 (s, 3H), 2.82 (dd, J=15.2, 8.0 Hz, 1H), 2.74-2.67 (m, 1H), 2.57 (dd, J=16.2, 11.2 Hz, 1H), 2.25-2.14 (m, 16H), 2.03 (s, 3H), 1.92-1.81 (m, 2H), 1.22 (d, J=10.0 Hz, 1H), 0.85 (d, J=10.0 Hz, 1H).

$^{13}$C NMR (126 MHz, Toluene-$d_8$) δ 158.81, 157.79, 148.51, 137.30, 137.21, 136.74, 136.40, 136.13, 135.57, 135.36, 131.27, 130.51, 129.92, 129.20, 129.01, 128.95, 128.81, 128.69, 128.29, 127.99, 127.97, 127.86, 127.76, 125.15, 120.98, 120.09, 119.72, 89.85, 81.28, 59.44, 58.98, 56.69, 56.48, 30.39, 29.92, 20.89, 20.65, 20.59, 20.53.

Synthesis of Metal-Ligand Complex 2 (MLC-2)

Following the general procedure, Ligand 1 (34.4 mg, 0.0639 mmol, 1.00 equiv) gave 50.5 mg of a yellow solid (88%).

$^{1}$H NMR (400 MHz, Toluene-$d_8$, 90° C.) δ 6.95-5.59 (m, 20H), 3.41 (s, 2H), 2.93 (s, 6H), 2.66 (dd, J=15.2, 4.2 Hz, 2H), 2.41 (d, J=15.4 Hz, 2H), 2.28-2.12 (m, 18H), 1.56 (s, 4H).

Synthesis of Metal-Ligand Complex 3 (MLC-3)

Following the general procedure, Ligand 2 (46.7 mg, 0.0676 mmol, 1.00 equiv) gave a pale amber residue.

$^{1}$H NMR (400 MHz, $C_6D_6$) δ 7.49-6.04 (m, 28H), 4.82 (m, 3H), 3.24 (m, 3H), 2.55-1.68 (m, 24H), 1.59 (m, 2H), 1.14 (m, 2H).

Synthesis of Metal-Ligand Complex 4 (MLC-4)

Following the general procedure, Ligand 2 (26.1 mg, 0.0378 mmol, 1.00 equiv) gave 36.4 mg of a pale amber residue (92%).

$^{1}$H NMR (500 MHz, Toluene-$d_8$, 90° C.) δ 6.93-6.48 (m, 25H), 6.15 (s, 3H), 4.63 (s, 2H), 3.12 (d, J=15.3 Hz, 2H), 2.81 (d, J=14.6 Hz, 2H), 2.21 (s, 12H), 2.18 (s, 6H), 1.96 (s, 6H), 1.50 (d, J=10.3 Hz, 2H), 1.36 (d, J=10.3 Hz, 2H).

Synthesis of Metal-Ligand Complex 5 (MLC-5)

Following the general procedure, Ligand 6 (71.3 mg, 0.103 mmol, 1.00 equiv) gave 84 mg of an amber residue (85%).

$^{1}$H NMR (400 MHz, $C_6D_6$) δ 7.93-5.86 (m, 30H), 5.40-2.82 (m, 10H), 2.82-1.62 (m, 20H), 1.52-1.01 (m, 2H).

Synthesis of Metal-Ligand Complex 6 (MLC-6)

Following the general procedure, Ligand 6 (71.9 mg, 0.104 mmol, 1.00 equiv) gave 91 mg of an amber residue (83%).

$^{1}$H NMR (400 MHz, Toluene-$d_8$, −40° C.) δ 7.15-6.90 (m, 17H), 6.90-6.64 (m, 9H), 6.30 (d, J=7.5 Hz, 2H), 5.26 (d, J=7.6 Hz, 2H), 4.68 (d, J=13.4 Hz, 1H), 4.48 (d, J=12.3 Hz, 1H), 4.11 (d, J=12.3 Hz, 1H), 4.02 (dd, J=13.2, 6.0 Hz, 2H), 3.64 (dd, J=7.9, 4.8 Hz, 1H), 3.06 (dd, J=15.4, 11.9 Hz, 1H), 2.93 (dd, J=15.3, 2.4 Hz, 1H), 2.74-2.67 (m, 1H), 2.46 (d, J=15.3 Hz, 1H), 2.39 (s, 3H), 2.37 (s, 3H), 2.36 (s, 3H), 2.27 (s, 3H), 2.23 (s, 3H), 2.12 (d, J=8.5 Hz, 1H), 2.06 (s, 3H), 1.96 (d, J=8.4 Hz, 1H), 1.46 (d, J=10.6 Hz, 1H), 1.32 (d, J=10.4 Hz, 1H).

$^{13}$C NMR (101 MHz, Toluene-$d_8$, −40° C.) δ 159.27, 158.03, 148.51, 137.82, 137.69, 137.42, 137.34, 137.05, 136.94, 136.86, 136.58, 136.27, 135.48, 135.44, 132.73, 131.46, 130.94, 130.22, 129.53, 129.43, 129.18, 129.04, 128.49, 128.43, 128.23, 128.17, 128.06, 127.76, 127.57, 127.18, 125.80, 125.32, 124.29, 121.46, 120.51, 119.76, 82.42, 77.45, 70.87, 70.78, 65.12, 62.05, 31.12, 29.45, 21.22, 21.15, 20.93, 20.87, 20.85, 20.68.

Synthesis of Metal-Ligand Complex 7 (MLC-7)

Following the general procedure, Ligand 14 (36.7 mg, 0.0541 mmol, 1.00 equiv) gave 46.3 mg of a pale yellow solid (90%).

$^{1}$H NMR (400 MHz, Toluene-$d_8$, 90° C.) δ 7.84 (d, J=2.6 Hz, 3H), 7.54 (q, J=2.0 Hz, 2H), 7.36-7.22 (m, 2H), 7.16-7.00 (m, 5H), 6.90-5.86 (m, 10H), 3.18 (s, 2H), 2.77-2.51 (m, 6H), 2.42 (d, J=9.6 Hz, 4H), 2.07-0.82 (m, 40H).

$^{13}C$ NMR (101 MHz, Toluene-$d_8$, 90° C.) δ 150.40, 139.99, 137.20, 136.64, 129.86, 129.05, 124.98, 123.97, 121.89, 121.10, 119.82, 68.52, 59.87, 34.65, 31.38, 31.24, 31.04, 30.68.

Synthesis of Metal-Ligand Complex 8 (MLC-8)

Following the general procedure, Ligand 14 (31.7 mg, 0.0467 mmol, 1.00 equiv) gave 43.7 mg of a pale yellow solid (90%).

$^1H$ NMR (400 MHz, Toluene-$d_8$, 90° C.) δ 7.99-7.03 (m, 12H), 6.94-6.29 (m, 10H), 3.15 (s, 2H), 2.74-2.12 (m, 10H), 2.05-0.70 (m, 40H).

Synthesis of Metal-Ligand Complex 9 (MLC-9)

Following the general procedure, Ligand 13 (53.0 mg, 0.0603 mmol, 1.00 equiv) gave 58 mg of a yellow solid residue (84%).

$^1H$ NMR (500 MHz, $C_6D_6$) δ 8.49-7.16 (m, 17H), 7.15-5.70 (m, 13H), 3.84-2.55 (m, 12H), 1.58-1.01 (m, 36H), 0.96-0.01 (m, 4H).

Synthesis of Metal-Ligand Complex 10 (MLC-10)

Following the general procedure, Ligand 13 (44.2 mg, 0.0503 mmol, 1.00 equiv) gave 49 mg of a yellow solid residue (79%).

$^1H$ NMR (500 MHz, $C_6D_6$) δ 8.55-7.17 (m, 17H), 7.16-4.46 (m, 13H), 3.89-2.45 (m, 12H), 1.53-1.04 (m, 36H), 1.04--0.30 (m, 4H).

Synthesis of Metal-Ligand Complex 11 (MLC-11)

In a glovebox, a 20 mL vial was charged with Ligand 19 (48.5 mg, 0.0815 mmol, 1.00 equiv) and $ZrBn_4$ (37.2 mg, 1.00 equiv) in 3.5 mL $C_6D_6$. The mixture was stirred at ambient temperature for 2 hours. Proton NMR showed no conversion. The mixture was heated to 60° C. for 5 hours, which showed some conversion, though a bit of free ligand remained. 12.4 mg of $ZrBn_4$ was added, and stirring continued at ambient temperature overnight. Another 15 mg was added in the morning, and heating at 60° C. continued for 4 hours. The solution was concentrated to give the complex with little $ZrBn_4$ contamination (68 mg, 96%).

$^1H$ NMR (400 MHz, $C_6D_6$) δ 7.08 (d, J=7.5 Hz, 4H), 7.00-6.95 (m, 10H), 6.79-6.75 (m, 2H), 6.38-6.33 (m, 4H), 3.13 (s, 2H), 2.87 (s, 6H), 2.38 (s, 6H), 2.34 (s, 6H), 2.28 (s, 6H), 1.70 (d, J=9.6 Hz, 2H), 1.05 (s, 6H), 1.02 (s, 6H), 0.92 (d, J=11.7 Hz, 2H).

$^{13}C$ NMR (101 MHz, $C_6D_6$) δ 161.32, 144.09, 138.05, 137.81, 136.11, 135.49, 135.40, 131.28, 131.23, 129.78, 129.51, 129.48, 128.81, 125.68, 123.15, 118.11, 93.71, 68.48, 59.33, 43.98, 29.99, 26.60, 22.16, 21.44, 21.25.

Synthesis of Metal-Ligand Complex 12 (MLC-12)

In a glovebox, a 20 mL vial was charged with Ligand 23 (15.6 mg, 0.0256 mmol, 1.00 equiv) and 3 mL $C_6D_6$. $HfBn_4$ (13.9 mg, 0.0256 mmol, 1.00 equiv) was added, and the mixture stirred for 3 hours. Only partial conversion was observed by Proton NMR. The material was heated to 50° C. for 3 hours, then cooled to room temperature and allowed to stir overnight. Solvent was removed by vacuum pump. Proton NMR showed new complex, and the signals were not broad. No $HfBn_4$ leftover was observed. 19.3 mg of solid was isolated (78%).

$^1H$ NMR (400 MHz, $C_6D_6$) δ 7.20 (d, J=7.7 Hz, 4H), 7.11-7.07 (m, 4H), 6.94 (dd, J=9.8, 1.9 Hz, 4H), 6.88-6.83 (m, 2H), 6.79 (t, J=7.6 Hz, 2H), 6.76-6.71 (m, 4H), 2.80 (dd, J=6.9, 5.0 Hz, 2H), 2.58 (s, 6H), 2.35 (s, 6H), 2.30 (s, 6H), 2.29 (s, 6H), 1.68-1.59 (m, 4H), 1.36 (d, J=11.5 Hz, 2H), 1.15 (s, 6H), 0.89 (s, 6H).

$^{13}C$ NMR (101 MHz, $C_6D_6$) δ 161.18, 149.09, 138.05, 136.28, 136.17, 134.08, 133.66, 131.61, 130.93, 129.25, 129.12, 127.59, 127.25, 126.65, 120.60, 117.82, 89.85, 74.08, 64.97, 44.84, 30.68, 24.83, 21.59, 20.86, 20.63.

Synthesis of Metal-Ligand Complex 13(MLC-13)

In a glovebox, a 20 mL vial was charged with Ligand 23 (33.9 mg, 0.0557 mmol, 1.00 equiv) and 2 mL $C_6D_6$. $ZrBn_4$ (25.4 mg, 0.0557 mmol, 1.00 equiv) was added, and the mixture stirred for 3 hours. Only partial conversion was observed by Proton NMR. Stirring continued for 72 hours.

Proton NMR showed improved conversion with only small amounts of ligand leftover. The solution was concentrated to give a slightly orange powder (39.5 mg, 81%).

$^1H$ NMR (400 MHz, $C_6D_6$) δ 7.09-7.01 (m, 8H), 6.96-6.93 (m, 4H), 6.89 (d, J=7.1 Hz, 2H), 6.80 (dd, J=36.9, 7.6 Hz, 2H), 6.57 (dd, J=7.4, 4.9 Hz, 4H), 2.83 (dd, J=6.9, 4.8 Hz, 2H), 2.67 (s, 6H), 2.35 (s, 6H), 2.34 (s, 6H), 2.31 (s, 6H), 1.88 (d, J=10.4 Hz, 2H), 1.69 (dd, J=7.0, 4.8 Hz, 2H), 1.22 (d, J=10.4 Hz, 2H), 1.11 (s, 6H), 0.92 (s, 6H).

$^{13}C$ NMR (101 MHz, $C_6D_6$) δ 161.45, 146.10, 137.97, 136.66, 136.15, 134.42, 133.82, 130.84, 130.70, 129.23, 128.99, 128.40, 128.34, 126.91, 121.58, 117.73, 90.15, 65.66, 64.64, 44.96, 31.00, 24.74, 21.67, 20.87, 20.79.

Synthesis of Metal-Ligand Complex 14 (MLC-14)

Following the general procedure, Ligand 24 (24.1 mg, 0.0529 mmol, 1.00 equiv) gave a yellow solid (39 mg, 90%).

$^1H$ NMR (400 MHz, Toluene-$d_8$, 72° C.) δ 7.43-6.36 (m, 18H), 6.05 (s, 3H), 3.42 (s, 2H), 2.99 (d, J=5.7 Hz, 6H), 2.78-2.40 (m, 4H), 2.40-2.11 (m, 16H), 2.03-1.18 (m, 7H).

Synthesis of Metal-Ligand Complex 15 (MLC-15)

Following the general procedure, Ligand 24 (43.4 mg, 0.080 mmol, 1.00 equiv) gave an off-white solid (68 mg, 93%).

$^1H$ NMR (400 MHz, Toluene-$d_8$, 72° C.) δ 7.28-7.04 (m, 5H), 7.03-6.85 (m, 13H), 6.85-6.55 (m, 5H), 6.32 (d, J=7.5 Hz, 2H), 3.34 (dq, J=9.0, 4.6 Hz, 2H), 2.79 (s, 4H), 2.66 (dd, J=15.3, 8.0 Hz, 1H), 2.47 (dd, J=15.3, 5.3 Hz, 1H), 2.38-2.12 (m, 16H), 2.07-1.89 (m, 3H), 1.76 (d, J=10.4 Hz, 1H), 1.63 (d, J=10.4 Hz, 1H), 1.55 (t, J=4.5 Hz, 1H).

Synthesis of Metal-Ligand Complex 16 (MLC-16)

Following the general procedure, Ligand 25 (28.3 mg, 0.0401 mmol, 1.00 equiv) gave an off-white residue (36.5 mg, 93%).

$^1H$ NMR (400 MHz, Toluene-$d_8$, 72° C.) δ 7.44-6.98 (m, 17H), 6.94-6.56 (m, 12H), 6.09 (d, J=7.1 Hz, 2H), 4.79-4.20 (m, 3H), 3.82 (s, 1H), 3.40-2.11 (m, 19H), 2.06-1.13 (m, 9H).

Example 3—Parallel Polymerization Reactor Results

Polyolefin catalysis screening was performed in a high throughput parallel polymerization reactor (PPR) system. The PPR system was comprised of an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst, ligand, and metal precursor solutions, unless otherwise noted, were prepared in toluene. Ligands were metalated with 1:1 ligand:metal (L:M) ratio by premixing a solution of $MBn_4$ (M=Zr, Hf) with a solution of the ligand. All liquids (i.e., solvent, 1-octene, and catalyst solutions) were added via robotic syringes. Gaseous reagents (i.e., ethylene) were added via a gas injection port. Prior to each run, the reactors were heated to 80° C., purged with ethylene, and vented.

The reactors were heated to the run temperature, then pressured to the appropriate psig with ethylene, and a portion of Isopar-E was added. Toluene solutions of reagents were then added in the following order: (1) 1-octene with 500 nmol of scavenger MMAO-3A; (2) Activator (RIBS-II, FAB, etc); and (3) Catalyst or in situ metalated ligand.

Each liquid addition was chased with a small amount of Isopar-E so that after the final addition, a total reaction volume of 5 mL was reached. Upon addition of the catalyst, the PPR software began monitoring the pressure of each cell. The desired pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% carbon monoxide in argon for 4 minutes at 40-50 psi higher than the reactor pressure. The shorter the "Quench Time", the more active the catalyst. In order to prevent the formation of too much polymer in any given cell, the reaction was quenched upon reaching a predetermined uptake level (50 psig for 120° C. runs, 75 psig for 150° C. runs). After all the reactors were quenched they were allowed to cool to 70° C. They were then vented, purged for 5 minutes with nitrogen to remove carbon monoxide, and the tubes were removed. The polymer samples were then dried in a centrifugal evaporator at 70° C. for 12 hours, weighed to determine polymer yield and submitted for IR (1-octene incorporation) and GPC (molecular weight) analysis.

Reported results are the arithmetic mean of 2-4 runs.

TABLE 1

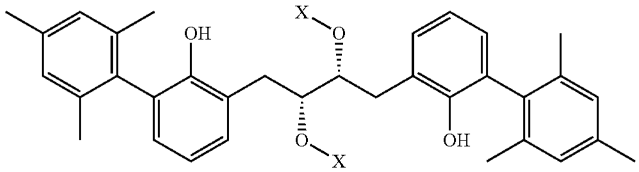

| ID | X |
|---|---|
| L1 | methyl |
| L2 | p-tolyl |
| L3 | iso-propyl |
| L5 | iso-butyl |
| L4 | iso-butenyl |
| L6 | benzyl |
| L7 | $CH_2CH_2$-$^t$Bu |
| L8 | $CH_2$(4-F-phenyl) |
| L9 | $CH_2$(2-Ph-phenyl) |
| L10 | $CH_2$(2,6-dimethylphenyl) |
| L11 | $CH_2$(3,5-di-tert-butylphenyl) |
| L12 | $CH_2$(1-napthyl) |
| L13 | $CH_2$(2-napthyl) |

PPR Result Summary for 4-carbon-tether ligands with modified ether donor groups

| Metal-Ligand | $M_w$ (Da) | PDI | Quench (s) | Yield (mg) | Mol % Octene |
|---|---|---|---|---|---|
| Zr-L1 | 1,525 | 2.0 | 16 | 569 | 21.3 |
| Zr-L2 | 4,033 | 2.8 | 16 | 595 | 23.5 |
| Zr-L3 | 231,893 | 75 | 1801 | 27 | 7.0 |
| Zr-L5 | 9,557 | 3.0 | 20 | 526 | 17.5 |
| Zr-L4 | 327,472 | 101 | 1801 | 24 | 6.1 |
| Zr-L6 | 12,247 | 3.0 | 21 | 606 | 21.3 |
| Zr-L7 | 8,856 | 4.5 | 21 | 606 | 21.3 |
| Zr-L8 | 11,549 | 3.1 | 20 | 360 | 23.4 |
| Zr-L9 | 18,106 | 2.9 | 62 | 178 | 17.9 |
| Zr-L10 | 264,361 | 65.6 | 1801 | 25 | 4.2 |
| Zr-L11 | 8,006 | 2.7 | 32 | 237 | 20.7 |
| Zr-L12 | 149,255 | 39.0 | 1801 | 62 | 10.5 |
| Zr-L13 | 50,919 | 10.1 | 1688 | 167 | 18.2 |
| Hf-L1 | 6,833 | 3.3 | 17 | 608 | 23.9 |
| Hf-L2 | 25,170 | 3.0 | 49 | 365 | 26.3 |
| Hf-L3 | 296,723 | 24 | 1801 | 30 | 9.0 |
| Hf-L4 | 33,006 | 4.1 | 30 | 531 | 19.8 |
| Hf-L5 | 62,526 | 5.2 | 1801 | 20 | 13.9 |
| Hf-L6 | 101,937 | 4.0 | 47 | 251 | 19.1 |
| Hf-L7 | 44,258 | 6.4 | 28 | 540 | 22.8 |
| Hf-L8 | 116,532 | 4.7 | 122 | 190 | 18.4 |
| Hf-L9 | 70,309 | 9.8 | 1801 | 48 | 13.8 |
| Hf-L10 | 75,337 | 155.5 | 1801 | 21 | 10.7 |
| Hf-L11 | 13,591 | 5.7 | 1801 | 96 | 16.2 |
| Hf-L12 | 17,171 | 3.7 | 1801 | 28 | 12.8 |
| Hf-L13 | 72,377 | 10.8 | 1801 | 35 | 15.2 |

In Table 1, the "four-carbon tether" ligands have four carbon atoms connecting the arene, as previously described.

TABLE 2

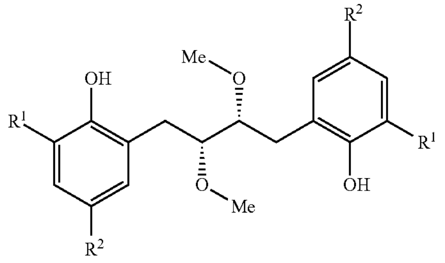

| ID | $R^1$ | $R^2$ |
|---|---|---|
| L14 | 3,5-di-tert-butylphenyl | H |
| L15 | di-tert-butylanthracene | H |
| L16 | mesityl | tert-butyl |
| L17 | 3,5-di-tert-butylphenyl | tert-butyl |

TABLE 2-continued

| | | |
|---|---|---|
| L18 | 4,4'-di-tert-butyl-carbazole | H |

PPR Result Summary for 4-carbon-tether ligands with modified phenolate donor groups

| Metal-Ligand | $M_w$ (Da) | PDI | Quench (s) | Yield (mg) | Mol % Octene |
|---|---|---|---|---|---|
| Zr-L14 | 1,840 | 2.2 | 17 | 333 | 11.3 |
| Zr-L15 | 1,283 | 2.0 | 16 | 641 | 24.7 |
| Zr-L16 | 1,624 | 2.1 | 15 | 602 | 22.4 |
| Zr-L17 | 1,725 | 2.1 | 15 | 323 | 12.7 |
| Zr-L18 | 1,140 | 1.8 | 15 | 606 | 24.2 |
| Hf-L14 | 5,322 | 2.8 | 17 | 429 | 14.1 |
| Hf-L15 | 3,998 | 2.9 | 17 | 659 | 25.5 |
| Hf-L16 | 6,816 | 3.2 | 18 | 605 | 25.4 |
| Hf-L17 | 4,826 | 2.6 | 16 | 394 | 14.8 |
| Hf-L18 | 2,408 | 2.5 | 17 | 574 | 25.7 |

In Table 2, the Ligands 14 to 18 coupled with a metal center of either hafnium or zirconium yielded highly reactive metal-ligand complexes.

TABLE 3

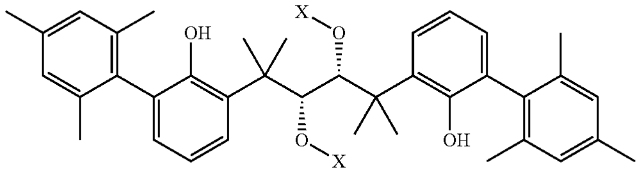

| ID | X |
|---|---|
| L19 | methyl |
| L20 | benzyl |
| L21 | methyl/phenyl |

PPR Result Summary for 4-carbon-tether ligands with geminal-dimethyl benzyl groups

| Metal-Ligand | $M_w$ (Da) | PDI | Quench (s) | Yield (mg) | Mol % Octene |
|---|---|---|---|---|---|
| Zr-L19 | 9,648 | 2.6 | 26 | 588 | 39 |
| Zr-L20 | 99,403 | 32 | 412 | 128 | 10.5 |
| Zr-L21 | 24,248 | 3.0 | 47 | 540 | 24.5 |
| Hf-L19 | 27,995 | 3.3 | 27 | 679 | 42 |
| Hf-L20 | 184,347 | 43 | 1802 | 71 | 10.6 |
| Hf-L21 | 55,716 | 3.4 | 58 | 352 | 27.0 |

TABLE 4

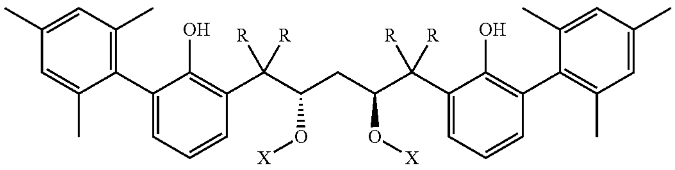

| ID | X | R |
|---|---|---|
| L22 | benzyl | methyl |
| L23 | methyl | methyl |
| L24 | methyl | H |
| L25 | benzyl | H |

TABLE 4-continued

| PPR Result Summary for 5-carbon-tether ligands | | | | | |
|---|---|---|---|---|---|
| Metal-Ligand | $M_w$ (Da) | PDI | Quench (s) | Yield (mg) | Mol % Octene |
| Zr-L22 | NA | NA | 1802 | 14 | NA |
| Zr-L23 | 308,562 | 5.0 | 67 | 113 | 7.0 |
| Zr-L24 | 2,104 | 2.3 | 14 | 381 | 11.8 |
| Zr-L25 | 99,106 | 36.2 | 1801 | 69 | 4.4 |
| Hf-L22 | NA | NA | 1802 | 1 | NA |
| Hf-L23 | 740,076 | 3.0 | 1801 | 48 | 6.2 |
| Hf-L24 | 9,705 | 2.5 | 17 | 285 | 9.7 |
| Hf-L25 | 46,323 | 3.7 | 1802 | 47 | 3.7 |

In Table 4, the "five-carbon tether" ligands have four carbon atoms connecting the arene, as previously described.

Example 4—Batch Reactor Results

The batch reactor polymerizations were conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve, which empties the reactor contents into a stainless steel dump pot, which is prefilled with a catalyst kill solution (typically 5 mL of a Irgafos/Irganox/toluene mixture). The dump pot is vented to a 30 gal. blow-down tank, with both the pot and the tank purged with nitrogen. All solvents used for polymerization or catalyst makeup are run through solvent purification columns to remove any impurities that may affect polymerization. The 1-octene and IsoparE were passed through 2 columns, the first containing A2 alumina, the second containing Q5. The ethylene was passed through 2 columns, the first containing A204 alumina and 4 Å mol sieves, the second containing Q5 reactant. The N2, used for transfers, was passed through a single column containing A204 alumna, 4 Å mol sieves and Q5.

The reactor is loaded first from the shot tank that may contain IsoparE solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the Camile to maintain reaction pressure set point in the reactor. These polymerizations were run for 10 min., then the agitator was stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the polymers are weighed for yield/efficiencies, and submitted for polymer testing.

TABLE 5

| Summary of Batch Reactor Results for 4-carbon-tether Complexes | | | | | | |
|---|---|---|---|---|---|---|
| Catalyst ID | Metal | Temp (° C.) | Efficiency (g/g) | $M_w$ (g/mol) | PDI | 1-octene (mol %) |
| MLC-1 | Zr | 120 | 8,747,698 | 1,829 | 1.91 | 18.66 |
| MLC-1 | Zr | 150 | 7,276,046 | 1,792 | 1.83 | 17.88 |
| MLC-2 | Hf | 120 | 2,274,637 | 10,499 | 2.48 | 20.96 |
| MLC-2 | Hf | 150 | 1,904,869 | 7,971 | 2.25 | 22.40 |
| MLC-3 | Zr | 120 | 4,856,178 | 5,490 | 2.09 | 22.62 |
| MLC-3 | Zr | 150 | 1,973,165 | 4,932 | 2.06 | 21.14 |
| MLC-4 | Hf | 120 | 16,808 | 32,059 | 4.82 | 25.49 |
| MLC-4 | Hf | 150 | 28,013 | 31,217 | 3.31 | 25.23 |
| MLC-5 | Zr | 120 | 2,093,747 | 24,968 | 2.12 | 18.86 |
| MLC-5 | Zr | 150 | 431,173 | 19,474 | 2.05 | 18.53 |
| MLC-5 | Zr | 190 | 48,233 | 23,477 | 2.57 | 13.08 |
| MLC-6 | Hf | 120 | 47,622 | 143,283 | 17.86 | 23.05 |
| MLC-6 | Hf | 150 | 16,808 | 108,340 | 23.75 | 25.62 |
| MLC-7 | Zr | 120 | 4,647,900 | 3,483 | 2.40 | 6.21 |
| MLC-7 | Zr | 150 | 6,708,761 | 3,261 | 2.04 | 4.71 |
| MLC-7 | Zr | 190 | 1,315,443 | 3,209 | 2.11 | 4.07 |
| MLC-8 | Hf | 120 | 26,892 | 8,569 | 2.28 | 8.42 |
| MLC-8 | Hf | 150 | 776,888 | 9,769 | 2.08 | 6.36 |
| MLC-8 | Hf | 190 | 360,805 | 9,857 | 2.29 | 4.83 |
| MLC-9 | Zr | 120 | 3,135,140 | 2,855 | 2.86 | 26.18 |
| MLC-9 | Zr | 150 | 4,041,334 | 1,600 | 1.84 | 23.29 |
| MLC-10 | Hf | 150 | 3,253,217 | 4,953 | 2.26 | 24.00 |
| MLC-10 | Hf | 190 | 357,163 | 4,691 | 2.28 | 24.81 |
| MLC-11 | Zr | 120 | 2,115,671 | 10,877 | 2.25 | 29.36 |
| MLC-11 | Zr | 150 | 2,302,026 | 9,942 | 2.28 | 26.07 |
| MLC-11 | Zr | 190 | 845,642 | 8,631 | 2.15 | 21.59 |

Reaction Conditions: 120° C. semi-batch reactor conditions: 46.3 g ethylene, 302 g 1-octene, 612 g IsoparE, 1.2 equiv. RIBS-2 activator to catalyst, 10 μmol MMAO-3A, 290 psi reactor pressure; 150° C. semi-batch reactor conditions: 43 g ethylene, 301 g 1-octene, 548 g IsoparE, 1.2 equiv RIBS-2 activator to catalyst, 10 μmol MMAO-3A, 327 psi reactor pressure; 190° C. semi-batch reactor conditions: 44 g ethylene, 300 g 1-octene, 520 g IsoparE, 1.2 equiv RIBS-2 activator to catalyst, 10 μmol MMAO-3A, 410 psi reactor pressure

TABLE 6

| Summary of Batch Reactor Results for 5-carbon-tether Complexes | | | | | | |
|---|---|---|---|---|---|---|
| Catalyst ID | Metal | Temp (° C.) | Efficiency (g/g) | $M_w$ (g/mol) | PDI | 1-octene (mol %) |
| MLC-12 | Hf | 120 | 2,850,127 | 85,485 | 2.25 | 0.4 |
| MLC-12 | Hf | 150 | 1,392,177 | 70,840 | 2.49 | 0.4 |
| MLC-13 | Zr | 120 | 602,912 | 578,237 | 3.19 | 3.5 |
| MLC-13 | Zr | 150 | 43,848 | 351,429 | 3.63 | 4.2 |

TABLE 6-continued

| Summary of Batch Reactor Results for 5-carbon-tether Complexes | | | | | | |
|---|---|---|---|---|---|---|
| Catalyst ID | Metal | Temp (° C.) | Efficiency (g/g) | $M_w$ (g/mol) | PDI | 1-octene (mol %) |
| MLC-13 | Zr | 190 | 3,132 | 208,092 | 3.53 | 4.7 |
| MLC-13 | Zr | 120 | 306,937 | 2,744 | 2.57 | 3.2 |
| MLC-14 | Zr | 150 | 507,385 | 2,683 | 1.91 | 3.3 |
| MLC-14 | Zr | 190 | 292,321 | 2,610 | 1.80 | 3.5 |
| MLC-15 | Hf | 120 | 64,616 | 11,820 | 2.38 | 3.0 |
| MLC-15 | Hf | 150 | 108,426 | 10,592 | 2.15 | 3.2 |
| MLC-15 | Hf | 190 | 10,615 | 11,023 | 2.28 | 3.8 |
| MLC-16 | Zr | 120 | 13,885 | 23,639 | 5.17 | 4.4 |
| MLC-16 | Zr | 150 | 2,819 | 14,904 | 3.32 | 2.9 |

The invention claimed is:

1. A catalyst system comprising one or more metal-ligand complexes according to formula (I):

(I)

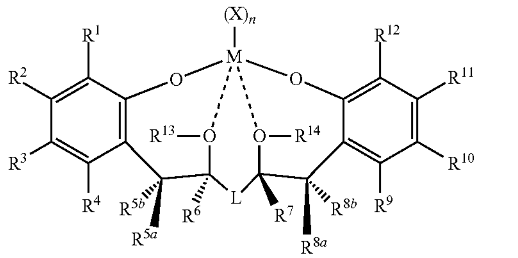

where:

M is a metal chosen from titanium, zirconium, or hafnium, the metal having a formal oxidation state of +2, +3, or +4;

each dotted line represents an optional dative bond between O and M;

each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, cyclopentadienyl, substituted cyclopentadienyl, $(C_4-C_{12})$diene, halogen;

n is 2;

the metal-ligand complex has 6 or fewer metal-ligand bonds;

L is $(C_1-C_{10})$hydrocarbylene or a bond;

$R^1$ $R^2$, $R^3$, $R^4$, $R^9$, $R^{10}$, $R^{11}$, and $R^{12}$ is independently selected from the group consisting of —H, $(C_1-C_{40})$ hydrocarbyl, $(C_1-C_{40})$heterohydrocarbyl, and halogen atom;

$R^{5a}$ and $R^{5b}$ and $R^{8a}$ and $R^{8b}$ is selected from —H, $(C_1-C_{40})$hydrocarbyl, $(C_6-C_{40})$heterohydrocarbyl, and halogen atom, wherein $R^{5a}$ and $R^{5b}$ can optionally combine together to form a cyclic structure, and $R^{8a}$ and $R^{8b}$ can optionally combine together to form a cyclic structure;

$R^6$ and $R^7$ is independently selected from —H, $(C_1-C_{50})$hydrocarbyl, and $(C_1-C_{50})$heterohydrocarbyl, wherein $R^6$ and $R^7$ can optionally combine together to form a cyclic structure; and $R^{13}$ and $R^{14}$ is independently selected from $(C_1-C_{40})$ hydrocarbyl and $(C_1-C_{40})$heterohydrocarbyl.

2. The catalyst system according to claim 1, wherein n is 2 and each X is independently $(C_1-C_{12})$alkyl, phenyl, benzyl, halogen atom, or $—CH_2Si[(C_1-C_{20})alkyl]_3$.

3. The catalyst system of claim 1, wherein $R^{13}$ and $R^{14}$ is $(C_1-C_{12})$alkyl, substituted phenyl, unsubstituted phenyl, substituted benzyl, or unsubstituted benzyl.

4. The catalyst system according to claim 1, wherein $R^1$ and $R^{12}$ is a substituted phenyl, unsubstituted phenyl, substituted or unsubstituted anthracenyl.

5. The catalyst system according to claim 1, wherein $R^1$ and $R^{12}$ is 2,4,6-trimethylphenyl, 3,5-di-tert-butylphenyl, or di-tert-butylanthracenyl.

6. The catalyst system according to claim 1, wherein $R^1$ and $R^{12}$ is a substituted or unsubstituted anthracenyl.

7. The catalyst system of claim 6, wherein $R^1$ and $R^{12}$ is di-tert-butylanthracenyl.

8. The catalyst system according to claim 1, wherein $R^{5a}$, $R^{5b}$, $R^{8a}$, and $R^{8b}$ is-H.

9. The catalyst system according to claim 1, wherein $R^{5a}$, $R^{5b}$, $R^{8a}$, and $R^{8b}$ is or $(C_1-C_{12})$alkyl.

10. The catalyst system according to claim 1, wherein one of $R^{5a}$ and $R^{5b}$ is methyl and one of $R^{8a}$ and $R^{8b}$ is methyl.

11. The catalyst system according to claim 1, wherein $R^3$ and $R^{10}$ a substituted phenyl or unsubstituted phenyl.

12. The catalyst system according to claim 1, wherein L is $(C_1-C_{10})$alkylene.

13. The catalyst system of claim 12, wherein L is selected from the group consisting of methylene, ethylene, and 1,3-propylene.

14. The catalyst system according to claim 1, wherein the catalyst system further comprises an activator.

15. A polymerization process for polymerizing olefin monomers, the process comprising contacting ethylene and optionally one or more α-olefin monomers in the presence of a catalyst system according to claim 1, in a polymerization reactor at a reactor temperature.

16. The polymerization process according to claim 15, wherein the reactor temperature is greater than 100° C. and less than 300° C.

17. The polymerization process according to claim 15, wherein the polymerization reactor is a solution reactor.

18. The polymerization process according to claim 15, wherein the process further comprises a solvent.

19. A metal-ligand complex according to any one of the following:

Metal-Ligand Complex 1

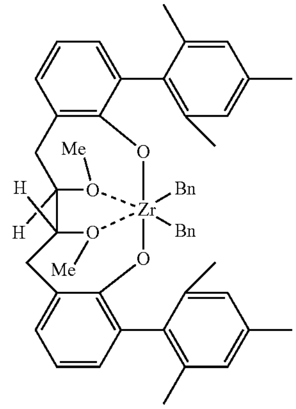

-continued
Metal-Ligand Complex 2
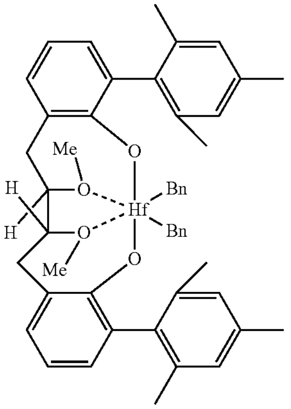
Metal-Ligand Complex 3
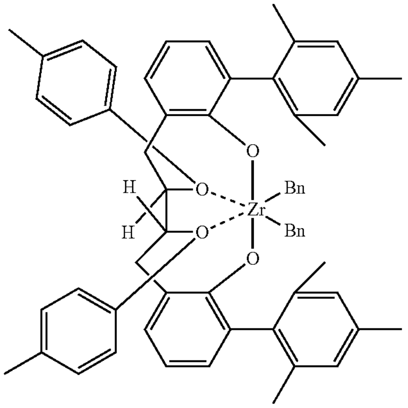
Metal-Ligand Complex 4
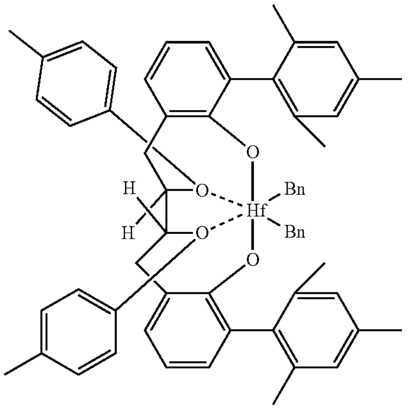
-continued
Metal-Ligand Complex 5
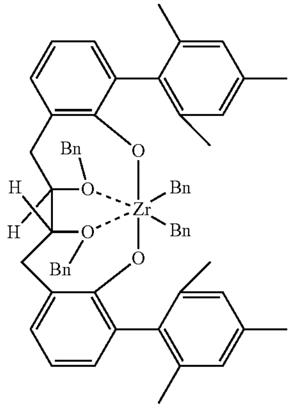
Metal-Ligand Complex 6
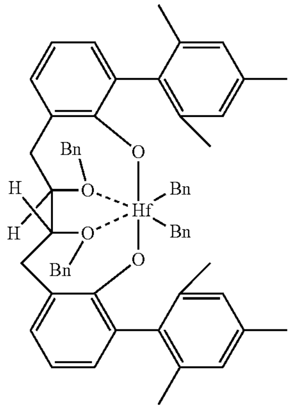
Metal-Ligand Complex 7
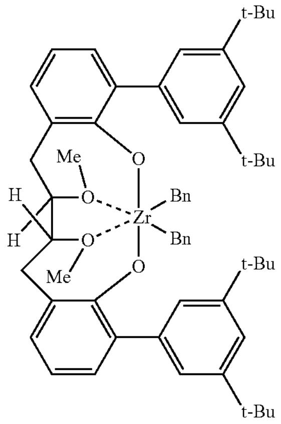

-continued
Metal-Ligand Complex 8
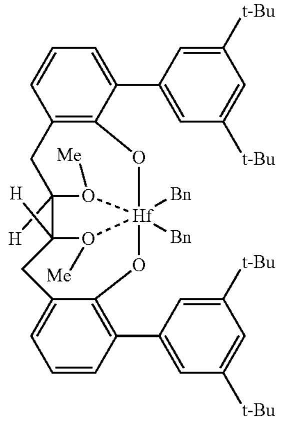
Metal-Ligand Complex 9
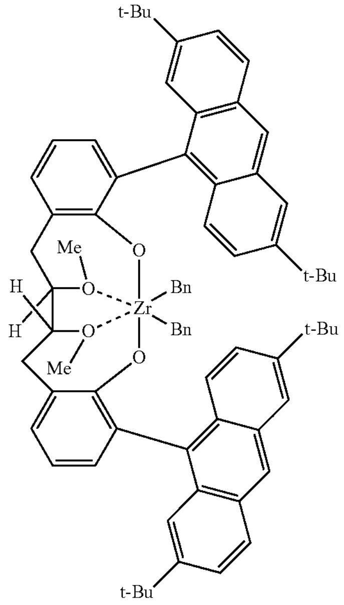
Metal-Ligand Complex 10
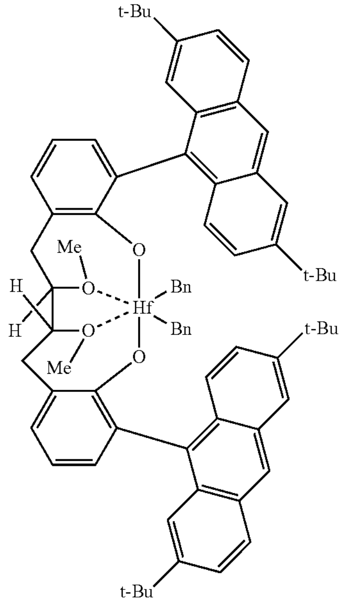
-continued
Metal-Ligand Complex 11
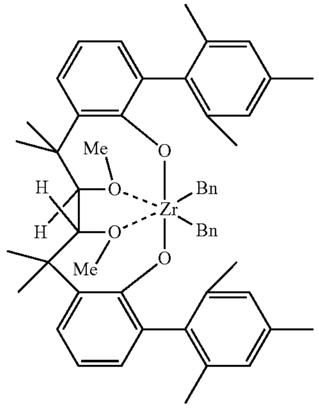
Metal-Ligand Complex 12
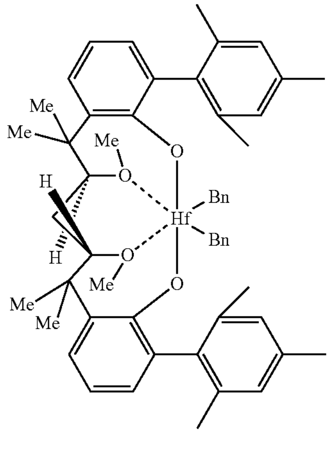

-continued
Metal-Ligand Complex 13
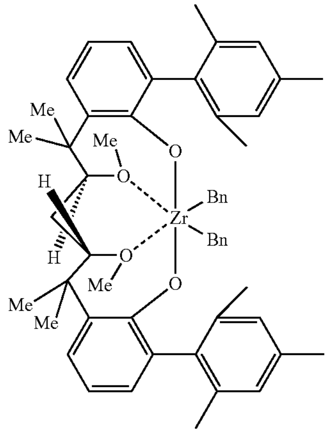
Metal-Ligand Complex 14
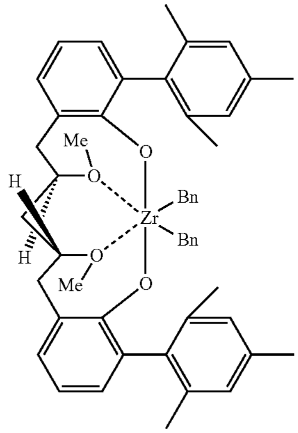
-continued
Metal-Ligand Complex 15
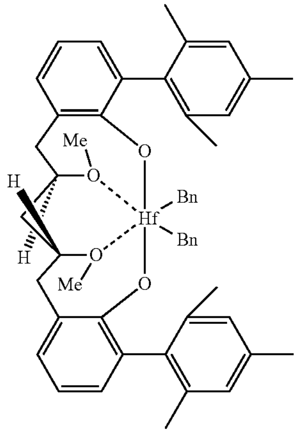
Metal-Ligand Complex 16
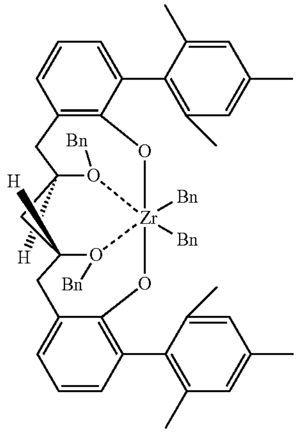
* * * * *